US006771378B2

(12) United States Patent
Akiyama et al.

(10) Patent No.: US 6,771,378 B2
(45) **Date of Patent: *Aug. 3, 2004**

(54) INFORMATION PROCESSING APPARATUS WHICH OBTAINS INFORMATION CONCERNING RESIDUAL INK AMOUNT FROM AN ATTACHED INK JET PRINTER

(75) Inventors: Yuji Akiyama, Yokohama (JP); Masashi Kamada, Kawasaki (JP); Toshiharu Inui, Yokohama (JP); Takayuki Ninomiya, Ichikawa (JP); Kazuhiko Morimura, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/543,929

(22) Filed: Oct. 17, 1995

(65) Prior Publication Data

US 2003/0112457 A1 Jun. 19, 2003

(30) Foreign Application Priority Data

Oct. 20, 1994 (JP) ............................................. 6/255246
Oct. 20, 1994 (JP) ............................................. 6/255247

(51) Int. Cl.[7] ............................................. G06K 15/00

(52) U.S. Cl. ....................................... 358/1.14; 358/1.1

(58) Field of Search ................................ 395/101, 104, 395/106, 109, 113; 346/139 R, 140.1; 347/1, 6, 14, 19, 21, 36, 85, 86, 116; 385/1.1, 1.4, 1.6, 1.9, 1.14; 358/1.1, 1.4, 1.6, 1.9, 1.14

(56) References Cited

U.S. PATENT DOCUMENTS 4,422,084 A 12/1983 Saito ....................... 346/140 R
4,587,535 A * 5/1986 Watanabe ..................... 347/23
4,771,295 A 9/1988 Baker et al. ................. 346/1.1
4,977,413 A * 12/1990 Yamanaka et al. ............. 347/7
5,025,271 A 6/1991 Baker et al. ............ 346/140 R
5,068,806 A 11/1991 Gatten ........................ 395/113
5,172,987 A 12/1992 Stellmach et al.
5,315,317 A * 5/1994 Terasawa et al. .............. 347/7
5,357,347 A * 10/1994 Hirose et al. ............... 358/296
5,509,140 A * 4/1996 Koitabashi et al. ........... 347/86
5,592,200 A * 1/1997 Kaneko ....................... 347/30
5,652,610 A * 7/1997 Kawai et al. ................. 347/87
5,663,750 A * 9/1997 Sakuma ......................... 347/7
6,062,670 A * 5/2000 Iwata et al. ................... 347/23

FOREIGN PATENT DOCUMENTS

EP 0418815 3/1991 .......... B41J/25/304
EP 0496642 7/1992
EP 0519700 12/1992
EP 0575168 A1 * 6/1993
EP 0551014 7/1993
EP 0580433 1/1994
EP 0581531 2/1994
EP 0593282 4/1994
EP 608106 7/1994

(List continued on next page.)

*Primary Examiner*—Gabriel Garcia
(74) *Attorney, Agent, or Firm*—Fitzpatrick, Cella, Harper & Scinto

(57) ABSTRACT

A host computer acquires information about an amount of remaining ink of a printer. In response to the acquired information about the amount of remaining ink, the host computer displays a message on a display screen so that a user can select whether an ink cartridge is to be replaced with a new one or the process is to return to a previous routine without replacing the ink cartridge.

21 Claims, 42 Drawing Sheets

FOREIGN PATENT DOCUMENTS

| | | | |
|---|---|---|---|
| JP | 62158049 | 7/1987 | .............. B41J/3/04 |
| JP | 63087242 | 4/1988 | |
| JP | 2-227257 | 9/1990 | |
| JP | 4163074 | 6/1992 | .......... B41J/25/308 |
| JP | 5-16384 | 1/1993 | |
| JP | 5-147205 | 6/1993 | |
| JP | 06040043 | 2/1994 | |
| JP | 6000971 | 11/1994 | |
| JP | 890767 | 4/1996 | .............. B41J/2/01 |
| WO | WO92/18335 | 10/1992 | ............ B41J/2/175 |

* cited by examiner

| FIG. 2A |
| --- |
| FIG. 2B |

| FIG. 4A |
| --- |
| FIG. 4B |

STANDARD PAPER POSITION (0deg.)

THICK PAPER POSITION (4deg.)

CAP POSITION (4deg.)

FIG. 43A
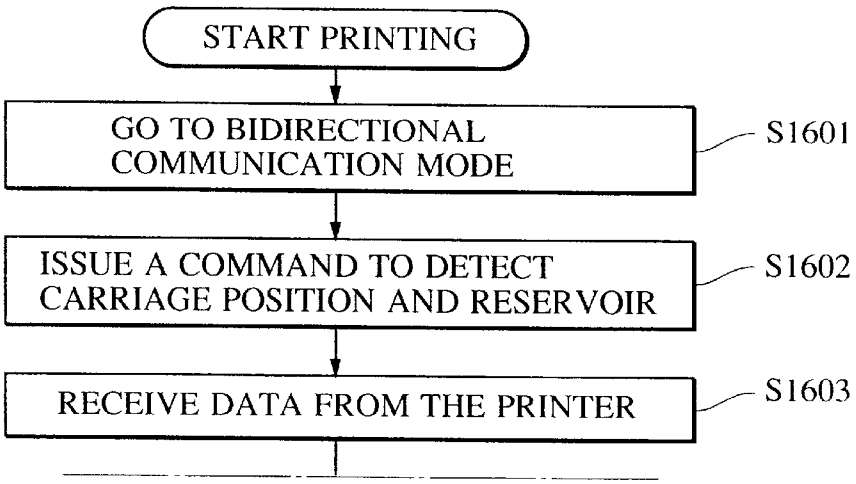
FIG. 43C
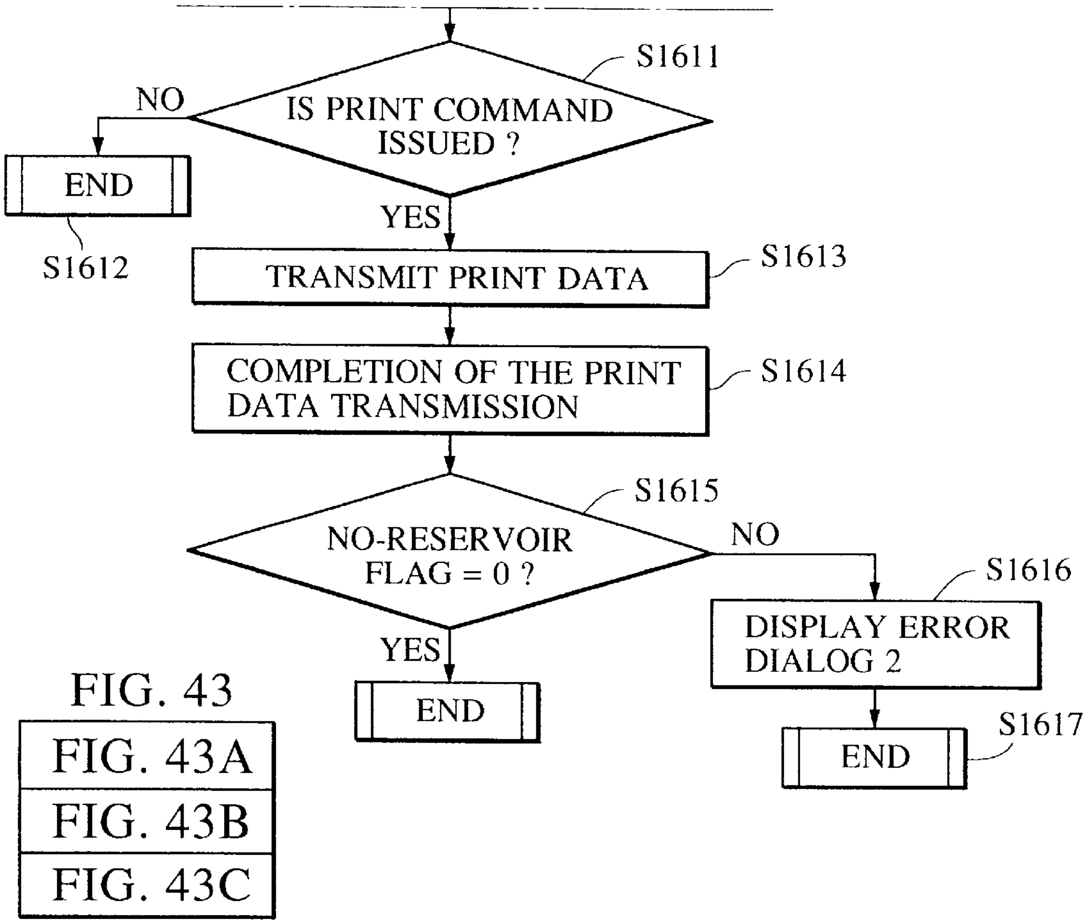
FIG. 43
| |
|---|
| FIG. 43A |
| FIG. 43B |
| FIG. 43C |

INFORMATION PROCESSING APPARATUS WHICH OBTAINS INFORMATION CONCERNING RESIDUAL INK AMOUNT FROM AN ATTACHED INK JET PRINTER

BACKGROUND OF THE INVENTION

1. Field of the Invention

The present invention relates to an information processing system such as a host computer for controlling a printing apparatus such as an ink-jet printer that performs a printing operation by firing droplets of ink at paper through a nozzle of a print head wherein the ink is supplied from an ink reservoir to the print head, and also relates to an information processing method for handling such a system.

2. Description of the Related Art

An ink-jet printer has the capability of detecting the amount of remaining ink, which prevents a printing error which would otherwise occur due to lack of ink. According to this capability, the amount of ink remaining in an ink reservoir is detected and the result is displayed. If the detected amount becomes less than a lower limit, a warning is given or a printing operation is stopped.

There are various known techniques for detecting the amount of ink remaining in an ink reservoir, and some of them are in practical use.

One of the techniques is to dispose a proper sensor in an ink reservoir so as to directly detect the amount of remaining ink. For example, two electrodes are disposed in an ink reservoir in such a manner that the electrodes are in contact with ink so as to detect the resistance between the two electrodes that changes depending on the amount of remaining ink. In another technique similar to the above first technique, a light beam is used to illuminate ink in an ink reservoir. If there is ink in the ink reservoir, the light beam is absorbed by the ink and cannot reach a photodector. On the other hand, if no ink is in the ink reservoir, the light beam can travel through the ink reservoir without being absorbed, and can reach the photo detector. Thus, it is possible to detect whether there is ink in the ink reservoir. Hereinafter, the above-described methods will be referred to as a sensor method.

In a second category of methods, the number of operations of emitting ink droplets via a print head is counted, and the result is compared with the previously estimated maximum possible number of printing dots or the maximum number of ink droplets that can be supplied from one ink reservoir thereby indirectly estimating the consumption of ink. Hereafter, this technique is referred to as a "dot counting method."

The printing apparatus having the capability described above is controlled by a host computer. However, the host computer cannot know the status regarding the amount of remaining ink of the printing apparatus, and thus cannot tell a user the status in a visual or other fashions.

To obtain a good result in printing, the ink-jet printer has to know the status of the printer with respect to the items including those described below.

First, the printer has to detect the distance between paper or printing medium and the ink emission plane of a print head so that printing is performed correctly at desired positions.

In conventional printers, as shown in FIGS. 38 to 40, there is provided a lever 301 for adjusting the paper position. By using this lever, the paper position is switched between a standard paper position and a thick paper position so as to optimize the paper position for both standard paper and thick paper such as a post card.

In the above-described conventional printing system, if the system has a fatal error associated with for example the paper position adjustment, the error is indicated only on the printer via audio or optical means. Therefore, the user has to come to the printer to know what error the printer has, and then has to handle the error, which is very inconvenient for the user.

Furthermore, in the conventional printing system the user cannot know the type of printing medium via a display of the host computer.

SUMMARY OF THE INVENTION

It is a general object of the present invention to solve the above problems. More specifically, it is an object of the present invention to provide an information processing system and method for acquiring remaining-amount information representing the amount of ink remaining in an ink cartridge of a printer and displaying a message on display means in response to the acquired remaining-amount information so that a user can select either replacing of the ink cartridge in the printer or returning to a process performed by the information processing system.

It is another object of the present invention to provide an information processing system and method for: analyzing the color so as to determine the color to be used by a printing apparatus; acquiring remaining-amount information from a printing apparatus, the remaining-amount information representing the amount of ink of the determined color remaining in an ink cartridge; and displaying a message on display means in response to the acquired remaining-amount information so that a user can select either replacing of the ink cartridge containing the ink having the color to be used or returning to a process performed by the information processing system.

It is still another object of the present invention to provide an information processing system and method for: judging whether the printing mode of a printing apparatus is a monochrome mode or a color mode; acquiring remaining-amount information from the printing apparatus in response to the judgement result, the remaining-amount information representing the amount of ink remaining in a color ink cartridge to be used; and displaying a message on display means in response to the acquired remaining-amount information so that a user can select either replacing of the ink cartridge containing ink of the color to be used or returning to a process performed by the information processing system.

It is a further object of the present to provide an information processing system and method for: acquiring remaining-amount information representing the amount of ink remaining in an ink cartridge disposed in a printing apparatus; and displaying a message on display means in response to the acquired remaining-amount information so that a user can select either replacing of the ink cartridge in the printing apparatus or designation of an alternative color different from the color of the ink in the above-described ink cartridge.

It is another object of the present invention to provide an information processing system and method for: acquiring remaining-amount information representing the amount of ink remaining in an ink cartridge disposed in a printing apparatus; and displaying a message on display means in response to the acquired remaining-amount information so that a user can select either designation of an alternative color different from the color of the ink in the above-described ink cartridge or returning to a process performed by the information processing system.

It is another object of the present invention to provide an information processing system and method for: comparing the number of dots contained in dot image information with the number of dots that can be printed by a printing apparatus; and controlling the generation of the dot image information depending on the result of the above comparison.

The above objects are achieved by the present invention having various aspects as described below. According to an aspect of the present invention, there is provided an information processing system for controlling a printing apparatus, including: acquisition means for acquiring remaining-amount information representing the amount of ink remaining in an ink cartridge disposed in the printing apparatus; and display control means for controlling display of a message on display means in response to the acquired remaining-amount information, the message advising a user to select either replacing of the ink cartridge in the printing apparatus or returning to a process performed by the information processing system.

According to another aspect of the present invention, there is provided an information processing system for controlling a printing apparatus, including: analysis means for analyzing a color to be used by the printing apparatus; acquisition means for acquiring remaining-amount information from the printing apparatus, said remaining-amount information representing the amount of ink remaining in an ink cartridge, the ink having the color analyzed by the above analysis means; and display control means for controlling display of a message on display means in response to the acquired remaining-amount information, the message advising a user to select either replacing of the ink cartridge containing ink having the color to be used by the printing apparatus or returning to a process performed by the information processing system.

According to still another aspect of the present invention, there is provided an information processing system for controlling a printing apparatus, including: judgement means for judging whether a printing mode of the printing apparatus is a monochrome mode or a color mode; acquisition means for acquiring remaining-amount information from the printing apparatus in response to a judgement result by the above judgement means, the remaining-amount information representing the amount of ink of a color to be used remaining in an ink cartridge; and display control means for controlling display of a message on display means in response to the acquired remaining-amount information, the message advising a user to select either replacing of the ink cartridge containing ink of the color to be used by the printing apparatus or returning to a process performed by the information processing system.

According to another aspect of the present invention, there is provided an information processing system for controlling a printing apparatus, including: acquisition means for acquiring remaining-amount information representing the amount of ink remaining in an ink cartridge disposed in the printing apparatus; and display control means for controlling display of a message on display means in response to the acquired remaining-amount information, the message advising a user to select either replacing of the ink cartridge in the printing apparatus or designation of an alternative color different from a color of the ink in the ink cartridge.

According to another aspect of the present invention, there is provided an information processing system for controlling a printing apparatus, including: acquisition means for acquiring remaining-amount information representing the amount of ink remaining in an ink cartridge disposed in the printing apparatus; and display control means for controlling display of a message on display means in response to the acquired remaining-amount information, the message advising a user to select either designation of an alternative color different from a color of the ink in the ink cartridge or returning to a process performed by the information processing system.

According to still another aspect of the present invention, there is provided an information processing system for outputting dot image information to a printing apparatus, including: comparison means for comparing a number of dots contained in the dot image information with a number of dots that can be printed by the printing apparatus; and control means for controlling the generation of the dot image information depending on a result of the comparison means.

According to a further aspect of the present invention, there is provided an information processing method for use in an information processing system for controlling a printing apparatus, including the steps of: acquiring remaining-amount information representing the amount of ink remaining in an ink cartridge disposed in the printing apparatus; and controlling display of a message on display means in response to the acquired remaining-amount information, the message advising a user to select either replacing of the ink cartridge in the printing apparatus or returning to a process performed by the information processing system.

According to another aspect of the present invention, there is provided an information processing method for use in an information processing system for controlling a printing apparatus, including the steps of: analyzing a color to be used by the printing apparatus; acquiring remaining-amount information from the printing apparatus, the remaining-amount information representing the amount of ink remaining in an ink cartridge, the ink having the color analyzed in the above analyzing step; and controlling display of a message on display means in response to the acquired remaining-amount information, the message advising a user to select either replacing of the ink cartridge containing ink of the color to be used by the printing apparatus or returning to a process performed by the information processing system.

According to still another aspect of the present invention, there is provided an information processing method for use in an information processing system for controlling a printing apparatus, including the steps of: judging whether a printing mode of the printing apparatus is a monochrome mode or a color mode; acquiring remaining-amount information from the printing apparatus in response to a judgement result obtained in the judgement step, the remaining-amount information representing the amount of ink of a color to be used remaining in an ink cartridge; and controlling display of a message on display means in response to the acquired remaining-amount information, the message advising a user to select either replacing of the ink cartridge containing ink of the color to be used by the printing apparatus or returning to a process performed by the information processing system.

According to another aspect of the present invention, there is provided an information processing method for use in an information processing system for controlling a printing apparatus, including the steps of: acquiring remaining-amount information representing the amount of ink remaining in an ink cartridge disposed in the printing apparatus; and controlling display of a message on display means in response to the acquired remaining-amount information, the message advising a user to select either replacing of the ink cartridge in the printing apparatus or designation of an alternative color different from a color of the ink in the ink cartridge.

According to a further aspect of the present invention, there is provided an information processing method for use in an information processing system for controlling a printing apparatus, including the steps of: acquiring remaining-amount information representing the amount of ink remaining in an ink cartridge disposed in the printing apparatus; and controlling display of a message on display means in response to the acquired remaining-amount information, the message advising a user to select either designation of an alternative color different from a color of the ink in the ink cartridge or returning to a process performed by the information processing system.

According to another aspect of the present invention, there is provided an information processing method for use in an information processing system for outputting dot image information to a printing apparatus, including the steps of: comparing a number of dots contained in the dot image information with a number of dots that can be printed by the printing apparatus; and controlling the generation of the dot image information depending on a result in the comparing step.

According to the aspects described above, the host computer can acquire the status regarding the amount of remaining ink of the printing apparatus, and notify a user of the acquired status in a visual fashion so that the user can select the following operation via the display means.

Furthermore, another object of the present invention is to provide an information processing system and method for: acquiring information representing the distance between a print head of a printing apparatus and a printing medium; and displaying identification information about the printing medium in response to the acquired information, the identification information being set in the printing apparatus, thereby providing an improved user interface and ease of operation.

It is still another object of the present invention to provide an information processing system and method for: acquiring information representing an ink cartridge mounting status of a printing apparatus; and displaying a message on display means in response to the acquired information so that a user can select an alternative color different from a color of the ink in the above-described ink cartridge, thereby providing an improved user interface and ease of operation.

The above objects are also achieved by the present invention having various aspects as described below. According to an aspect of the present invention, there is provided an information processing system for controlling a printing apparatus, including: acquisition means for acquiring information representing the distance between a print head of the printing apparatus and a printing medium; and display control means for controlling display of identification information about the printing medium in response to the acquired information, the identification information being set in the printing apparatus.

According to another aspect of the present invention, there is provided an information processing system for controlling a printing apparatus, including: acquisition means for acquiring information representing an ink cartridge mounting status of the printing apparatus; and display control means for controlling display of a message on display means in response to the acquired information, the message advising a user to select an alternative color different from a color of the ink in the ink cartridge.

According to a further aspect of the present invention, there is provided an information processing method for use in an information processing system for controlling a printing apparatus, including the steps of: acquiring information representing the distance between a print head of the printing apparatus and a printing medium; and controlling display of identification information about the printing medium in response to the acquired information, the identification information being set in the printing apparatus.

According to another aspect of the present invention, there is provided an information processing method for use in an information processing system for controlling a printing apparatus, including the steps of: acquiring information representing an ink cartridge mounting status of the printing apparatus; and controlling display of a message on display means in response to the acquired information, the message advising a user to select an alternative color different from a color of the ink in the ink cartridge.

According to the above-described aspect of the invention, the information processing system can acquire information representing the distance between a print head of a printing apparatus and a printing medium and display identification information about the printing medium in response to the acquired information, the identification information being set in the printing apparatus, thereby providing an improved user interface and ease of operation.

Furthermore, the information processing system can acquire information representing the ink cartridge mounting status of a printing apparatus and display a message on display means in response to the acquired information so that a user can select an alternative color different from the color of the ink in the above-described ink cartridge, thereby providing an improved user interface and ease of operation.

DESCRIPTION OF THE PREFERRED EMBODIMENTS

Referring to the accompanying drawings, a printing apparatus and a method of controlling it according to the present invention will be described in detail below.

Embodiment 1

Figure 1:
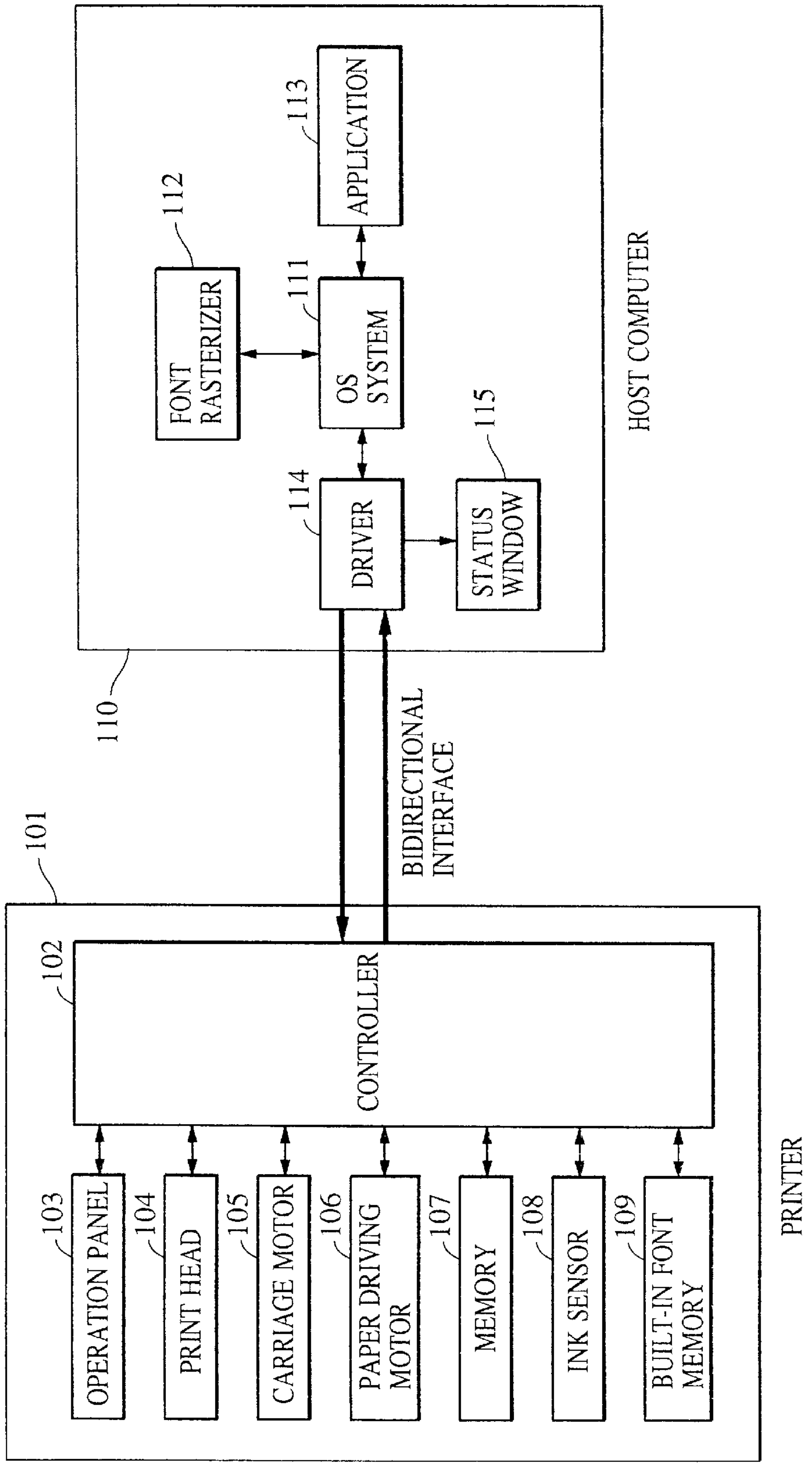
FIG. 1 is a block diagram of an embodiment of a printer control system according to the present invention.

FIG. 1 is a block diagram of a first embodiment of a printing system according to the present invention.

As shown in FIG. 1, the printing system includes a printer 101 for printing image data, and a host computer 110 for receiving a command issued by a user and generating image data to be printed (printing information) wherein the printer 101 and the host computer 110 are connected to each other via an interface having the capability of bidirectional communication. The interface may be of any type such as that using a cable or a wireless interface using a radio wave or infrared light.

In this employment, an ink-jet printer is employed as the printer 101. The printer 101 includes: a controller (CPU) 102 responsible for controlling the entire printer; an operation panel 103 including a power on/off switch, an on-line switch for controlling the interface, and a lamp for indicating the status; a print head 104 for firing a droplet of ink at a printing material thereby printing an image thereon; a carriage motor 105 for moving a carriage, on which the print head is installed, in the vertical direction with respect to the print head; a paper feeding motor 106 for feeding, transferring, and pushing out a printing material; a memory 107 for temporarily storing data received from the host computer, and also storing image data (printing information) to be printed, wherein a unit of band size is employed as a storage unit; an ink sensor 108 for detecting the presence or absence of an ink cartridge and also detecting the amount of ink remaining in the ink cartridge; and a built-in font memory 109 for storing characters, pictorial characters, and the like which are expected to be used frequently. In this embodiment, the ink-jet printer is of the type having the capability of color printing, wherein the color printing is accomplished by a print head 104 having four heads for four colors including black, cyan, magenta, and yellow, these four heads being installed on a carriage. In this embodiment, the printer receives printing information (bit image information) band by band from the host computer 110, and then prints the received printing information on a printing medium band by band. In the case where the printer 101 is of the page printer type that performs a printing operation page by page, the host computer 110 may transmit the printing information to the printer 101 page by page. Furthermore, if the printer has the capability of converting the received data into a bit map form (generation of printing information), the host computer may transmit the printing information described in a printer language such as a PDL (Page Description Language) consisting of character and control codes to the printer band by band or page by page.

In the host computer 110, a CPU (not shown) develops bit map data (printing information) using an OS system 111 and application software 113 for producing documents, tables, and graphical images, in such a manner that the resultant bit map data meets the requirement of resolution needed by a printer driver 114. In the above process, character images consisting of vector information are developed into bit map data (printing information) using a font rasterizer 112. Furthermore, the CPU (not shown) generates printing information in the form suitable for a printing operation from the printing information developed into the form of bit map data using the printer driver 114. The CPU then adds printer control codes to it and transmits the resultant printing information to the printer. The printer driver 114 shows a user various information such as the status regarding the data processing as well as the printer status via a status window 115 at proper times.

The programs shown in the flowcharts of FIGS. 2–16 are stored in the printer driver 114 and executed by the CPU (not shown).

Figure 42:
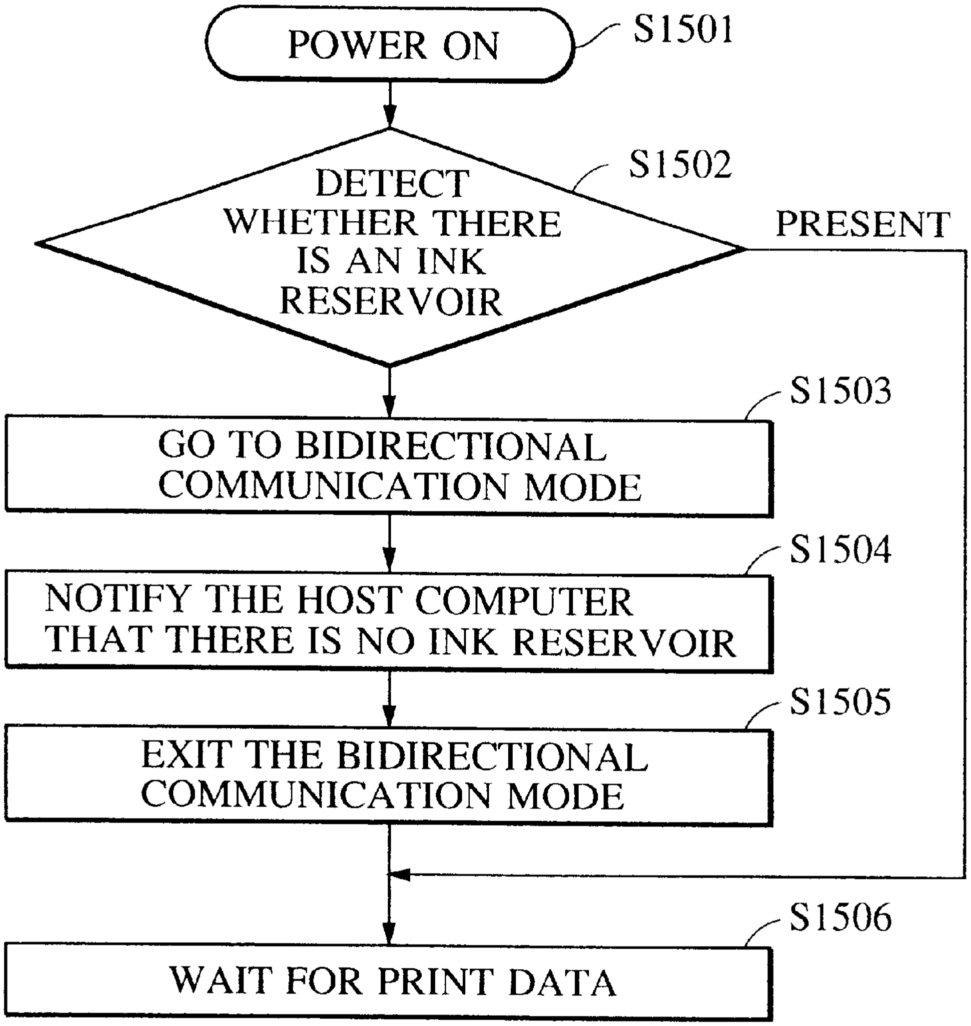
FIG. 42 is a flowchart illustrating the process of turning on the power of the printer.
Figure 43B:
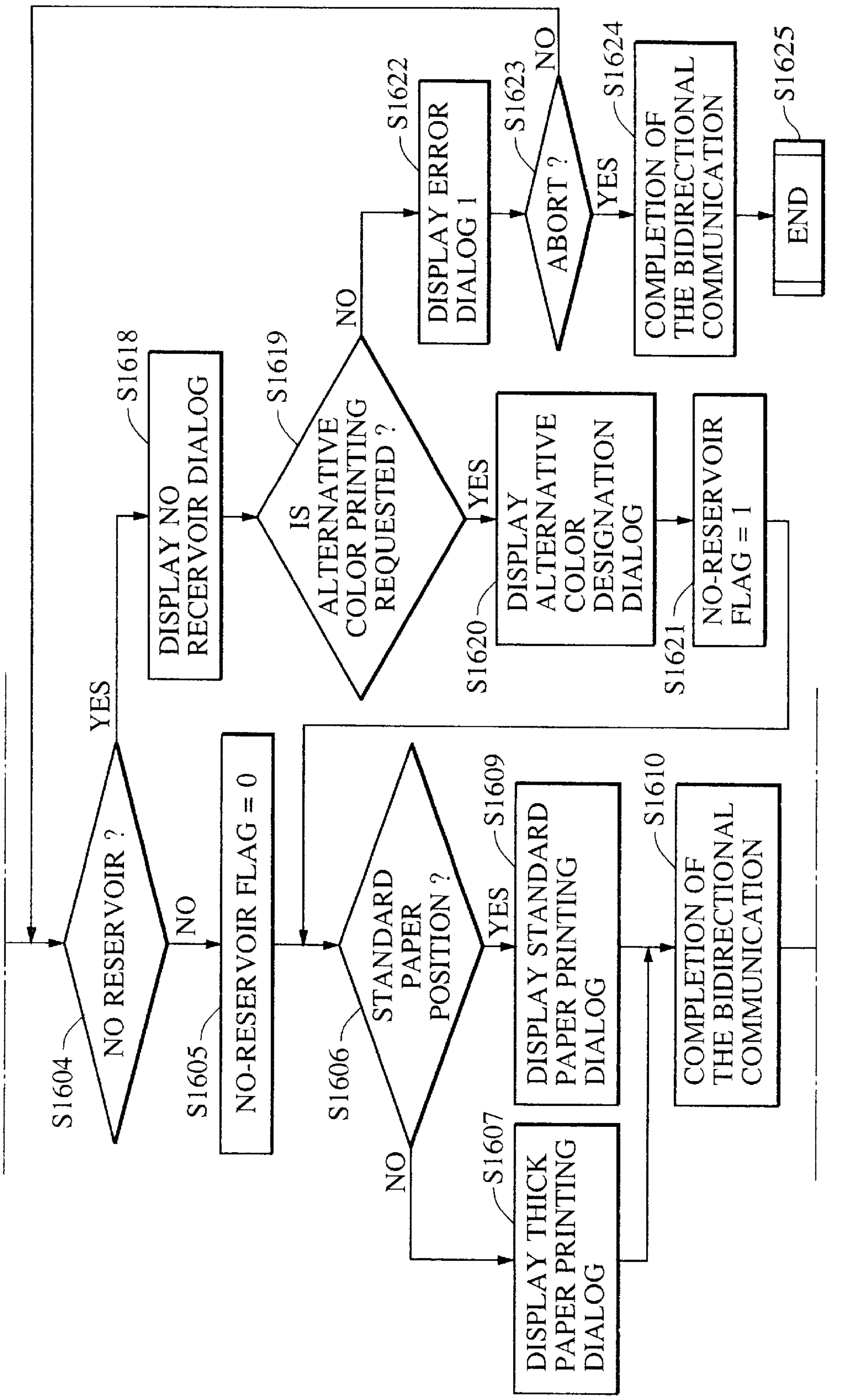
FIG. 43, which is comprised of FIGS. 43A–43C, is a flowchart illustrating the process from the step at which the host computer issues a command to a printer to start a printing operation to the step at which the process is completed.

On the other hand, the program shown in the flowchart of FIG. 42 is stored in for example a ROM (not shown) of the printer 101 and executed by a controller (CPU) (FIG. 1). Referring to the flowcharts shown in FIGS. 2 and 3, the process of the present embodiment will be described below.

Figure 2A:
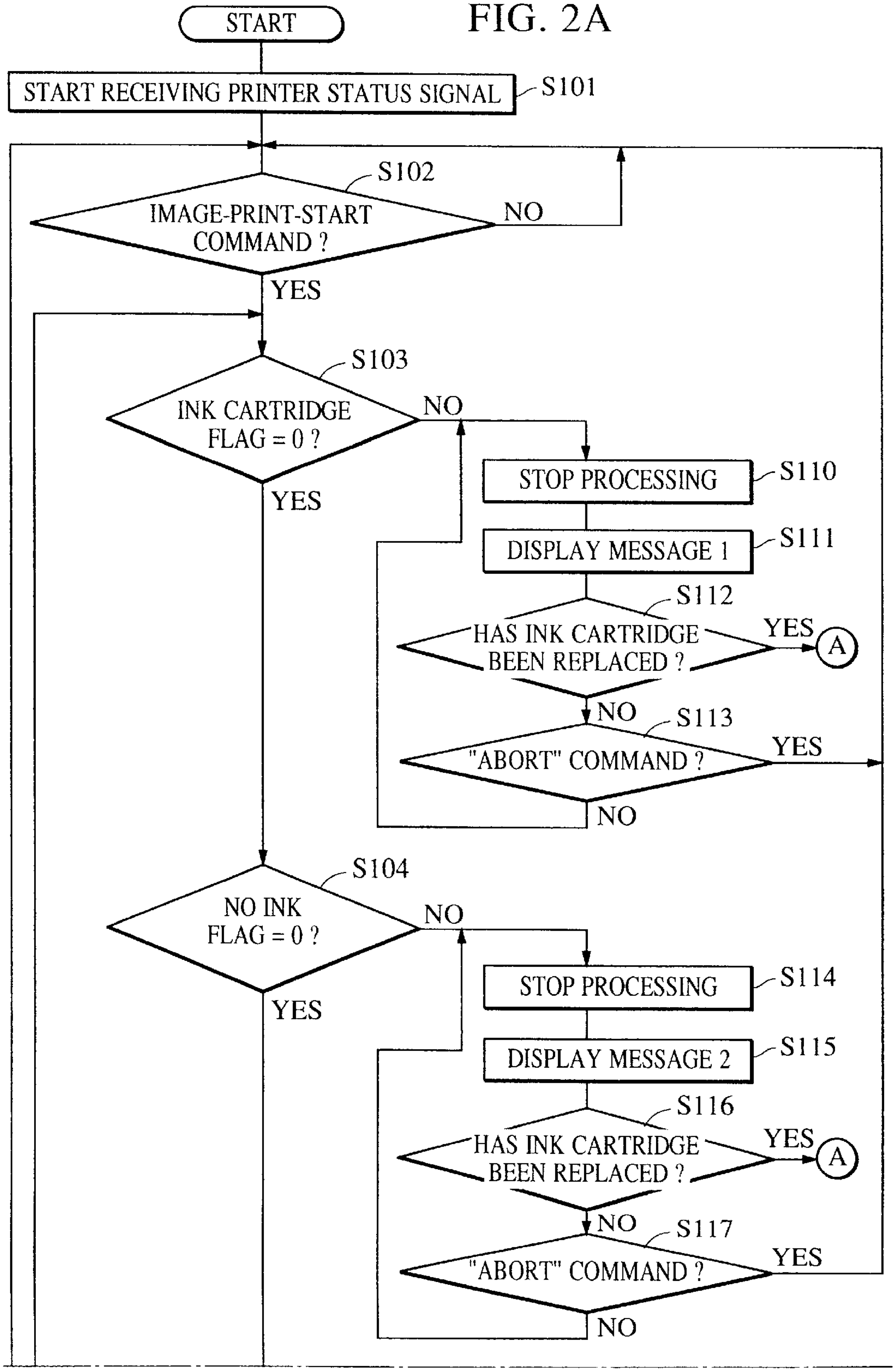
FIG. 2, which is comprised of FIGS. 2A and 2B, is a flowchart illustrating the process according to the embodiment of the present invention.
Figures 2, 2B:
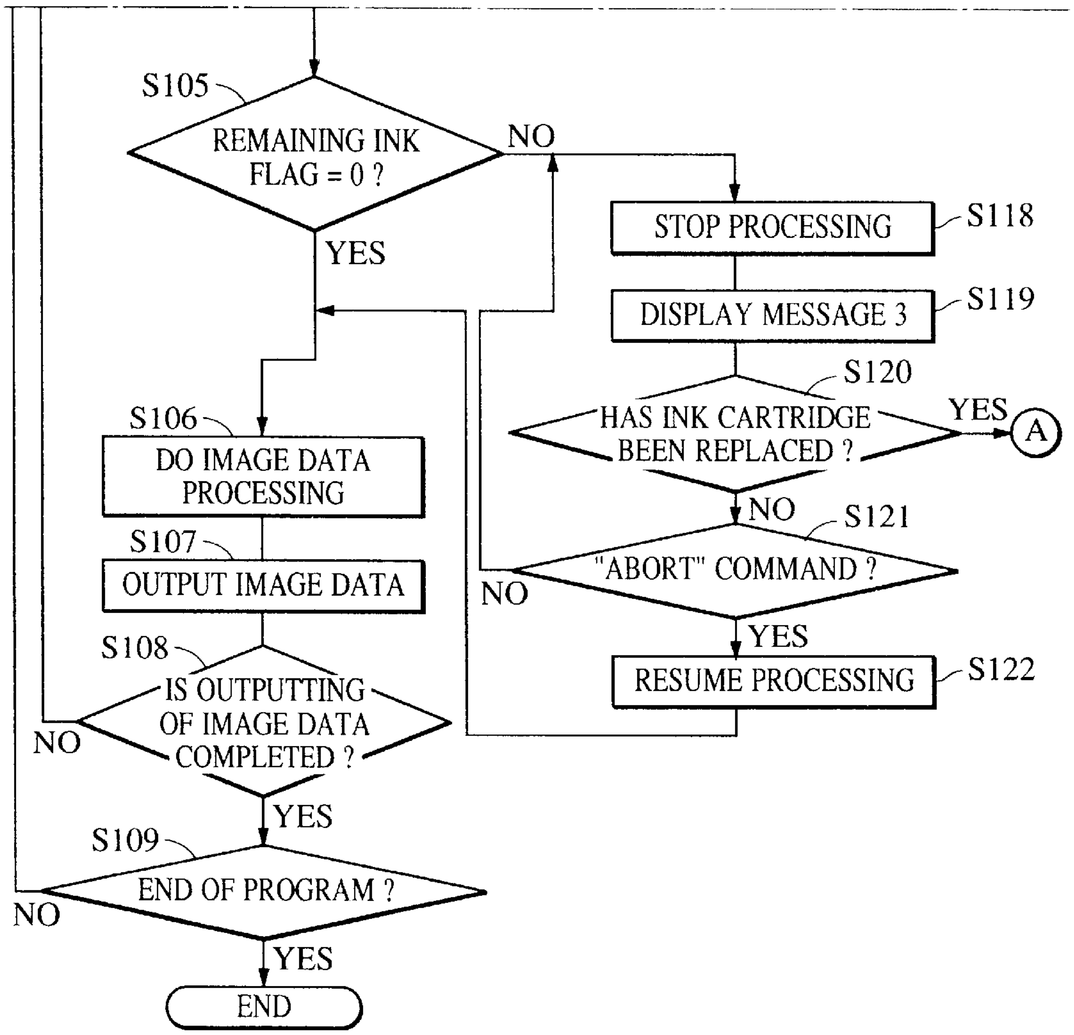

In step S101 shown in FIG. 2, the program begins with receiving status information from the printer. In step S102, if a command is received which indicates that generation of printing information should be started, then in step S103 the program checks an ink cartridge flag. If the ink cartridge flag is 0, that is, all ink cartridges are mounted on the printer, then the program goes to step S104. In step S104, the program checks a no-ink flag. If the no-ink flag is 0, that is, there is ink in all the ink cartridges, then the program goes to step S105. In step S105, the program checks a remaining ink flag. If the remaining ink flag is 0, that is, the remaining amount of ink is enough, then the program goes to step S106. In step S106, printing information is generated by converting image information into a form suitable for printing band by band. In step S107, the generated printing information is then output to the printer band by band.

In this embodiment, the printing information is in the form of bit map data. However, if the printer 101 has the capability of converting the received data into bit map data, the printing information may be written in a printer language, such as a PDL, consisting of character and control codes.

Figure 15:
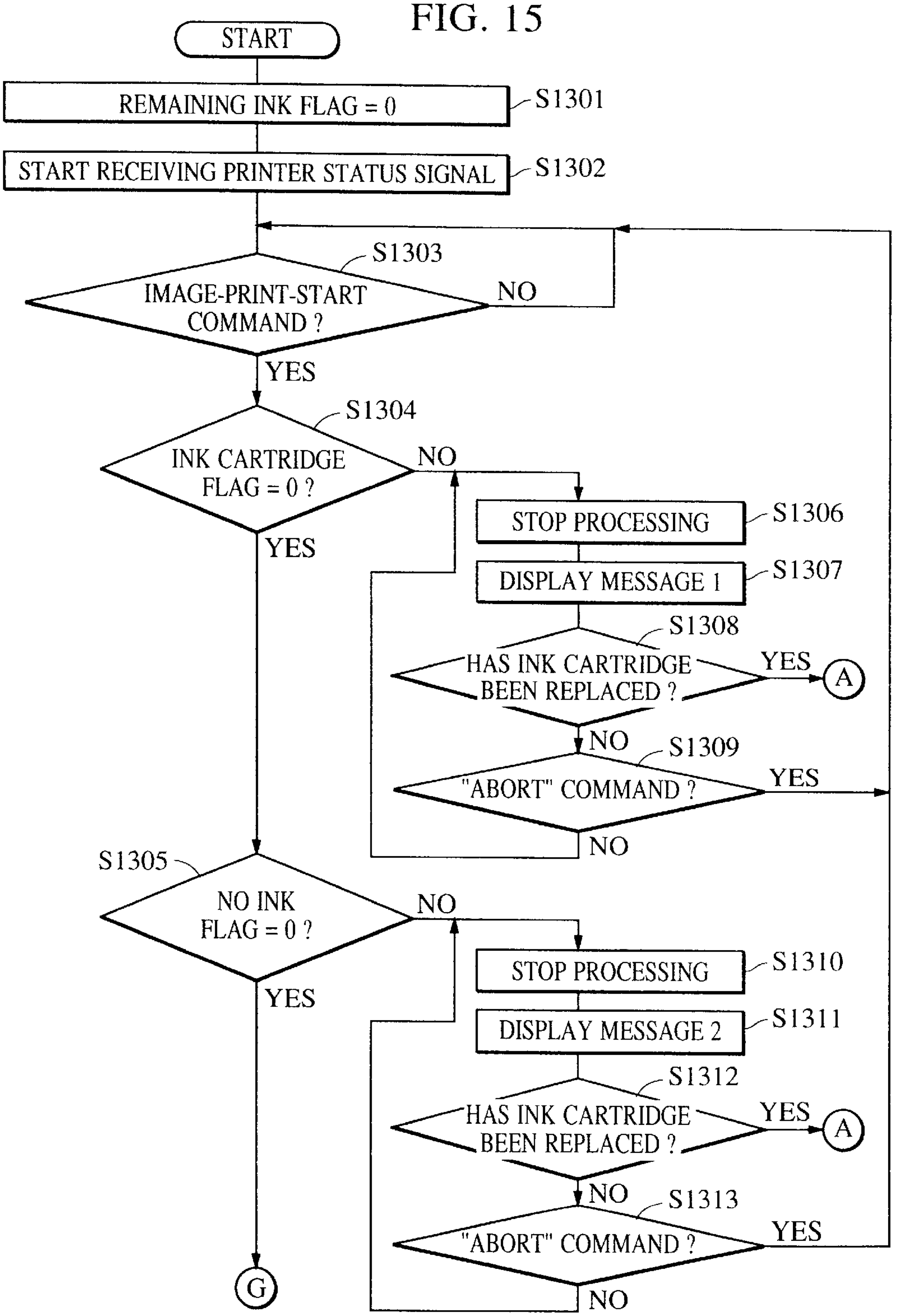
FIG. 15 is a flowchart illustrating the process according to still another embodiment of the present invention.
Figure 17:
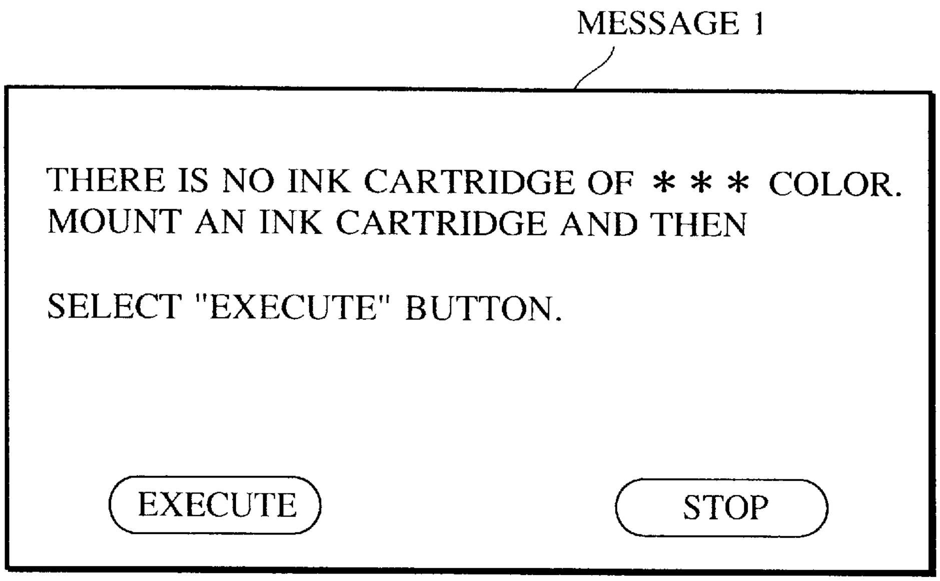
FIG. 17 is a schematic representation of a message 1 displayed in a status window to tell that a particular ink cartridge is not mounted.

If it is concluded in step S103 that the ink cartridge flag is 1, that is, some ink cartridge is not mounted on the printer, then the program goes to step S110 and the generation of printing information is temporarily stopped. Then in step S111, a message 1 is displayed. The message 1 is displayed in a status window on the display screen as shown in FIG. 17. As shown in FIG. 15, the status window contains a message indicating that a particular ink cartridge is not mounted on the printer and also indicating the color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 17, if the execution button is selected, it is determined in step S112 shown in FIG. 2 that replacement of an ink cartridge has been performed, and the program then goes to step S301 shown in FIG. 3. In the case where the stop button is selected in the status window of FIG. 17, no ink cartridge is replaced in step S112 of FIG. 2, and it is determined in step S113 that a forced aborting command has been issued, and thus the generation of printing information is canceled and the program returns to step S102 and waits until a command advising that generation of printing information should be started is issued again.

Figure 22:
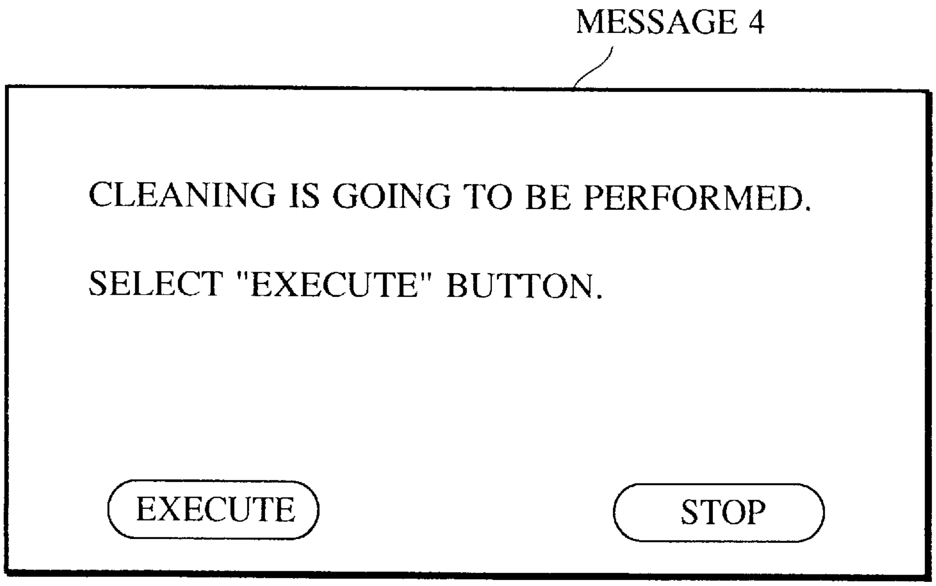
FIG. 22 is a schematic representation of a message 4 displayed in a status window to tell that a cleaning operation is going to start.

In the case where the program has branched to step S301, the message 4 is displayed. The message 4 is displayed in a status window on the display screen as shown in FIG. 22. As shown in FIG. 22, the status window contains a message telling or advising that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S102 of FIG. 2 and waits until a command telling that generation of printing information should be started is issued again. Alternatively, in the case where it has been determined in the above step S302 of FIG. 3 that a forced aborting command has been issued, the program may return to step S111 of FIG. 2 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the ink cartridge flag corresponding to the color of the cleaned ink cartridge is reset. Then in step S307, the generation of printing information is started again, and the program goes to step S104 of FIG. 2. Alternatively, in the above step S306 of FIG. 3, the flag may be reset by the printer itself instead of the host computer.

Figure 18:
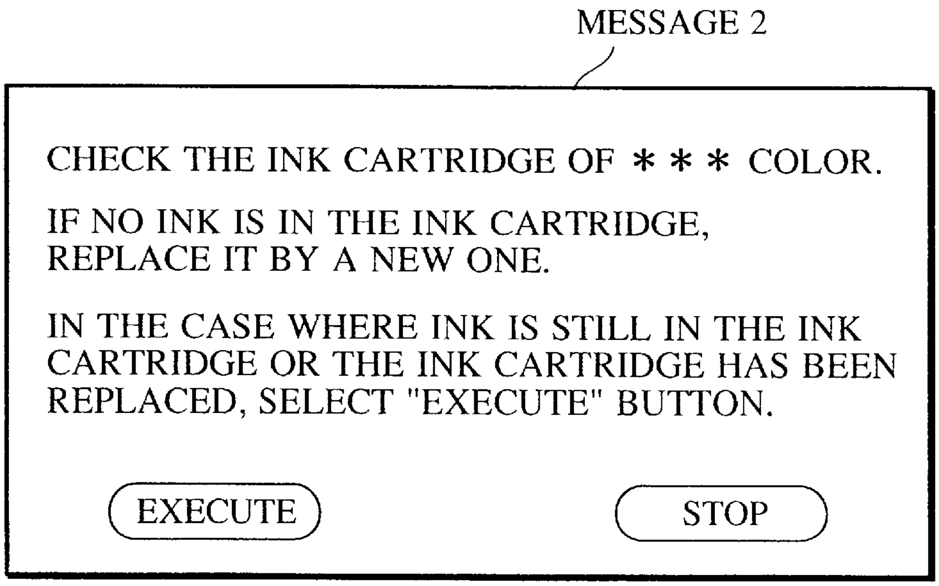
FIG. 18 is a schematic representation of a message 2 displayed in a status window to tell that a particular ink cartridge has no ink.

On the other hand, if it is concluded in step S104 of FIG. 2 that the no-ink flag is 1 which indicates that there is no ink in an ink cartridge, then the program goes to step S114 at which the generation of printing information is temporarily stopped. Then in step S115, a message 2 is displayed. The message 2 is displayed in a status window on the display screen as shown in FIG. 18. As shown in FIG. 18, the status window contains a message telling that a particular ink cartridge has no ink in it and also telling the ink color of that cartridge. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 18, if the execution button is selected, it is determined in step S116 of FIG. 2 that replacement of the ink cartridge has been performed, and the program then goes to step S301 shown in FIG. 3. In the case where the stop button is selected in the status window of FIG. 18, replacement of the ink cartridge in step S116 of FIG. 2 is not performed, and it is determined in step S117 that an "abort" command has been issued, and generation of printing information is canceled and the program returns to step S102 of FIG. 2 at which the program waits until a command telling that generation of printing information should be started is issued again.

In the case where the program has branched to step S301, a message 4 is displayed. The message 4 is displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S102 of FIG. 2 and waits until a command telling that generation of printing information should be started is issued again. Alternatively, in the case where it has been determined in the above step S302 of FIG. 3 that a forced aborting command has been issued, the program may return to step S115 of FIG. 2 so that the message shown in FIG. 18 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307, the generation of printing information is started again, and the program goes to step S105 of FIG. 2. Alternatively, in the above step S306 of FIG. 3, the flag may be reset by the printer itself instead of the host computer.

Figure 19:
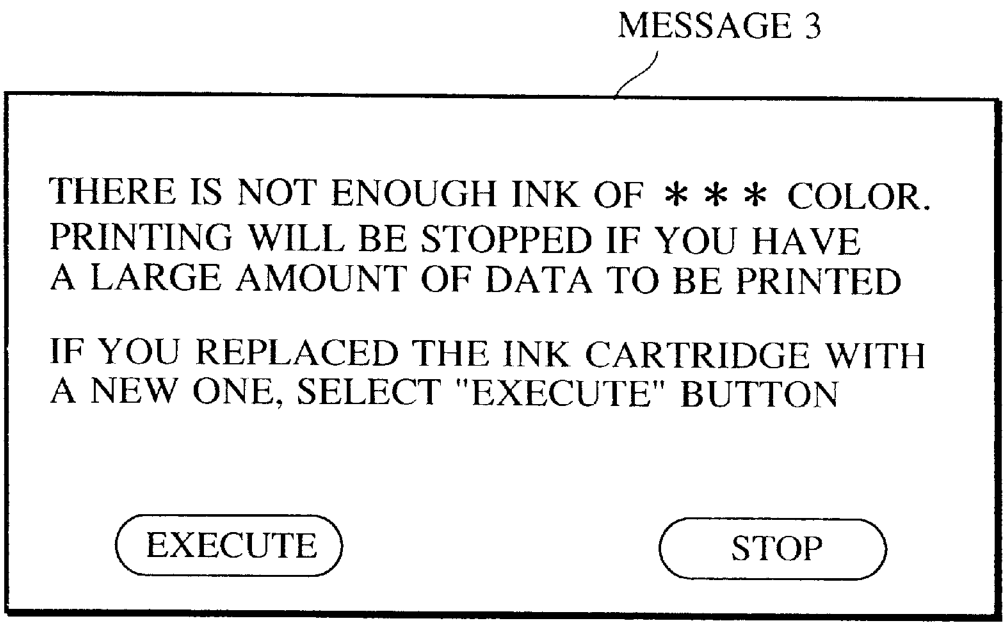
FIGS. 19 and 20 are schematic representations of messages 3 and 3' displayed in a status window to warn that the remaining amount of a particular ink is very small.

In step S105 of FIG. 2, if it is concluded that the remaining ink flag is 1 which indicates that the amount of ink remaining in an ink cartridge is not enough, then the program goes to step S118 at which the generation of printing information is temporarily stopped. Then in step S119, a message 3 is displayed. The message 3 is displayed in a status window on the display screen as shown in FIG. 19. As shown in FIG. 19, the status window contains a message telling that the amount of remaining ink is not enough and thus printing will be stopped before completion if the amount of data to be printed is too large, and also information of the color of that ink. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 19, if the execution button is selected, it is determined in step S120 of FIG. 2 that replacement of the ink cartridge is complete, and the program then goes to step S301 shown in FIG. 3. In the case where the stop button is selected in the status window of FIG. 19, no ink cartridge is replaced in step S120 of FIG. 2, and it is determined in step S121 that a "neglect" command has been issued, and the program goes to step S122 to start generation of printing information again. The program then goes to step S106. Even in the case where only a small amount of ink remains, printing may be performed on a few further pages if the image to be printed has a low dot density as in the case of a usual document of which almost all portions are in the form of characters. Therefore, the generation of printing information is not forced to be canceled in this case and the user can select either whether the ink cartridge is immediately replaced by a new one or printing is performed without replacement of the ink cartridge.

In the case where the program has branched to step S301, a message 4 is displayed. The message 4 is displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S102 of FIG. 2 and waits until a command telling that generation of printing information should be started is issued again. Alternatively, in the case where it has been determined in the above step S302 of FIG. 3 that a forced aborting command has been issued, the program may return to step S119 of FIG. 2 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the remaining ink flag corresponding to the color of the cleaned ink cartridge is reset. Then in step S307, the generation of printing information is started again, and the program goes to step S106 of FIG. 2. Alternatively, in the above step S306 of FIG. 3, the flag may be reset by the printer itself instead of the host computer.

The above-described process of checking the flags in the steps S103, S104, and S105 and the succeeding process according to the result of the checking are performed repeatedly until it is concluded in step S108 of FIG. 2 that all image data (printing information) has been output. If it is concluded in step S108 that all image data (printing information) has been output, the program goes to step S109. If an "end" command is not issued in step S109, then the program returns to step S109 and waits for another command telling that generation of printing information should be started.

In this embodiment, the host computer can know the printer status regarding the presence of ink cartridges, the lack of ink, and the amount of remaining ink. This provides a great advantage particularly when the printer is installed at a location rather far from the host computer or when the printer is shared by a plurality of computers via a network.

Embodiment 2

Figure 3:
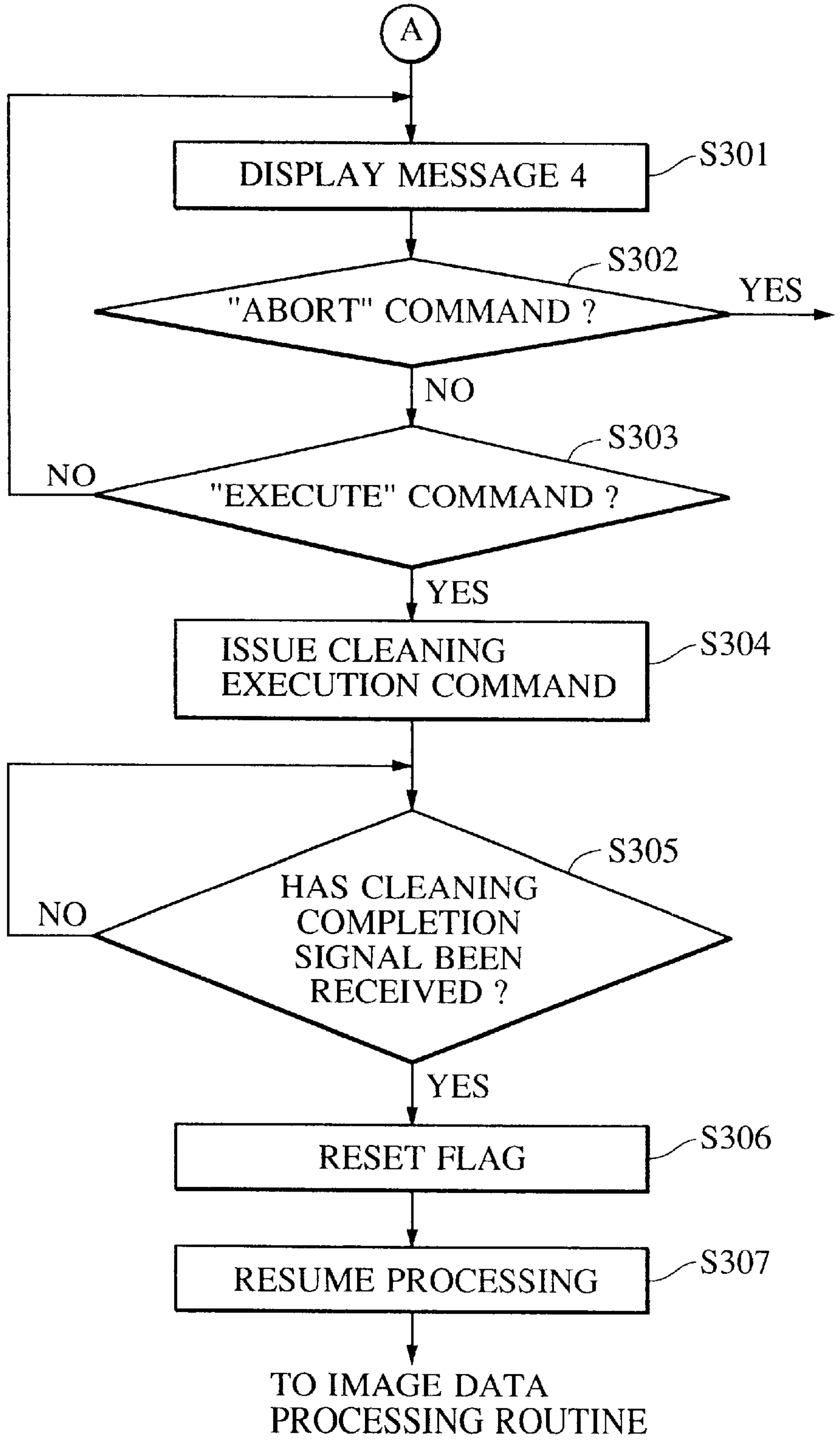
FIG. 3 is a flowchart illustrating the process relating to the ink cartridge replacement operation according to the embodiment of the present invention.

Referring to the flowcharts shown in FIGS. 3 and 4, the process of another embodiment according to the present invention will be described below.

Figure 4A:
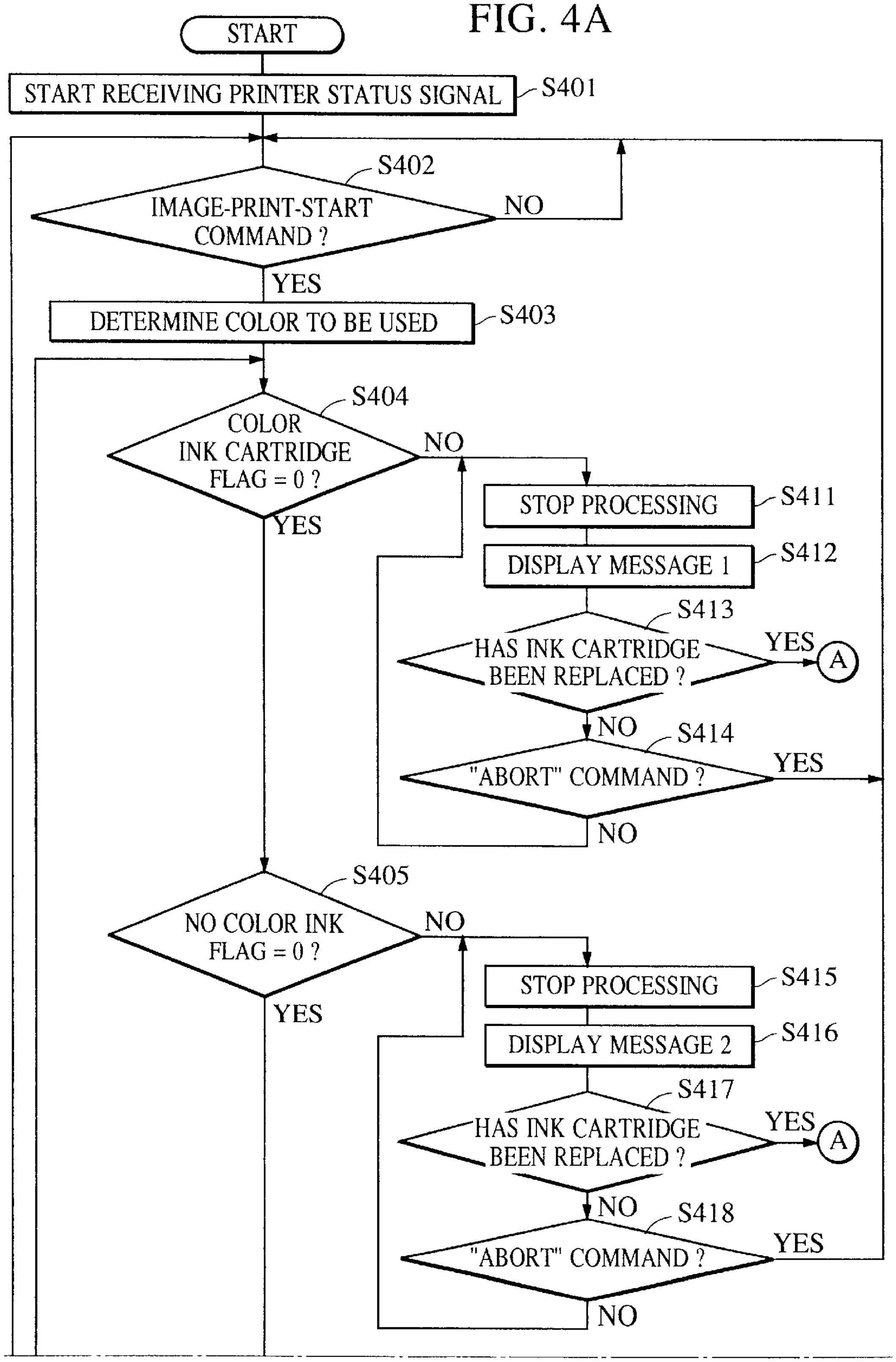
FIG. 4, which is comprised of FIGS. 4A and 4B, is a flowchart illustrating the process relating to the detection of the color of a printing image according to the embodiment of the present invention.
Figures 4, 4B:
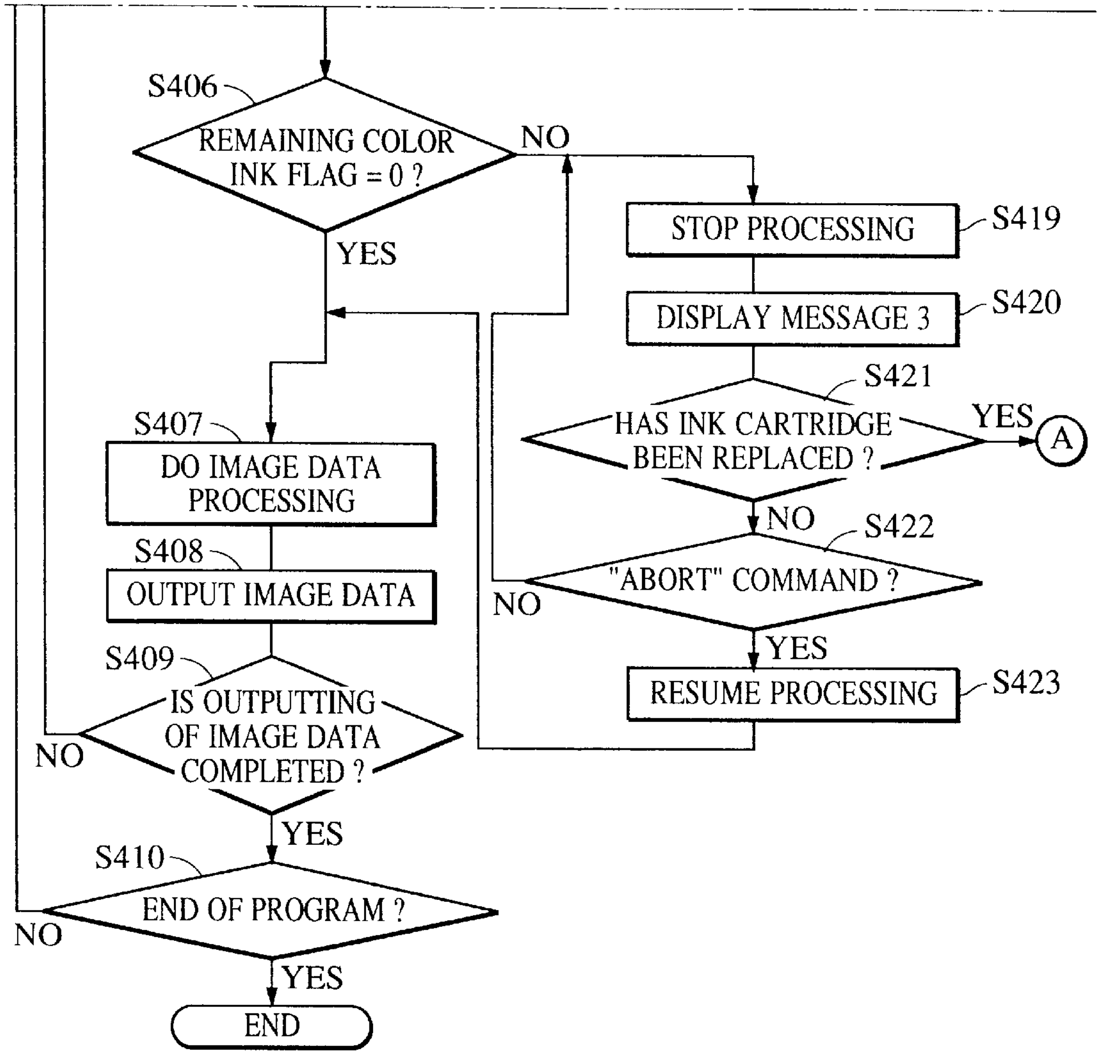

In step S401 shown in FIG. 4, the program begins with receiving status information from the printer. In step S402, if a command is received which indicates that generation of printing information should be started, then in step S403 an original image is analyzed to determine which ink color should be used. In general, the printer driver issues a command to the OS system to convert the printing information generated by application software into image data in a form that matches the resolution of the printer. If the printer has a high resolution such as 360 dpi, the development of image data and the analysis of the colors impose a heavy load on the processing. In such a case, an original image is developed with a low resolution such as 73 dpi first, and the colors of the original image are analyzed, and finally high-resolution development and analysis are performed so as to improve the processing speed. This also reduces the memory capacity requirement.

Then, in step S404, the program checks the ink cartridge flag associated with the color to be used. If the ink cartridge flag associated with the color to be used is 0, that is, an ink cartridge of the color to be used is mounted on the printer, then the program goes to step S405. In step S405, the program checks the no-ink flag associated with the color to be used. If the no-ink flag associated with the color to be used is 0, that is, there is ink in the ink cartridge of the color to be used, then the program goes to step S406. In step S406, the program checks the remaining ink flag associated with the color to be used. If the remaining ink flag associated with the color to be used is 0, that is, the remaining amount of ink of the color to be used is enough, then the program goes to step S407. In step S407, printing information is generated by converting image information into a form suitable for printing. Then in step S408 the generated printing information is output to the printer band by band.

If it is concluded in step S404 that the ink cartridge flag associated with the color to be used is 1, that is, the ink cartridge of the color to be used is not mounted on the printer, then the program goes to step S411 and the generation of printing information is temporarily stopped. Then in step S412, a message 1 is displayed. As in the case of Embodiment 1, the message 1 is displayed in a status window on the display screen as shown in FIG. 17. As shown in FIG. 17, the status window contains a message telling that a particular ink cartridge is not mounted on the printer and also telling the color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 17, if the execution button is selected, it is determined in step S413 shown in FIG. 4 that replacement of an ink cartridge has been performed, and the program then goes to step S301 shown in FIG. 3. In the case where the stop button is selected in the status window of FIG. 17, no ink cartridge is replaced in step S413 of FIG. 4, and it is determined in step S414 that a forced aborting command has been issued, and thus the generation of printing information is canceled and the program returns to step S402 and waits until a command telling that generation of printing information should be started is issued again.

In the case where the program has branched to step S301, a message 4 is displayed. As in the case of Embodiment 1, the message 4 is displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S402 of FIG. 4 and waits until a command telling that generation of printing information should be started is issued again. Alternatively, in the case where it has been determined in the above step S302 of FIG. 3 that a forced aborting command has been issued, the program may return to step S412 of FIG. 4 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the ink cartridge flag corresponding to the color of the cleaned ink cartridge is reset. Then in step S307, the generation of printing information is started again, and the program goes to step S405 of FIG. 4. Alternatively, in the above step S306 of FIG. 3, the flag may be reset by the printer itself instead of the host computer.

On the other hand, if it is concluded in step S405 of FIG. 4 that the no-ink flag associated with the color to be used is 1, that is, there is no ink of the color to be used in the ink cartridge, then the program goes to step S415 at which the generation of printing information is temporarily stopped. Then in step S416, a message 2 is displayed. As in the case of Embodiment 1 described above, the message 2 is also displayed in a status window on the display screen as shown in FIG. 18. As shown in FIG. 18, the status window contains a message telling that a particular ink cartridge has no ink in it and also telling the ink color of that cartridge. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 18, if the execution button is selected, it is determined in step S417 of FIG. 4 that replacement of the ink cartridge has been performed, and the program then goes to step S301 shown in FIG. 3. In the case where the stop button is selected in the status window of FIG. 18, no ink cartridge is replaced in step S417 of FIG. 4, and it is determined in step S418 that a forced aborting command has been issued, and thus the generation of printing information is canceled and the program returns to step S402 and waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 that a forced aborting command has been issued, and thus the generation of printing information is canceled and the program returns to step S402 of FIG. 4 and waits until a command telling that generation of printing information should be started is issued again. Alternatively, in the case where it has been determined in the above step S302 of FIG. 3 that a forced aborting command has been issued, the program may return to step S416 of FIG. 4 so that the message shown in FIG. 18 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307, the generation of printing information is started again, and the program goes to step S406 of FIG. 4. Alternatively, in the above step S306, the flag may be reset by the printer itself instead of the host computer.

In step S406, if it is concluded that the remaining ink flag associated with the color to be used is 1, that is the amount of ink of the color to be used remaining in the ink cartridge is not enough, then the program goes to step S419 at which the generation of printing information is temporarily stopped. Then in step S420, a message 3 is displayed. As in the case of Embodiment 1 described above, the message 3 is also displayed in a status window on the display screen as shown in FIG. 19. As shown in FIG. 19, the status window contains a message telling that the amount of remaining ink is not enough and thus printing will be stopped before completion if the amount of data to be printed is too large, and also telling the color of that ink. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 19, if the execution button is selected, it is determined in step S421 of FIG. 4 that replacement of the ink cartridge is complete, and the program then goes to step S301 shown in FIG. 3. In the case where the stop button is selected in the status window of FIG. 19, no ink cartridge is replaced in step S421 of FIG. 4, and it is determined in step S422 that a "neglect" command has been issued, and the program goes to step S423 to start generation of printing information again. The program then goes to step S407. Even in the case where only a small amount of ink remains, printing may be performed on a few further pages if the image to be printed has a low dot density as in the case of a usual document, almost all portions of which are in the form of characters. Therefore, the generation of printing information is not forced to be canceled in this case and the user can select whether the ink cartridge is immediately replaced by a new one or printing is performed without replacement of the ink cartridge.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S402 of FIG. 4 and waits until a command telling that generation of printing information should be started is issued again. Alternatively, in the case where it has been determined in the above step S302 of FIG. 3 that a forced aborting command has been issued, the program may return to step S420 of FIG. 4 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the remaining ink flag corresponding to the color of the cleaned ink cartridge is reset. Then in step S307, the generation of printing information is started again, and the program goes to step S407 of FIG. 4. Alternatively, in the above step S306 of FIG. 3, the flag may be reset by the printer itself instead of the host computer.

The above-described process of checking the flags in the steps S404, S405, and S406 and the succeeding process according to the result of the checking are performed repeatedly until it is concluded in step S409 of FIG. 4 that all image data (printing information) has been output. If it is concluded in step S409 that all image data (printing information) has been output, the program goes to step S410. If an "end" command is not issued in step S410, then the program returns to step S402 and waits for another command telling that generation of printing information should be started.

As in the previous embodiment, the host computer can know the printer status regarding the presence of ink cartridges, the lack of ink, and the amount of remaining ink. This feature of the present embodiment also provides a great advantage particularly when the printer is installed at a location rather far from the host computer or when the printer is shared by a plurality of computers via a network.

Furthermore, in this embodiment, because status detection regarding the ink cartridge flag, no-ink flag, and remaining ink flag, is performed only for the colors which are actually used in the printing operation, the status detection needs a short time and thus the overall printing process speed is also improved. Furthermore, the printing operation is not stopped unnecessarily by the status information regarding the colors which are not used in the printing operation.

Embodiment 3

Referring to the flowcharts shown in FIGS. 3, 5, 6, 7, and 8, the process of still another embodiment according to the present invention will be described below.

Figure 5:
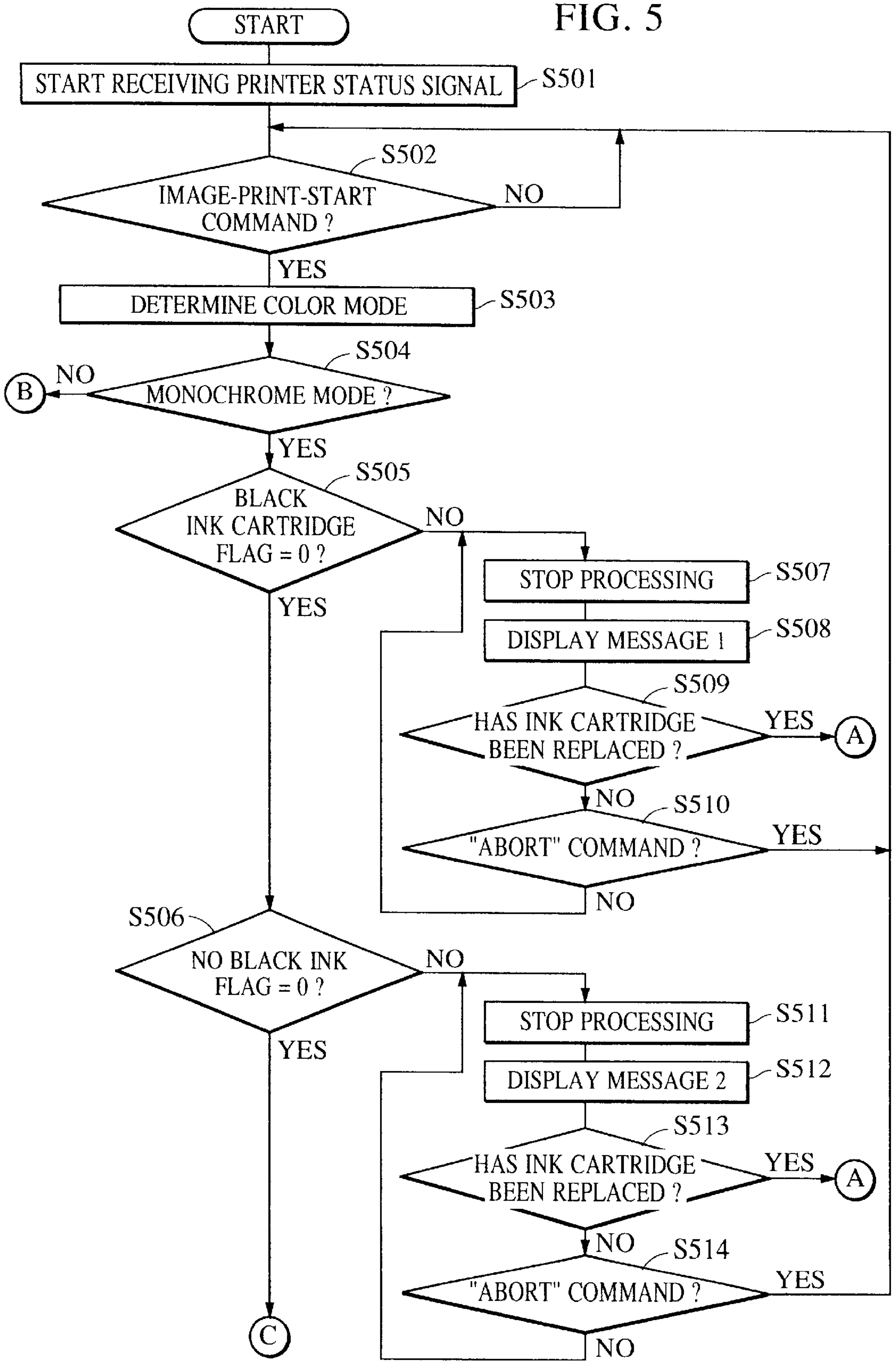
FIG. 5 is a flowchart illustrating the process relating to the detection of the color mode according to the embodiment of the present invention.

In step S501 shown in FIG. 5, the program begins with receiving status information from the printer. In step S502, if a command is received which indicates that generation of printing information should be started, then in step S503 the program determines the color mode to be used. The color mode may be designated by means of selecting operation via the control panel of the printer itself or via a menu of the printer driver displayed on the screen of the host computer. When the color mode is selected via the control panel of the printer, the printer itself acquires color mode status information wherein the color mode status is represented by the color mode flag in such a manner that the monochrome printing mode is denoted by a value of 0 in the color mode flag and the color printing mode is denoted by 1.

The program then goes to step S504. If it is determined that the current color mode is in the monochrome printing mode, then the program goes to step S505. In step S505, only the ink cartridge flag associated with black ink is examined. If the ink cartridge flag associated with black ink is 0, that is, an ink cartridge of black ink is mounted on the printer, then the program goes to step S506. In step S506, only the no-ink flag associated with black ink is examined. If the no-ink flag associated with black ink is 0, that is, there is ink in the ink cartridge for black ink, then the program goes to step S701. In step S701, only the remaining ink flag associated with black ink is examined. If the remaining ink flag associated with black ink is 0, that is, the remaining amount of black ink is enough, then the program goes to step S702. In step S702, printing information is generated by converting image information into a form suitable for printing band by band. Then in step S703 the generated printing information is output to the printer band by band.

If it is concluded in step S505 of FIG. 5 that the ink cartridge flag associated with black ink is 1, that is, the ink cartridge of black ink is not mounted on the printer, then the program goes to step S507 and the generation of printing information is temporarily stopped. Then in step S508, a message 1 is displayed. As in the case of Embodiment 1 described above, the message 1 is also displayed in a status window on the display screen as shown in FIG. 17. As shown in FIG. 17, the status window contains a message telling that an ink cartridge is not mounted on the printer and also telling the color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 17, if the execution button is selected, it is determined in step S509 that replacement of an ink cartridge has been performed, and the program then goes to step S301 shown in FIG. 3. In the case where the stop button is selected in the status window of FIG. 17, no ink cartridge is replaced in step S509, and it is determined in step S510 that an "abort" command has been issued, and thus the generation of printing information is canceled. The program then returns to step S502 and waits for a command indicating that generation of printing information should be started again.

In the case where the program has branched to step S301, message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 of FIG. 5 and waits until a command telling that generation of printing information should be started is issued again. Alternatively, in the case where it has been determined in the above step S302 of FIG. 3 that a forced aborting command has been issued, the program may return to step S508 of FIG. 5 so that the message shown in FIG. 15 will be displayed again in the status window. If the "execute" button is selected in the status window of FIG. 19, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag associated with black ink is reset. Then in step S307, the generation of printing information is started again, and the program goes to step S506 of FIG. 5. Alternatively, in the above step S306 of FIG. 3, the flag may be reset by the printer itself instead of the host computer.

On the other hand, if it is concluded in step S506 of FIG. 5 that the no-ink flag associated with black ink is 1, that is, there is no ink in the black ink cartridge, then the program goes to step S511 at which the generation of printing information is temporarily stopped. Then in step S511, a message 2 is displayed. As in the case of Embodiment 1 described above, the message 2 is also displayed in a status window on the display screen as shown in FIG. 18. As shown in FIG. 18, the status window contains a message telling that some ink cartridge has no ink in it and also telling the ink color of that cartridge. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 18, if the execution button is selected, it is determined in step S513 of FIG. 5 that replacement of the ink cartridge has been performed, and the program then goes to step S301 shown in FIG. 3. In the case where the stop button is selected in the status window of FIG. 18, ink cartridge replacement is not performed in step S513, and it is determined in step S514 that an "abort" command has been issued, and thus the generation of printing information is canceled. The program then returns to step S502 and waits for a command indicating that generation of printing information should be started again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 at which the program waits until a command telling that generation of printing information should be started is issued again. Alternatively, in the case where it has been determined in the above step S302 of FIG. 3 that a forced aborting command has been issued, the program may return to step S512 of FIG. 5 so that the message shown in FIG. 18 will be displayed again in the status window. If the "execute" button is selected in the status window of FIG. 19, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag associated with black ink is reset. Then in step S307, the generation of printing information is started again, and the program goes to step S701 of FIG. 7. Alternatively, in the above step S306 of FIG. 3, the flag may be reset by the printer itself instead of the host computer.

Figure 7:
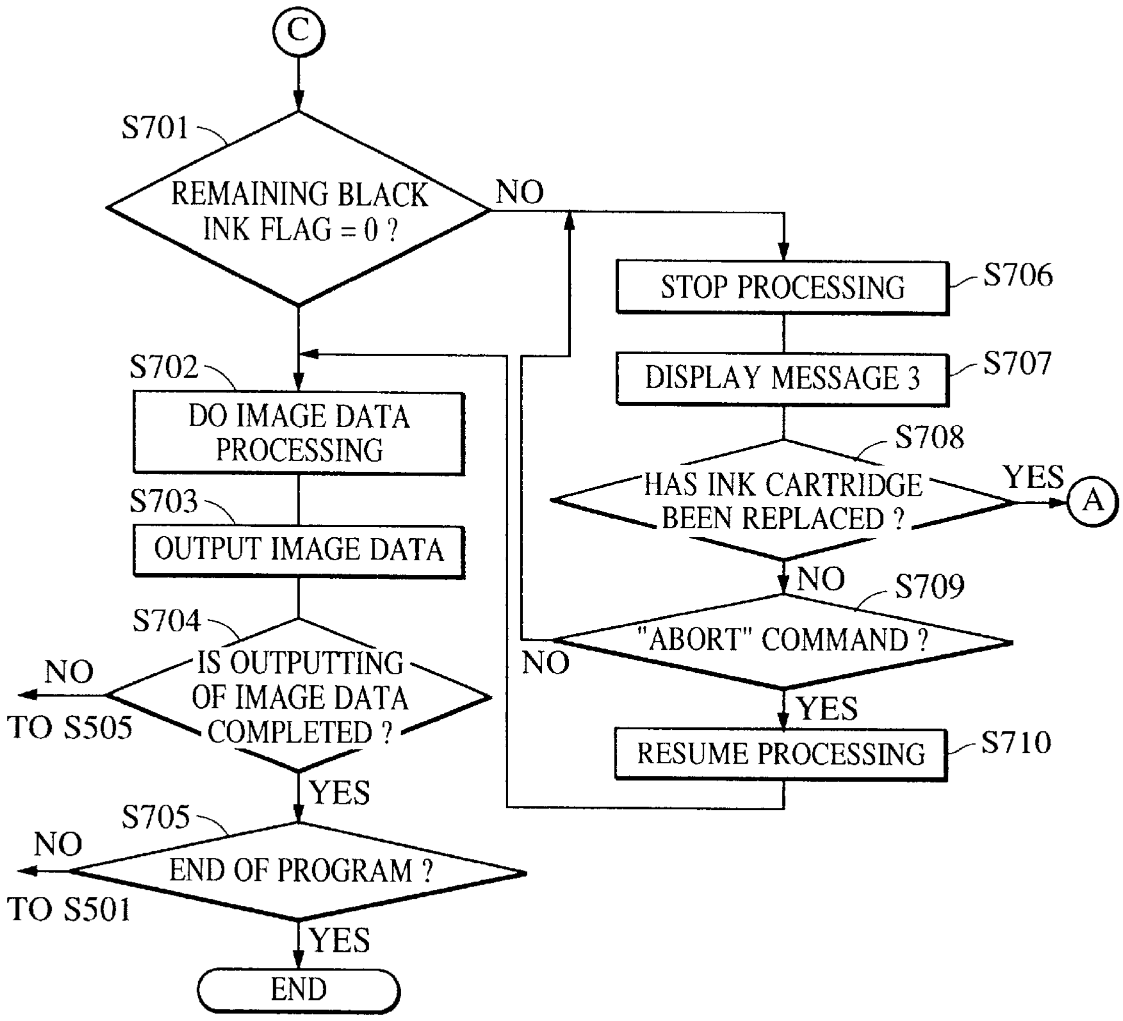
FIGS. 7 and 8 are flowcharts illustrating the process relating to the detection of the color mode and the process relating to the detection of the amount of remaining ink according to the embodiment of the present invention.

In step S701 of FIG. 7, if it is concluded that the remaining ink flag associated with black ink is 1, that is the remaining amount of black ink in the ink cartridge is not enough, then the program goes to step S706 at which the generation of printing information is temporarily stopped. Then in step S707, a message 3 is displayed. As in the case of Embodiment 1 described above, the message 3 is also displayed in a status window on the display screen as shown in FIG. 19. As shown in FIG. 19, the status window contains a message telling that the amount of remaining ink is not enough and thus printing will be stopped before completion if the amount of data to be printed is too large, and also telling the color of that ink. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 19, if the execution button is selected, it is determined in step S708 that replacement of the ink cartridge has been performed, and the program then goes to step S301 shown in FIG. 3. In the case where the stop button is selected in the status window of FIG. 19, ink cartridge replacement is not performed in step S708, and it is determined in step S709 that an "abort" command has been issued, and the program goes to step S710 to start generation of printing information again. The program then goes to step S702. Even in the case where only a small amount of ink remains, printing may be performed on a few further pages if the image to be printed has a low dot density as in the case of a usual document almost all portions of which are in the form of characters. Therefore, the generation of printing information is not forced to be canceled in this case and the user can select whether the ink cartridge is immediately replaced by a new one or printing is performed without replacement of the ink cartridge.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 at which the program waits until a command telling that generation of printing information should be started is issued again. Alternatively, in the case where it has been determined in the above step S302 of FIG. 3 that a forced aborting command has been issued, the program may return to step S707 of FIG. 7 so that the message shown in FIG. 19 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the remaining ink flag associated with black ink is reset. Then in step S307 of FIG. 3, the generation of printing information is started again, and the program goes to step S702 of FIG. 7. Alternatively, in the above step S306 of FIG. 3, the flag may be reset by the printer itself instead of the host computer.

The above-described process of checking the flags in steps S505, S506, and S507 and the succeeding process according to the result of the checking are performed repeatedly until it is concluded in step S704 of FIG. 7 that all image data (printing information) has been output. If it is concluded in step S701 of FIG. 7 that all image data (printing information) has been output, the program goes to step S705. If an "end" command is not issued in step S705, then the program returns to step S502 and waits for another command telling that generation of printing information should be started.

Figure 6:
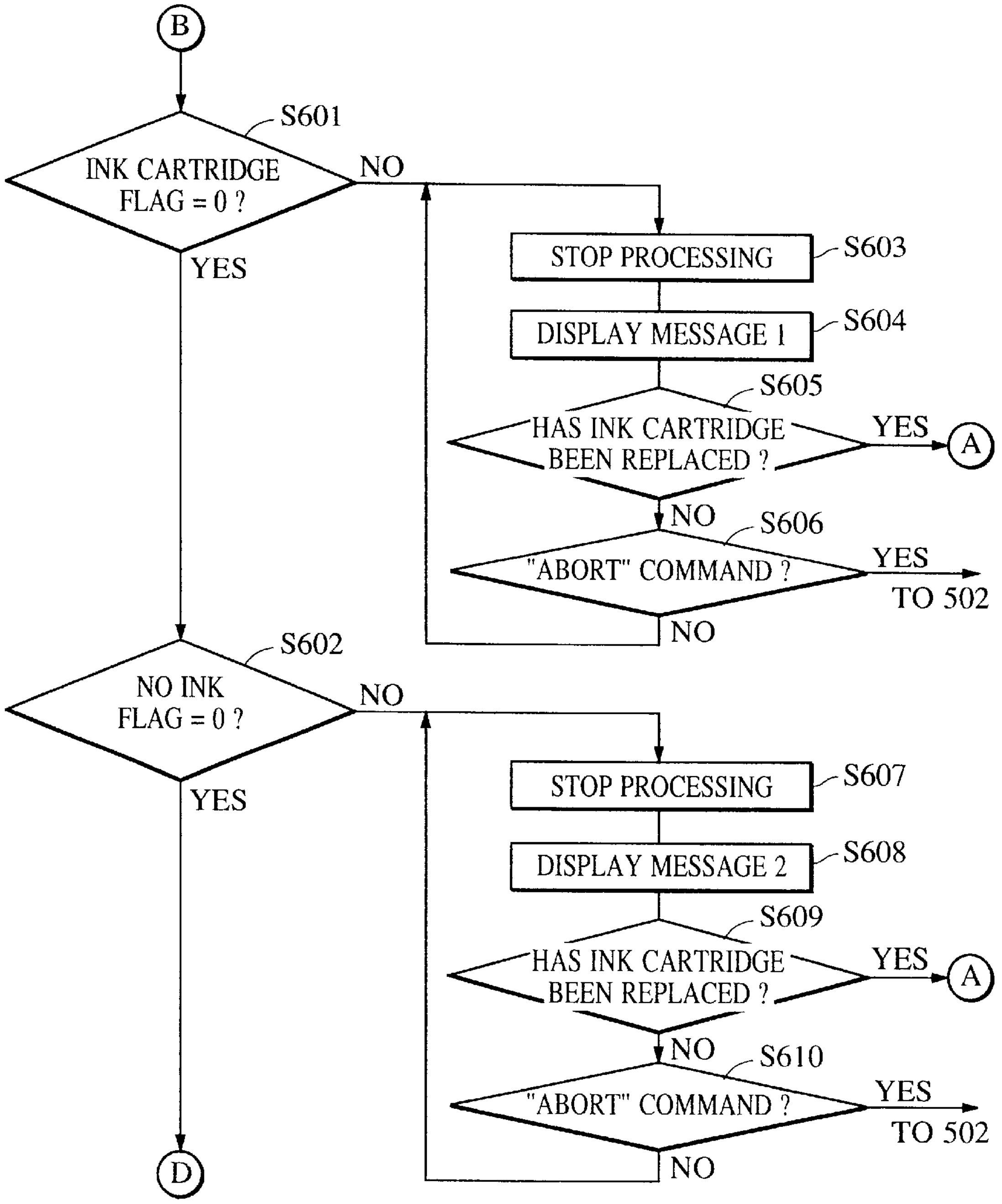
FIG. 6 is a flowchart illustrating the process relating to the detection of the color mode and the process in the color printing mode according to the embodiment of the present invention.

On the other hand, if it is concluded in step S504 that the current color mode is in the color printing mode, then the program goes to step S601 of FIG. 6. In step S601, the program checks all the ink cartridge flags associated with individual colors. If the ink cartridge flag is 0, that is, all ink cartridges are mounted on the printer, then the program goes to step S602. In step S602, the program checks all the no-ink flags associated with individual colors. If all the no-ink flags are 0, that is, there is ink in all the ink cartridges, then the program goes to step S711 of FIG. 8. In step S711, the program checks all the remaining ink flags associated with individual colors. If all the remaining ink flags are 0, that is, the remaining amounts of ink are much enough, then the program goes to step S712. In step S712, printing information is generated by converting image data into a form suitable for printing. Then in step S713 the generated image data (printing information) is output to the printer.

If it is concluded in step S601 that the ink cartridge flag associated with a particular color is 1, that is, an ink cartridge of a particular color is not mounted on the printer, then the program goes to step S603 and the generation of printing information is temporarily stopped. Then in step S604, a message 1 is displayed. As in the case of Embodiment 1 described above, the message 1 is also displayed in a status window on the display screen as shown in FIG. 17. As shown in FIG. 17, the status window contains a message telling that some ink cartridge is not mounted on the printer and also telling the color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 17, if the execution button is selected, it is determined in step S605 shown in FIG. 6 that replacement of an ink cartridge has been performed, and the program then goes to step S301 shown in FIG. 3. In the case where the stop button is selected in the status window of FIG. 17, no ink cartridge is replaced in step S605 of FIG. 6, and it is determined in step S606 that a forced aborting command has been issued, and thus the generation of printing information is canceled and the program returns to step S502 of FIG. 5 and waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 of FIG. 5 and waits until a command telling that generation of printing information should be started is issued again. Alternatively, in the case where it has been concluded in the above step S302 of FIG. 3 that a forced aborting command has been issued, the program may return to step S604 of FIG. 6 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the remaining ink flag associated with the corresponding color is reset. Then in step S307, the generation of printing information is started again, and the program goes to step S602 of FIG. 6. Alternatively, in the above step S306 of FIG. 3, the flag may be reset by the printer itself instead of the host computer.

On the other hand, if it is concluded in step S602 of FIG. 6 that the no-ink flag associated with some color is 1, that is, there is no ink in some ink cartridge, then the program goes to step S607 at which the generation of printing information is temporarily stopped. Then in step S608, a message 2 is displayed. As in the case of Embodiment 1 described above, the message 2 is also displayed in a status window on the display screen as shown in FIG. 18. As shown in FIG. 18, the status window contains a message telling that a particular ink cartridge has no ink in it and also telling the ink color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 18, if the execution button is selected, it is determined in step S609 that replacement of an ink cartridge has been performed, and the program then goes to step S301 shown in FIG. 3. In the case where the stop button is selected in the status window of FIG. 18, ink cartridge replacement is not performed in step S609, and it is determined in step S610 that a forced aborting command has been issued, and thus the generation of printing information is canceled and the program returns to step S502 of FIG. 5 and waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 of FIG. 5 and waits until a command telling that generation of printing information should be started is issued again. Alternatively, in the case where it has been concluded in the above step S302 of FIG. 3 that a forced aborting command has been issued, the program may return to step S608 of FIG. 6 so that the message shown in FIG. 18 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307, the generation of printing information is started again, and the program goes to step S711 of FIG. 8. Alternatively, in the above step S306 of FIG. 3, the flag may be reset by the printer itself instead of the host computer.

Figure 8:
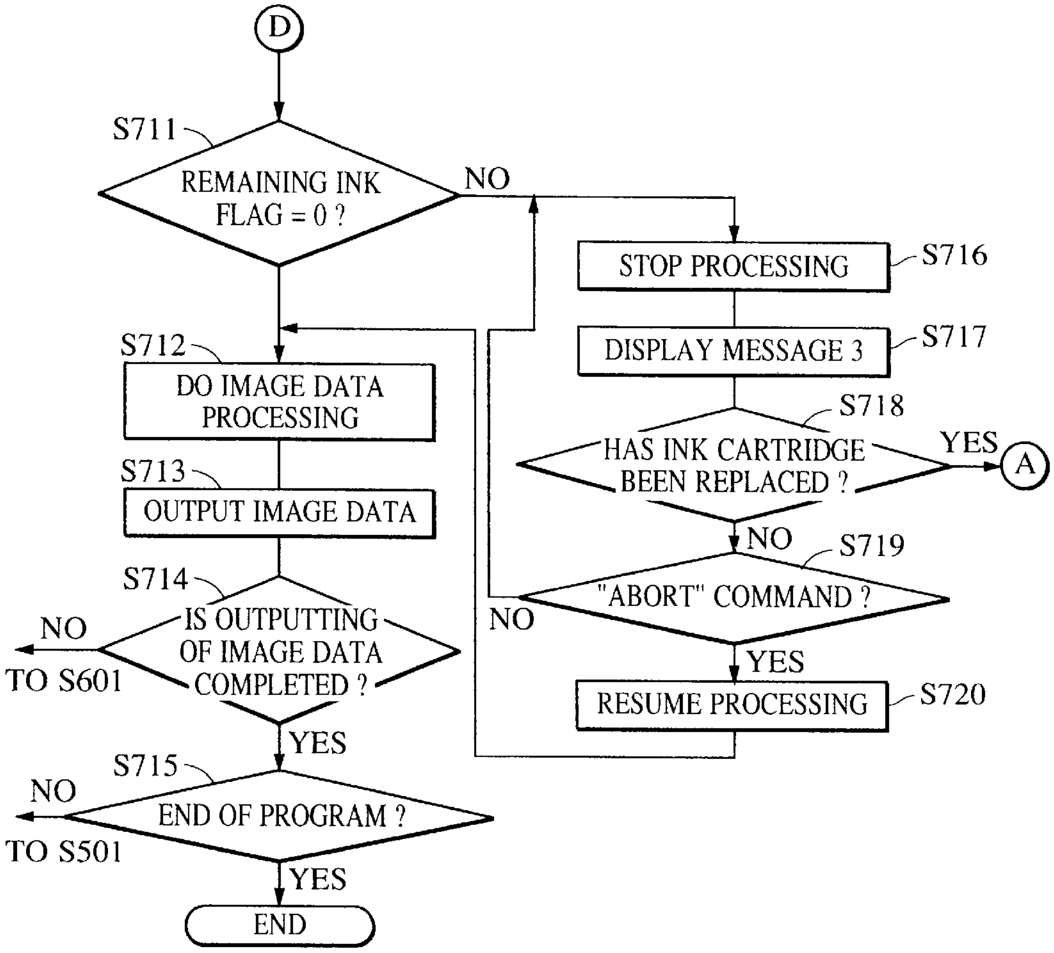

In step S711 of FIG. 8, if it is concluded that a particular remaining ink flag is 1, that is the remaining amount of ink in a particular ink cartridge is not enough, then the program goes to step S716 at which the generation of printing information is temporarily stopped. Then in step S717, a message 3 is displayed. As in the case of Embodiment 1 described above, the message 3 is also displayed in a status window on the display screen as shown in FIG. 19. As shown in FIG. 19, the status window contains a message telling that the remaining amount of ink is not enough and thus printing will be stopped before completion if the amount of data to be printed is too large, and also telling the color of that ink. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 19, if the execution button is selected, it is determined in step S718 of FIG. 8 that replacement of the ink cartridge is complete, and the program then goes to step S301 shown in FIG. 3. In the case where the stop button is selected in the status window of FIG. 19, ink cartridge replacement is not performed in step S718, and it is determined in step S719 that an "abort" command has been issued, and the program goes to step S720 to start generation of printing information again. The program then goes to step S712. Even in the case where only a small amount of ink remains, printing may be performed on a few further pages if the image to be printed has a low dot density as in the case of a usual document, almost all portions of which are in the form of characters. Therefore, the generation of printing information is not forced to be canceled in this case and the user can select whether the ink cartridge is immediately replaced by a new one or printing is performed without replacement of the ink cartridge.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 of FIG. 5 and waits until a command telling that generation of printing information should be started is issued again. Alternatively, in the case where it has been concluded in the above step S302 of FIG. 3 that a forced aborting command has been issued, the program may return to step S717 of FIG. 8 so that the message shown in FIG. 19 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the remaining ink flag corresponding to the color of the cleaned ink cartridge is reset. Then in step S307, the generation of printing information is started again, and the program goes to step S712 of FIG. 8. Alternatively, in the above step S306 of FIG. 3, the flag may be reset by the printer itself instead of the host computer.

The above-described process of checking the flags in steps S601 and S602 of FIG. 6 and step S711 of FIG. 8 and the succeeding process according to the result of the checking are performed repeatedly until it is concluded in step S714 of FIG. 8 that all image data (printing information) has been output. If it is concluded in step S714 that all image data (printing information) has been output, the program goes to step S715. If an "end" command is not issued in step S715, then the program returns to step S502 of FIG. 5 and waits for another command telling that generation of printing information should be started.

As in the previous embodiments, the host computer can know the printer status regarding the presence of ink cartridges, the lack of ink, and the amount of remaining ink. This feature of the present embodiment also provides a great advantage particularly when the printer is installed at a location rather far from the host computer or when the printer is shared by a plurality of computers via a network.

Furthermore in the present embodiment, the detection of the ink cartridge flags, no-ink flags, and remaining ink flags is performed depending on the designated color mode, and thus the detection time is reduced when operating in the monochrome printing mode in which only black ink is used, which results in an improvement in the printing speed. This also prevents the printing operation from being unnecessarily stopped by status information regarding an ink color which is not used. Furthermore, in this embodiment it is not required to determine which color should be used in printing, and therefore the processing load associated with handling of image data is reduced.

Embodiment 4

Referring now to the flowcharts shown in FIGS. 3, 5, 6, 9 and 10, the process of a fourth embodiment according to the present invention will be described below.

In step S501 shown in FIG. 5, the program begins with receiving status information from the printer. In step S502, if a command is received which indicates that generation of printing information should be started, then in step S503 the program determines the color mode to be used. The color mode may be designated by means of selecting operation via the control panel of the printer itself or via a menu of the printer driver displayed on the screen of the host computer. When the color mode is selected via the control panel of the printer, the printer itself acquires color mode status information wherein the color mode status is represented by the color mode flag in such a manner that the monochrome printing mode is denoted by a value of 0 in the color mode flag and the color printing mode is denoted by 1.

The program then goes to step S504. If it is determined that the current color mode is in the monochrome printing mode, then the program goes to step S505. In step S505, only the ink cartridge flag associated with black ink is examined. If the ink cartridge flag associated with black ink is 0, that is, an ink cartridge of black ink is mounted on the printer, then the program goes to step S506. In step S506, only the no-ink flag associated with black ink is examined. If the no-ink flag associated with black ink is 0, that is, there is ink in the black ink cartridge, then the program goes to step S801. In step S801, only the remaining ink flag associated with black ink is examined. If the remaining ink flag associated with black ink is 0, that is, the remaining amount of black ink is enough, then the program goes to step S802. In step S802, printing information is generated by converting image data into a form suitable for printing. Then in step S803 the generated image data (printing information) is output to the printer.

If it is concluded in step S505 of FIG. 5 that the ink cartridge flag associated with black ink is 1, that is, the ink cartridge of black ink is not mounted on the printer, then the program goes to step S507 and the generation of printing information is temporarily stopped. Then in step S508, a message 1 is displayed. As in the case of Embodiment 1 described above, the message 1 is also displayed in a status window on the display screen as shown in FIG. 17. As shown in FIG. 17, the status window contains a message telling that a particular ink cartridge is not mounted on the printer and also telling the color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 17, if the execution button is selected, it is determined in step S509 shown in FIG. 5 that replacement of an ink cartridge has been performed, and the program then goes to step S301 shown in FIG. 3. In the case where the stop button is selected in the status window of FIG. 17, ink cartridge replacement is not performed in step S509 of FIG. 5, and it is determined in step S510 that an "abort" command has been issued, and the generation of printing information is canceled. In this case, the program returns to step S502 in which the program waits for a command telling that generation of printing information should be started.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 at which the program waits until a command telling that generation of printing information should be started is issued again. Alternatively, in the case where it has been concluded in the above step S302 of FIG. 3 that a forced aborting command has been issued, the program may return to step S508 of FIG. 5 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag associated with black ink is reset. Then in step S307 of FIG. 3, the generation of printing information is started again, and the program goes to step S506 of FIG. 5. Alternatively, in the above step S306 of FIG. 3, the flag may be reset by the printer itself instead of the host computer.

On the other hand, if it is concluded in step S506 of FIG. 5 that the no-ink flag associated with black ink is 1, that is, there is no ink in the black ink cartridge, then the program goes to step S511 at which the generation of printing information is temporarily stopped. Then in step S511, a message 2 is displayed. As in the case of Embodiment 1 described above, the message 2 is also displayed in a status window on the display screen as shown in FIG. 18. As shown in FIG. 18, the status window contains a message telling that a particular ink cartridge has no ink in it and also telling the ink color of that cartridge. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 18, if the execution button is selected, it is determined in step S513 of FIG. 5 that replacement of the ink cartridge has been performed, and the program then goes to step S301 shown in FIG. 3. In the case where the stop button is selected in the status window of FIG. 18, no ink cartridge is replaced in step S513 of FIG. 5, and it is determined in step S514 that a forced aborting command has been issued, and thus the generation of printing information is canceled and the program returns to step S502 and waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 of FIG. 5 and waits until a command telling that generation of printing information should be started is issued again. Alternatively, in the case where it has been concluded in the above step S302 of FIG. 3 that a forced aborting command has been issued, the program may return to step S512 of FIG. 5 so that the message shown in FIG. 18 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag associated with black ink is reset. Then in step S307 of FIG. 3, the generation of printing information is started again, and the program goes to step S801 of FIG. 9. Alternatively, in the above step S306 of FIG. 3, the flag may be reset by the printer itself instead of the host computer.

Figure 9:
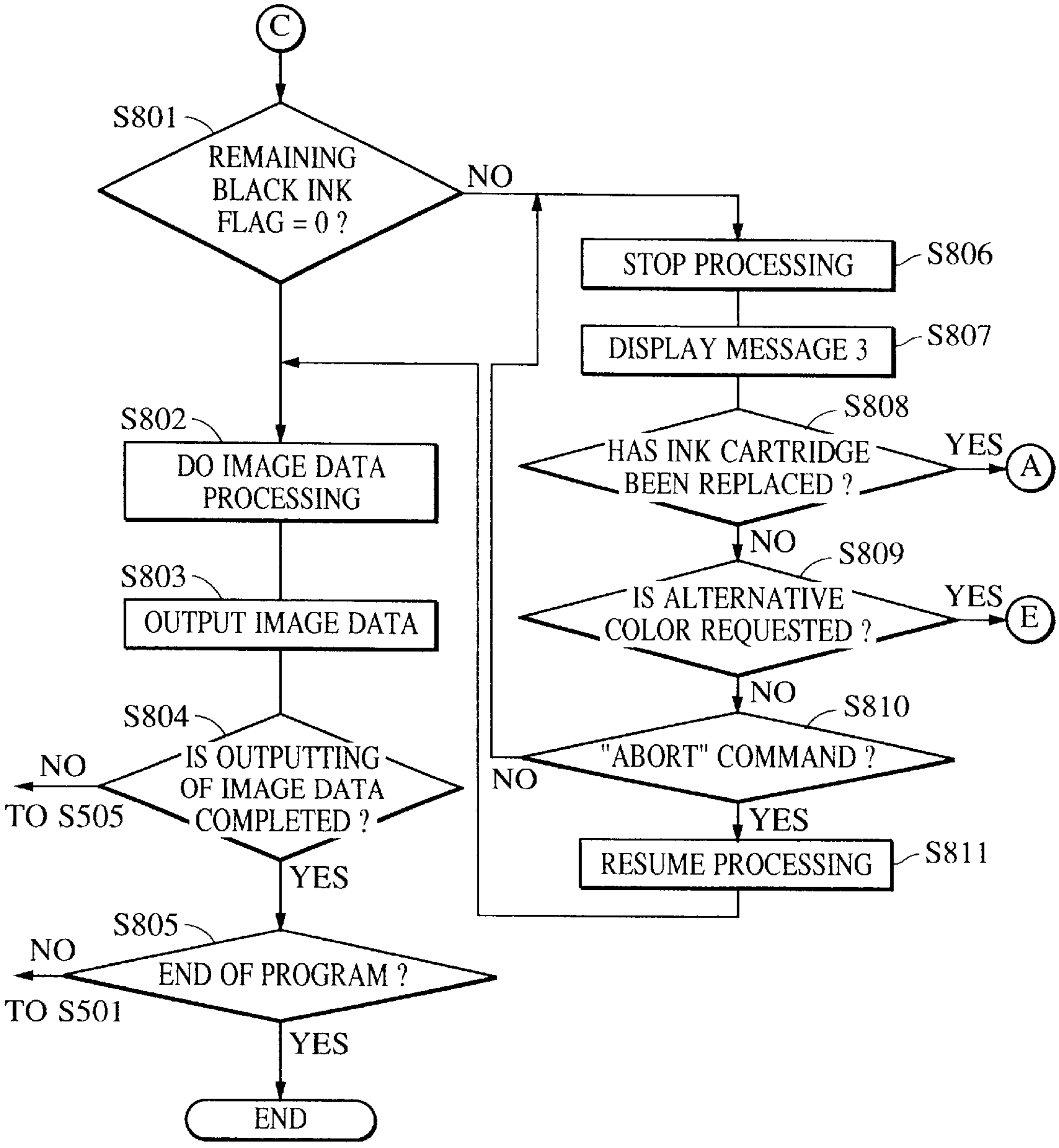
FIGS. 9 and 10 are flowcharts illustrating the process relating to the detection of the color mode and the process relating to the detection of the amount of remaining ink according to another embodiment of the present invention.
Figure 21:
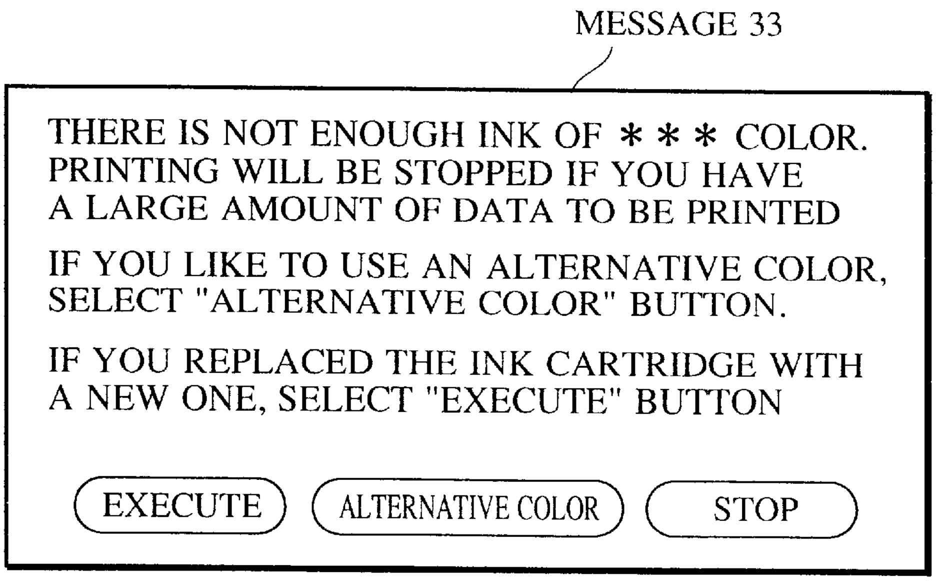
FIG. 21 is a schematic representation of a message 33 displayed in a status window to warn that the remaining amount of a particular ink is very small, and to ask a user whether he/she wants to use an alternative color ink.

In step S801 of FIG. 9, if it is concluded that the remaining ink flag associated with black ink is 1, that is the remaining amount of black ink in the ink cartridge is not enough, then the program goes to step S806 at which the generation of printing information is temporarily stopped. Then in step S807, a message 33 is displayed. The message 33 is displayed in a status window on the display screen as shown in FIG. 21. As shown in FIG. 21, the status window contains a message telling that the amount of remaining ink is not enough and thus printing will be stopped before completion if the amount of data to be printed is too large, and also telling the color of that ink. The status window also contains "execute", "alternative color" and "stop" buttons. Either button may be selected via input means such as a mouse or a keyboard of the host computer, so that the selected operation will be executed. After replacing the corresponding ink cartridge by a new one according to the message shown in FIG. 21, if the execution button is selected, it is determined in step S808 of FIG. 9 that replacement of the ink cartridge is complete, and the program then goes to step S301 shown in FIG. 3. In the case where the stop button is selected in the status window of FIG. 21, ink cartridge replacement is not performed in step S808 of FIG. 9. In this case it is determined in step S809 that use of an alternative color is not desired, and further in step S810 it is determined that a "neglect" command has been issued. Thus the program goes to step S811 to start generation of printing information again. The program then goes to step S802. Even in the case where only a small amount of ink remains, printing may be performed on a few further pages if the image to be printed has a low dot density as in the case of a usual document, almost all portions of which are in the form of characters. Therefore, the generation of printing information is not forced to be canceled in this case and the user can select whether the ink cartridge is immediately replaced by a new one or printing is performed without replacement of the ink cartridge.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 of FIG. 5 and waits until a command telling that generation of printing information should be started is issued again. Alternatively, in the case where it has been concluded in the above step S302 of FIG. 3 that a forced aborting command has been issued, the program may return to step S807 of FIG. 9 so that the message shown in FIG. 21 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag associated with black ink is reset. Then in step S307, the generation of printing information is started again, and the program goes to step S802 of FIG. 9. Alternatively, in the above step S306 of FIG. 3, the flag may be reset by the printer itself instead of the host computer.

Figure 23:
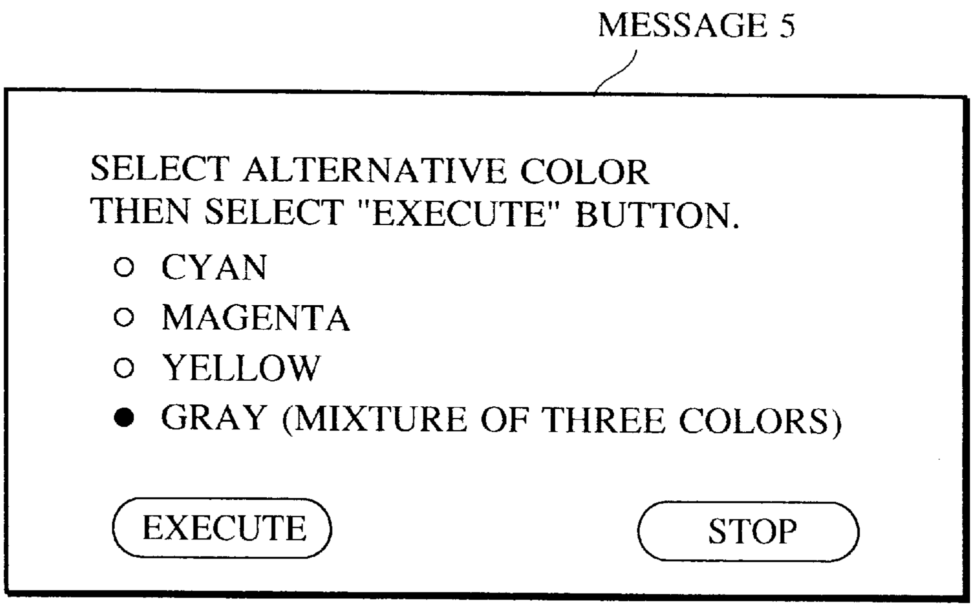
FIG. 23 is a schematic representation of a message 5 displayed in a status window to ask a user which color ink should be used as an alternative color ink.

In the case where the "alternative color" button is selected according to the message shown in the window of FIG. 21, ink cartridge replacement in step S808 of FIG. 9 is not performed and it is determined in step S809 that use of an alternative color is requested. In this case, the program goes to step S901 of FIG. 11 in which a message 5 is displayed. The message 5 is displayed in a window on the display screen as shown in FIG. 23. As shown in FIG. 23, the window contains color selection buttons for selecting an alternative color from the group including cyan, magenta, yellow, and gray which is a mixture of the above three colors. The window also contains "execute" and "stop" buttons as well as an instruction message. Either button may be selected via input means such as a mouse or a keyboard of the host computer, so that the selected operation will be executed. If "gray" (mixture of three colors) is selected, printing is performed with a color similar to black which is produced by properly mixing cyan, magenta, and yellow.

Alternative colors are not limited to the above four colors. Red, green, blue, or other colors may also be added to the selection list.

Figure 11:
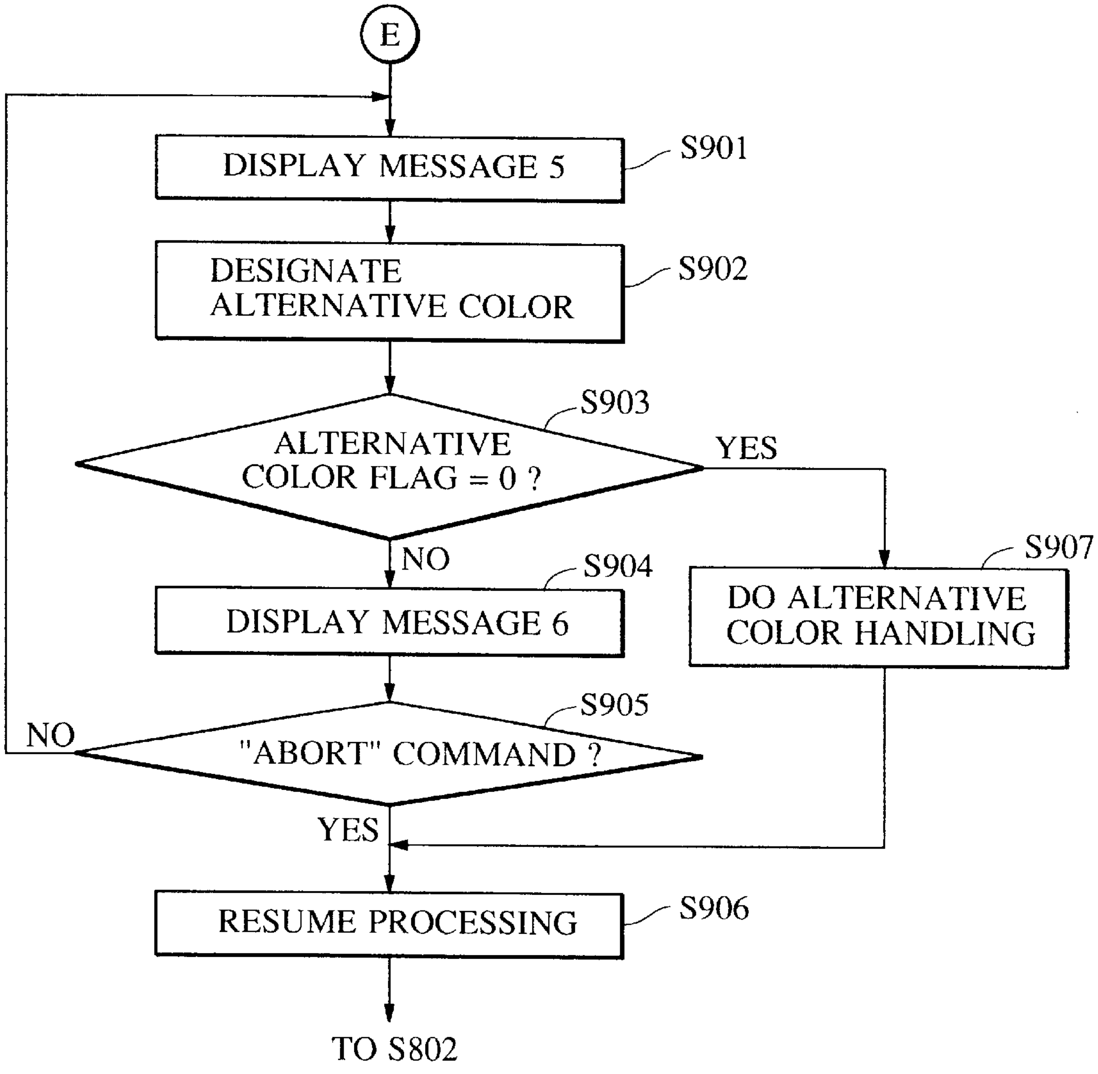
FIG. 11 is a flowchart illustrating the process relating to the designation of an alternative color ink according to the embodiment of the present invention.

In the case where the stop button in the status window of FIG. 23 is selected, it is determined in step S905 of FIG. 11 that a forced aborting command has been issued, and thus the program goes to step S802 of FIG. 9. Alternatively, in the case where the "stop" button is selected in the window of FIG. 23, the program may return to step S807 so that the immediately previous message will be displayed again in the status window.

In the case where one color is selected from the alternative color group in the window of FIG. 23, and the "execute" button is further selected, the selected color is designated as the alternative color in step S902 of FIG. 11. The program then goes to step S903. In step S903, the ink cartridge flag, no-ink flag, and the remaining ink flag associated with the designated alternative color are examined. If all these flags are 0, that is, the ink of the designated color is available, then the program goes to step S907 in which the printing mode is switched to an alternative color mode. Then in step S906, the generation of printing information is started again. The program then goes to step S802 of FIG. 9. In the alternative color mode, the image data (printing information) processing in step S803 is performed in such a manner that monochrome (black) data is replaced by alternative color data and the resultant image data (printing information) is output.

In step S903 of FIG. 11, if at least of one of flags including the ink cartridge flag, no-ink flag, and remaining ink flag associated with the designated alternative color is 1, the designated color is not available. In this case, a message 6 is displayed in step S904.

Figure 24:
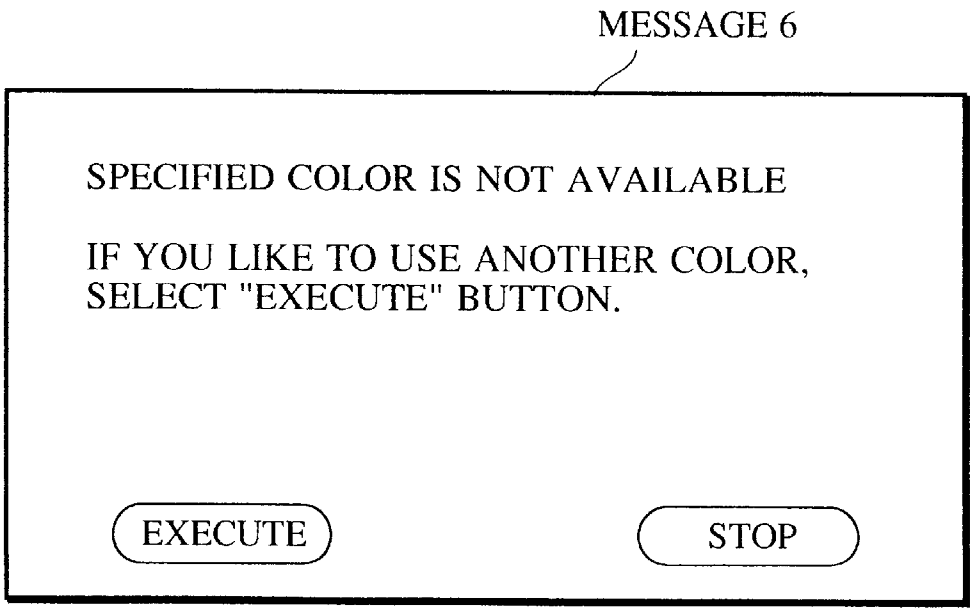
FIG. 24 is a schematic representation of a message 6 displayed in a status window to tell that the designated alternative color ink is not available.

The message 6 is displayed in a status window on the display screen as shown in FIG. 24. The status window, as shown in FIG. 24, contains a message telling that the color designated as the alternative color is not available and also contains "execute" and "stop" buttons. Either button may be selected via input means such as a mouse or a keyboard of the host computer, so that the selected operation will be executed.

In the case where the stop button is selected, it is determined in step S905 of FIG. 11 that a forced aborting command has been issued, and thus the program goes to step S802 of FIG. 9. If the "execute" button is selected, the program returns to step S901 of FIG. 11 in which the message 5 is displayed again. Alternatively, in the case where the "stop" button is selected in the window of FIG. 24, the program may return to step S807 of FIG. 9 so that the message shown in FIG. 21 will be displayed again in the status window.

Once the alternative color has been selected, detection of the ink cartridge flag, no-ink flag, and remaining ink flag is performed only for those associated with the designated alternative color, during the following process steps until outputting of all image data (printing information) is completed.

The above-described process of checking the flags in steps S505 and S506 of FIG. 5 and step S801 of FIG. 9 and the succeeding process according to the result of the checking are performed repeatedly until it is concluded in step S804 of FIG. 9 that all image data (printing information) has been output. In the alternative color mode, the checking of the ink cartridge flag in step S505 of FIG. 5, the no-ink flag in step S506 of FIG. 5, and the remaining ink flag in step S801 of FIG. 9, and is performed only for those associated with the designated alternative color during the above-described repetition of process steps until all image data (printing information) has been output.

If it is concluded in step S804 that all image data (printing information) has been output, the program goes to step S805. If an "end" command is not issued in step S805, then the program returns to step S502 of FIG. 5 and waits for another command telling that generation of printing information should be started.

On the other hand, if it is concluded in step S504 of FIG. 5 that the current color mode is in the color printing mode, then the program goes to step S601 of FIG. 6. In step S601, the program checks all the ink cartridge flags associated with individual colors. If the ink cartridge flag is 0, that is, all ink cartridges are mounted on the printer, then the program goes to step S602. In step S602, the program checks all the no-ink flags associated with individual colors. If all the no-ink flags are 0, that is, there is ink in all ink cartridges, then the program goes to step S812 of FIG. 9. In step S812, the program checks all the remaining ink flags associated with individual colors. If all the remaining ink flags are 0, that is, the remaining amounts of ink are enough, then the program goes to step S813. In step S813, printing information is generated by converting image data into a form suitable for printing. Then in step S814 the generated image data (printing information) is output to the printer.

If it is concluded in step S601 of FIG. 6 that a particular ink cartridge flag is 1, that is, an ink cartridge of a particular color is not mounted on the printer, then the program goes to step S603 and the generation of printing information is temporarily stopped. Then in step S604, a message 1 is displayed. As in the case of Embodiment 1 described above, the message 1 is also displayed in a status window on the display screen as shown in FIG. 17. As shown in FIG. 17, the status window contains a message telling that a particular ink cartridge is not mounted on the printer and also telling the color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 17, if the "execute" button is selected, it is determined in step S605 of FIG. 6 that replacement of an ink cartridge has been performed, and thus the program goes to step S301 of FIG. 3. In the case where the stop button is selected in the status window of FIG. 17, ink cartridge replacement is not performed in step S605 of FIG. 6, and it is determined in step S606 that a forced aborting command has been issued, and thus the generation of printing information is canceled and the program returns to step S502 in which the program waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 of FIG. 5 and waits until a command telling that generation of printing information should be started is issued again. Alternatively, in the case where it has been concluded in the above step S302 of FIG. 3 that a forced aborting command has been issued, the program may return to step S604 of FIG. 6 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307, the generation of printing information is started again, and the program goes to step S602 of FIG. 6. Alternatively, in the above step S306 of FIG. 3, the flag may be reset by the printer itself instead of the host computer.

On the other hand, if it is concluded in step S602 of FIG. 6 that the no-ink flag associated with a particular color is 1, that is, there is no ink in a particular ink cartridge, then the program goes to step S607 at which the generation of printing information is temporarily stopped. Then in step S608, a message 2 is displayed. As in the case of Embodiment 1 described above, the message 2 is also displayed in a status window on the display screen as shown in FIG. 18. As shown in FIG. 18, the status window contains a message telling that a particular ink cartridge has no ink in it and also telling the ink color of that cartridge. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 18, if the "execute" button is selected, it is determined in step S609 that replacement of the ink cartridge has been performed, and thus the program goes to step S301 shown in FIG. 3. In the case where the stop button is selected in the status window of FIG. 18, ink cartridge replacement is not performed in step S606, and it is determined in step S610 that a forced aborting command has been issued, and thus the generation of printing information is canceled and the program returns to step S502 of FIG. 5 in which the program waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 of FIG. 5 and waits until a command telling that generation of printing information should be started is issued again. Alternatively, in the case where it has been concluded in the above step S302 of FIG. 3 that a forced aborting command has been issued, the program may return to step S608 of FIG. 6 so that the message shown in FIG. 18 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307, the generation of printing information is started again, and the program goes to step S711 of FIG. 8. Alternatively, in the above step S306 of FIG. 3, the flag may be reset by the printer itself instead of the host computer.

Figure 10:
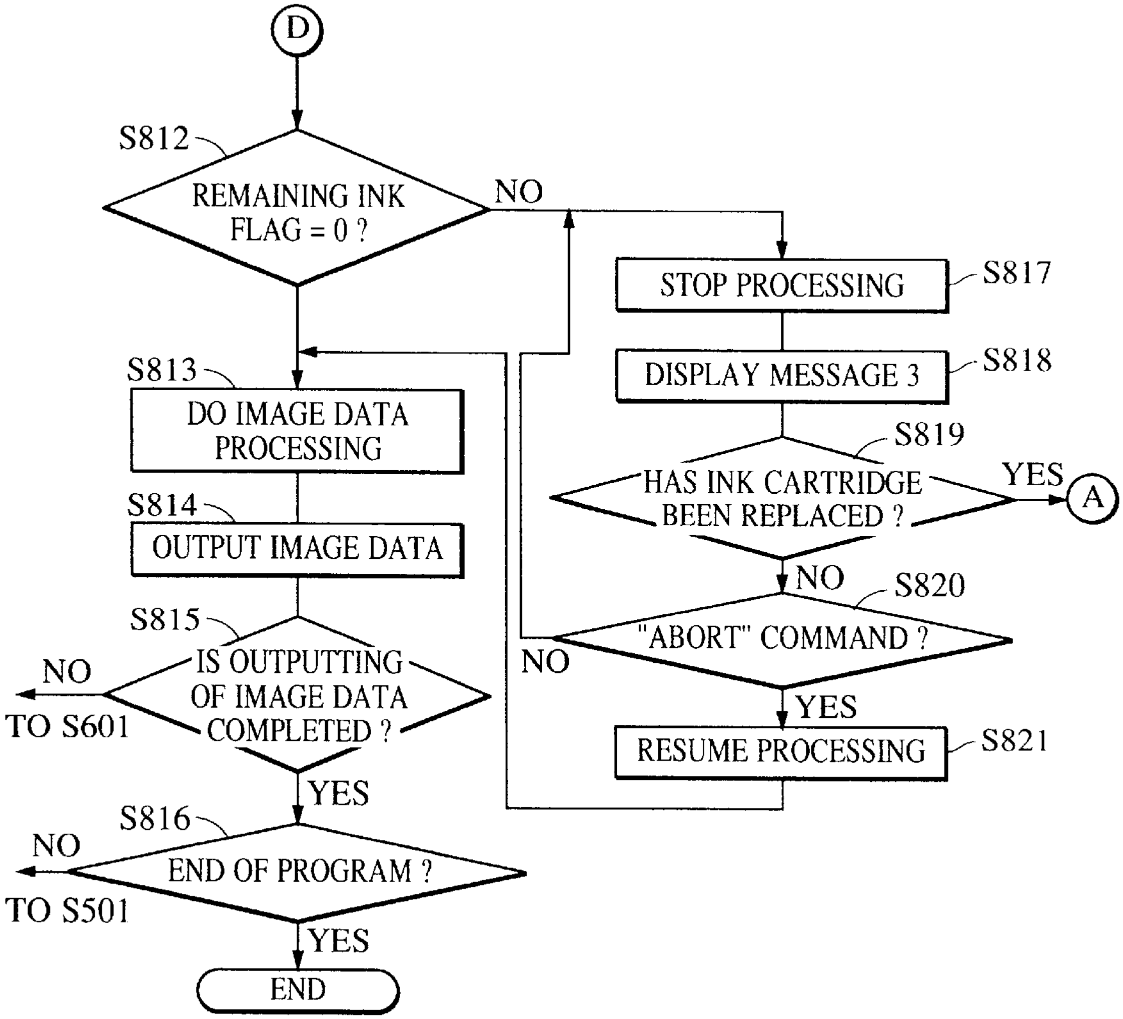

In step S812 of FIG. 10, if it is concluded that a particular remaining ink flag is 1, that is, the remaining amount of ink in a particular color ink cartridge is not enough, then the program goes to step S817 at which the generation of printing information is temporarily stopped. Then in step S818, a message 3 is displayed. As in the case of Embodiment 1 described above, the message 3 is also displayed in a status window on the display screen as shown in FIG. 19. The status window, as shown in FIG. 19, contains a message telling that the remaining amount of ink is not enough and thus printing will be stopped before completion if the amount of data to be printed is too large, and also telling the color of that ink. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 19, if the execution button is selected, it is determined in step S819 of FIG. 10 that replacement of the ink cartridge is complete, and the program then goes to step S301 shown in FIG. 3. In the case where the stop button is selected in the status window of FIG. 19, no ink cartridge is replaced in step S819 of FIG. 10, and it is determined in step S820 that an "abort" command has been issued, and the program goes to step S821 to start generation of printing information again. The program then goes to step S813. Even in the case where only a small amount of ink remains, printing may be performed on a few further pages if the image to be printed has a low dot density as in the case of a usual document, almost all portions of which are in the form of characters. Therefore, the generation of printing information is not forced to be canceled in this case and the user can select whether the ink cartridge is immediately replaced with a new one or printing is performed without replacement of the ink cartridge.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S502 of FIG. 5 and waits until a command telling that generation of printing information should be started is issued again. Alternatively, in the case where it has been concluded in the above step S302 of FIG. 3 that a forced aborting command has been issued, the program may return to step S808 of FIG. 9 so that the message shown in FIG. 19 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the remaining ink flag corresponding to the color of the cleaned ink cartridge is reset. Then in step S307, the generation of printing information is started again, and the program goes to step S813 of FIG. 10. Alternatively, in the above step S306 of FIG. 3, the flag may be reset by the printer itself instead of the host computer.

The above-described process of checking the flags in steps S601 and S602 of FIG. 6 and step S812 of FIG. 10 and the succeeding process according to the result of the checking are performed repeatedly until it is concluded in step S815 of FIG. 10 that all image data (printing information) has been output. If it is concluded in step S815 that all image data (printing information) has been output, the program goes to step S816. If an "end" command is not issued in step S816, then the program returns to step S502 of FIG. 5 and waits for another command telling that generation of printing information should be started.

As in the previous embodiments, the host computer can know the printer status regarding the presence of ink cartridges, the lack of ink, and the amount of remaining ink. This feature of the present embodiment also provides a great advantage particularly when the printer is installed at a location rather far from the host computer or when the printer is shared by a plurality of computers via a network.

Furthermore in the present embodiment, the detection of the ink cartridge flags, no-ink flags, and remaining ink flags is performed depending on the designated color mode, and thus the detection time is reduced when operating in the monochrome printing mode in which only black ink is used, which results in an improvement in the printing speed. This also prevents the printing operation from being unnecessarily stopped by status information regarding an ink color which is not used. Furthermore, in this embodiment it is not required to determine which color should be used in printing, and therefore the processing load associated with handling of image data is reduced. In this embodiment, even if the remaining amount of black ink becomes very small during a printing operation in the monochrome printing mode, it is possible to continue the printing operation by designating an alternative color without replacing the ink cartridge with a new one. This provides an advantage particularly when the printing operation has to be completed without a delay.

Embodiment 5

Referring to the flowcharts shown in FIGS. 3, 12 and 13, the process of a fifth embodiment according to the present invention will be described below.

Figure 12:
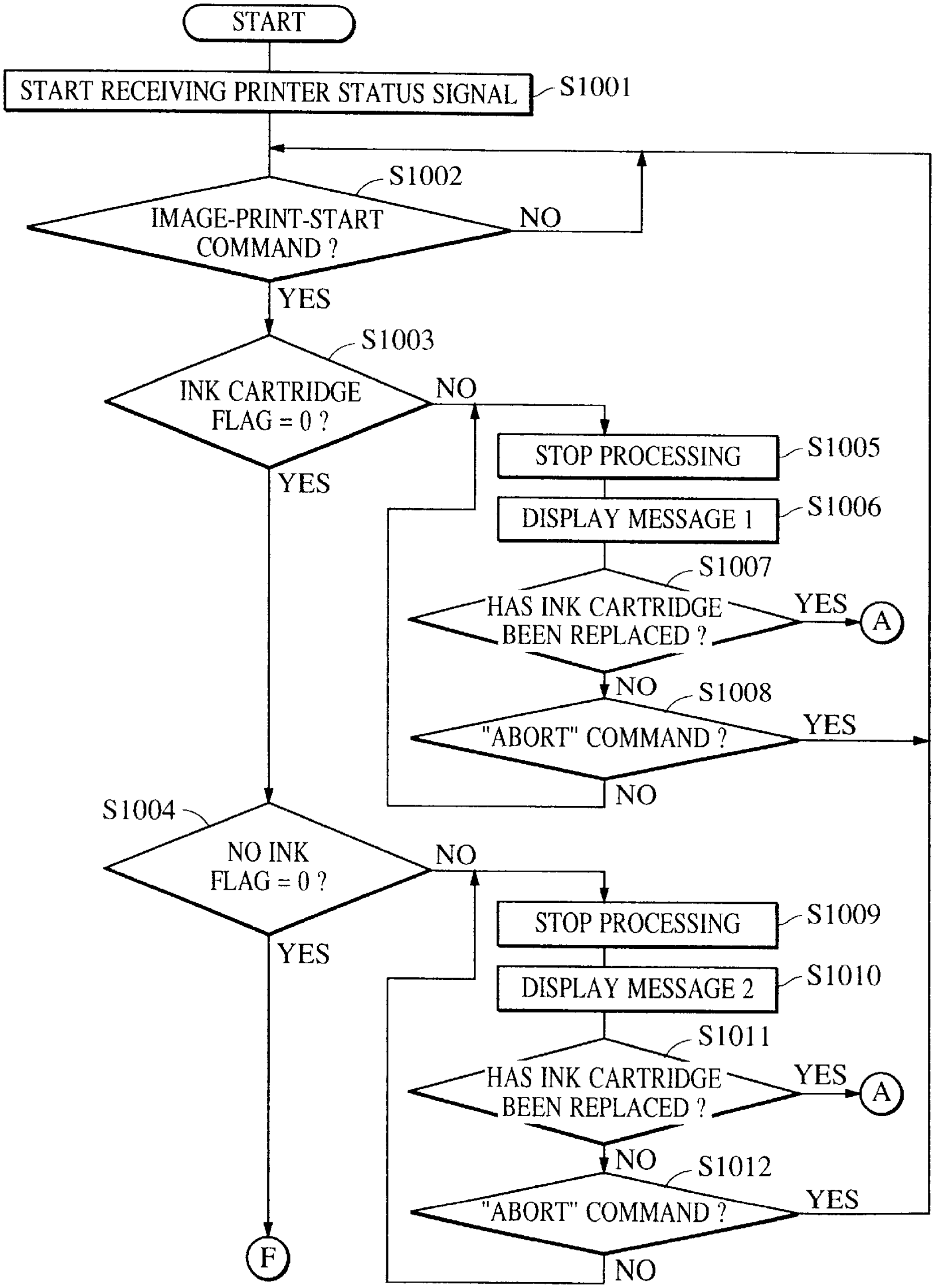
FIG. 12 is a flowchart illustrating the process according to another embodiment of the present invention.

In step S1001 shown in FIG. 12, the program begins with receiving status information from the printer. In step S1002, if a command is received which indicates that generation of printing information should be started, the program goes to step S1003. In step S1003 the program checks ink cartridge flags. If the ink cartridge flags are 0, that is, all ink cartridges are mounted on the printer, then the program goes to step S1004. In step S1004, the program checks no-ink flags. If all the no-ink flags are 0, that is, there is ink in all ink cartridges, then the program goes to step S1101 of FIG. 13. In step S1101, the program checks remaining ink flags. If the remaining ink flags are 0, that is, the remaining amount of ink is enough, then the program goes to step S1105. In step S1105, printing information is generated by converting image data into a form suitable for printing. Then in step S1106 the generated image data (printing information) is output to the printer.

If it is concluded in step S1003 of FIG. 12 that a particular ink cartridge flag is 1, that is, a particular ink cartridge is not mounted on the printer, then the program goes to step S1005 and the generation of printing information is temporarily stopped. Then in step S1006, a message 1 is displayed. As in the case of Embodiment 1 described above, the message 1 is also displayed in a status window on the display screen as shown in FIG. 17. As shown in FIG. 17, the status window contains a message telling that a particular ink cartridge is not mounted on the printer and also telling the color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 17, if the execution button is selected, it is determined in step S1007 shown in FIG. 12 that replacement of an ink cartridge has been performed, and the program then goes to step S301 shown in FIG. 3. In the case where the stop button is selected in the status window of FIG. 17, ink cartridge replacement in step S1007 of FIG. 12 is not performed, and it is determined in step S1008 that a forced aborting command has been issued, and thus the generation of printing information is canceled and the program returns to step S1002 at which the program waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S1002 of FIG. 12 and waits until a command telling that generation of printing information should be started is issued again. Alternatively, in the case where it has been concluded in the above step S302 of FIG. 3 that a forced aborting command has been issued, the program may return to step S1006 of FIG. 12 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307 of FIG. 3, the generation of printing information is started again, and the program goes to step S1004 of FIG. 12. Alternatively, in the above step S306 of FIG. 3, the flag may be reset by the printer itself instead of the host computer.

On the other hand, if it is concluded in step S1004 of FIG. 12 that the no-ink flag is 1 which indicates that there is no ink in an ink cartridge, then the program goes to step S1009 at which the generation of printing information is temporarily stopped. Then in step S1010, a message 2 is displayed. As in the case of Embodiment 1 described above, the message 2 is also displayed in a status window on the display screen as shown in FIG. 18. As shown in FIG. 18, the status window contains a message telling that a particular ink cartridge has no ink in it and also telling the ink color of that cartridge. The status window also contains "execute" and "stop" buttons. Either button may be selected via input means such as a mouse or a keyboard of the host computer, so that the selected operation will be executed. After replacing the corresponding ink cartridge with a new one according to the message shown in FIG. 18, if the execution button is selected, it is determined in step S1011 of FIG. 12 that replacement of the ink cartridge has been performed, and the program then goes to step S301 shown in FIG. 3. In the case where the stop button is selected in the status window of FIG. 18, no ink cartridge is replaced in step S1011 of FIG. 12, and it is determined in step S1012 that a forced aborting command has been issued, and thus the generation of printing information is canceled and the program returns to step S1002 and waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S1002 of FIG. 12 and waits until a command telling that generation of printing information should be started is issued again. Alternatively, in the case where it has been concluded in the above step S302 of FIG. 3 that a forced aborting command has been issued, the program may return to step S1010 of FIG. 12 so that the message shown in FIG. 18 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307, the generation of printing information is started again, and the program goes to step S1101 of FIG. 13. Alternatively, in the above step S306 of FIG. 3, the flag may be reset by the printer itself instead of the host computer.

In step S1101 of FIG. 11, if it is concluded that a particular remaining ink flag is 1, that is, the remaining amount of ink in a particular color ink cartridge is not enough, then the program goes to step S1102 to read the value of "Count" representing the number of dots that can be printed further. The maximum possible number of dots that can be printed after the remaining ink flag in the printer becomes 1 is estimated, and this estimated value is used as the initial value of "Count". This value is previously set in a counter disposed in the printer. The printer counts the number of dots that are printed after the remaining ink flag became 1, and the value of "Count" is decremented on the basis of the above counted value. The program then goes to step S1103 and determines the number (D) of dots to be printed. Then comparison is made in step S1104. If D≦Count, the program goes to step S1105 to continue the processing of the image data (printing information).

Figure 20:
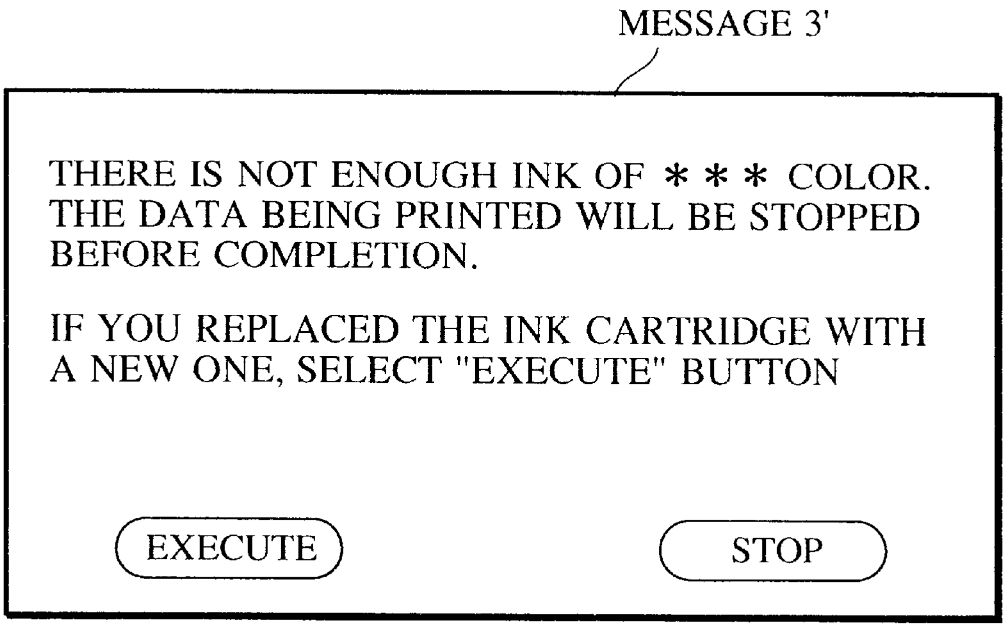

On the other hand, if D>Count, the amount of remaining ink is insufficient to print all the printing data which should be printed. In this case, the program goes to step S1109 at which the generation of printing information is temporarily stopped. Then in step S1110, a message 3' is displayed. The message 3' is displayed in a status window on the display screen as shown in FIG. 20. The status window, as shown in FIG. 20, contains a message telling that the remaining amount of ink is not enough and thus printing will be stopped before completion and also telling the color of that ink. The status window also contains "execute" and "stop" buttons. Either button may be selected via input means such as a mouse or a keyboard of the host computer, so that the selected operation will be executed. After replacing the corresponding ink cartridge with a new one according to the message shown in FIG. 20, if the execution button is selected, it is determined in step S1111 of FIG. 13 that replacement of the ink cartridge is complete, and the program then goes to step S301 shown in FIG. 3. In the case where the stop button is selected in the status window of FIG. 20, no ink cartridge is replaced in step S1111 of FIG. 13, and it is determined in step S1112 that a "neglect" command has been issued, and the program goes to step S1113 to start generation of printing information again. The program then goes to step S1105. In this case, the generation of printing information is not canceled.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S1002 of FIG. 12 and waits until a command telling that generation of printing information should be started is issued again. Alternatively, in the case where it has been concluded in the above step S302 of FIG. 3 that a forced aborting command has been issued, the program may return to step S1110 of FIG. 13 so that the message shown in FIG. 20 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the remaining ink flag corresponding to the color of the cleaned ink cartridge is reset. Then in step S307, the generation of printing information is started again, and the program goes to step S1105 of FIG. 13. Alternatively, in the above step S306 of FIG. 3, the flag may be reset by the printer itself instead of the host computer.

Figure 13:
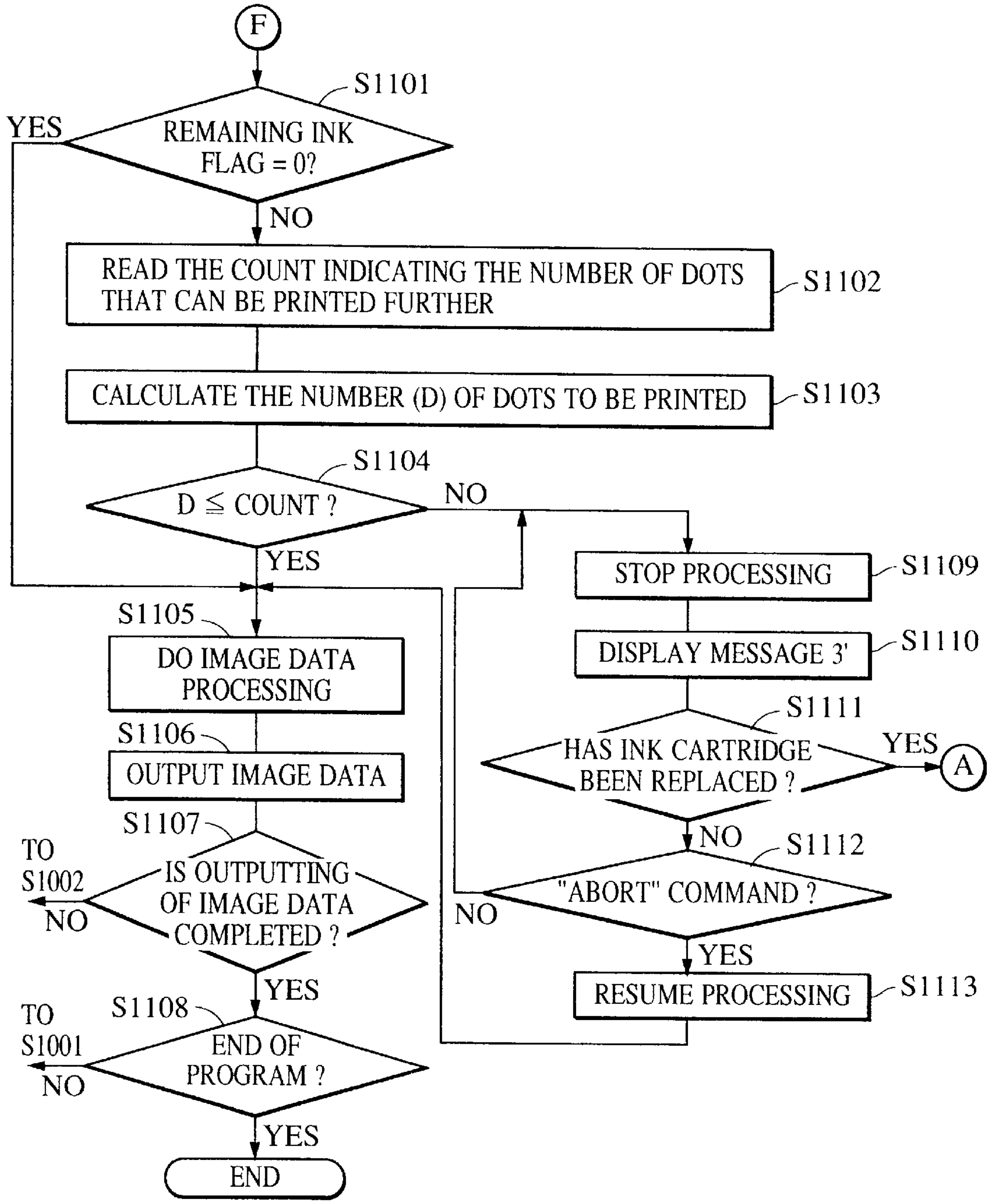
FIG. 13 is a flowchart illustrating the process performed according to the number of dots of a printing image, according to the embodiment of the present invention.

The above-described process of checking the flags in steps S1003 and S1004 of FIG. 12 and step S1101 of FIG. 13 and the succeeding process according to the result of the checking are performed repeatedly until it is concluded in step S1107 of FIG. 13 that all image data (printing information) has been output. If it is concluded in step S1107 that all image data (printing information) has been output, the program goes to step S1108. If an "end" command is not issued in step S1108, then the program returns to step S1002 of FIG. 12 and waits for another command telling that generation of printing information should be started.

As in the previous embodiments described above, the host computer can know the printer status regarding the presence of ink cartridges, the lack of ink, and the amount of remaining ink. This feature of the present embodiment also provides a great advantage particularly when the printer is installed at a location rather far from the host computer or when the printer is shared by a plurality of computers via a network.

Furthermore, in this embodiment, when the remaining amount of ink becomes small, it is determined whether all data can be printed on the basis of the comparison between the number of dots to be printed and the estimated maximum possible number of dots thereby providing high reliability in printing operations.

Embodiment 6

Referring to the flowcharts shown in FIGS. 3, 12 and 14, the process of another embodiment according to the present invention will be described below.

In step S1001 shown in FIG. 12, the program begins with receiving status information from the printer. In step S1002, if a command is received which indicates that generation of printing information should be started, the program goes to step S1003. In step S1003 the program checks ink cartridge flags. If the ink cartridge flag is 0, that is, all ink cartridges are mounted on the printer, then the program goes to step S1004. In step S1004, the program checks no-ink flags. If all the no-ink flags are 0, that is, there is ink in all ink cartridges, then the program goes to step S1201 of FIG. 14. In step S1201, the program checks a remaining ink flag. If the remaining ink flag is 0, that is, the remaining amount of ink is enough, then the program goes to step S1205. In step S1205, printing information is generated by converting image information into a form suitable for printing. Then in step S1206 the generated printing information is output to the printer band by band.

If it is concluded in step S1003 of FIG. 12 that a particular ink cartridge flag is 1, that is, a particular ink cartridge is not mounted on the printer, then the program goes to step S1005 and the generation of printing information is temporarily stopped. Then in step S1006, a message 1 is displayed. As in the case of Embodiment 1 described above, the message 1 is also displayed in a status window on the display screen as shown in FIG. 17. As shown in FIG. 17, the status window contains a message telling that a particular ink cartridge is not mounted on the printer and also telling the color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 17, if the execution button is selected, it is determined in step S1007 shown in FIG. 12 that replacement of an ink cartridge has been performed, and the program then goes to step S301 shown in FIG. 3. In the case where the stop button is selected in the status window of FIG. 17, ink cartridge replacement in step S1007 of FIG. 12 is not performed, and it is determined in step S1008 that a forced aborting command has been issued, and thus the generation of printing information is canceled and the program returns to step S1002 at which the program waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S1002 of FIG. 12 and waits until a command telling that generation of printing information should be started is issued again. Alternatively, in the case where it has been concluded in the above step S302 of FIG. 3 that a forced aborting command has been issued, the program may return to step S1006 of FIG. 12 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307 of FIG. 3, the generation of printing information is started again, and the program goes to step S1004 of FIG. 12. Alternatively, in the above step S306 of FIG. 3, the flag may be reset by the printer itself instead of the host computer.

On the other hand, if it is concluded in step S1004 of FIG. 12 that the no-ink flag is 1 which indicates that there is no ink in an ink cartridge, then the program goes to step S1009 at which the generation of printing information is temporarily stopped. Then in step S1010, a message 2 is displayed. As in the case of Embodiment 1 described above, the message 2 is also displayed in a status window on the display screen as shown in FIG. 18. As shown in FIG. 18, the status window contains a message telling that a particular ink cartridge has no ink in it and also telling the ink color of that cartridge. The status window also contains "execute" and "stop" buttons. Either button may be selected via input means such as a mouse or a keyboard of the host computer, so that the selected operation will be executed. After replacing the corresponding ink cartridge with a new one according to the message shown in FIG. 18, if the execution button is selected, it is determined in step S1011 of FIG. 12 that replacement of the ink cartridge has been performed, and the program then goes to step S301 shown in FIG. 3. In the case where the stop button is selected in the status window of FIG. 18, no ink cartridge is replaced in step S1011 of FIG. 12, and it is determined in step S1012 that a forced aborting command has been issued, and thus the generation of printing information is canceled and the program returns to step S1002 and waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S1002 of FIG. 12 and waits until a command telling that generation of printing information should be started is issued again. Alternatively, in the case where it has been concluded in the above step S302 of FIG. 3 that a forced aborting command has been issued, the program may return to step S1010 of FIG. 12 so that the message shown in FIG. 18 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307, the generation of printing information is started again, and the program goes to step S1201 of FIG. 14. Alternatively, in the above step S306 of FIG. 3, the flag may be reset by the printer itself instead of the host computer.

Figure 14:
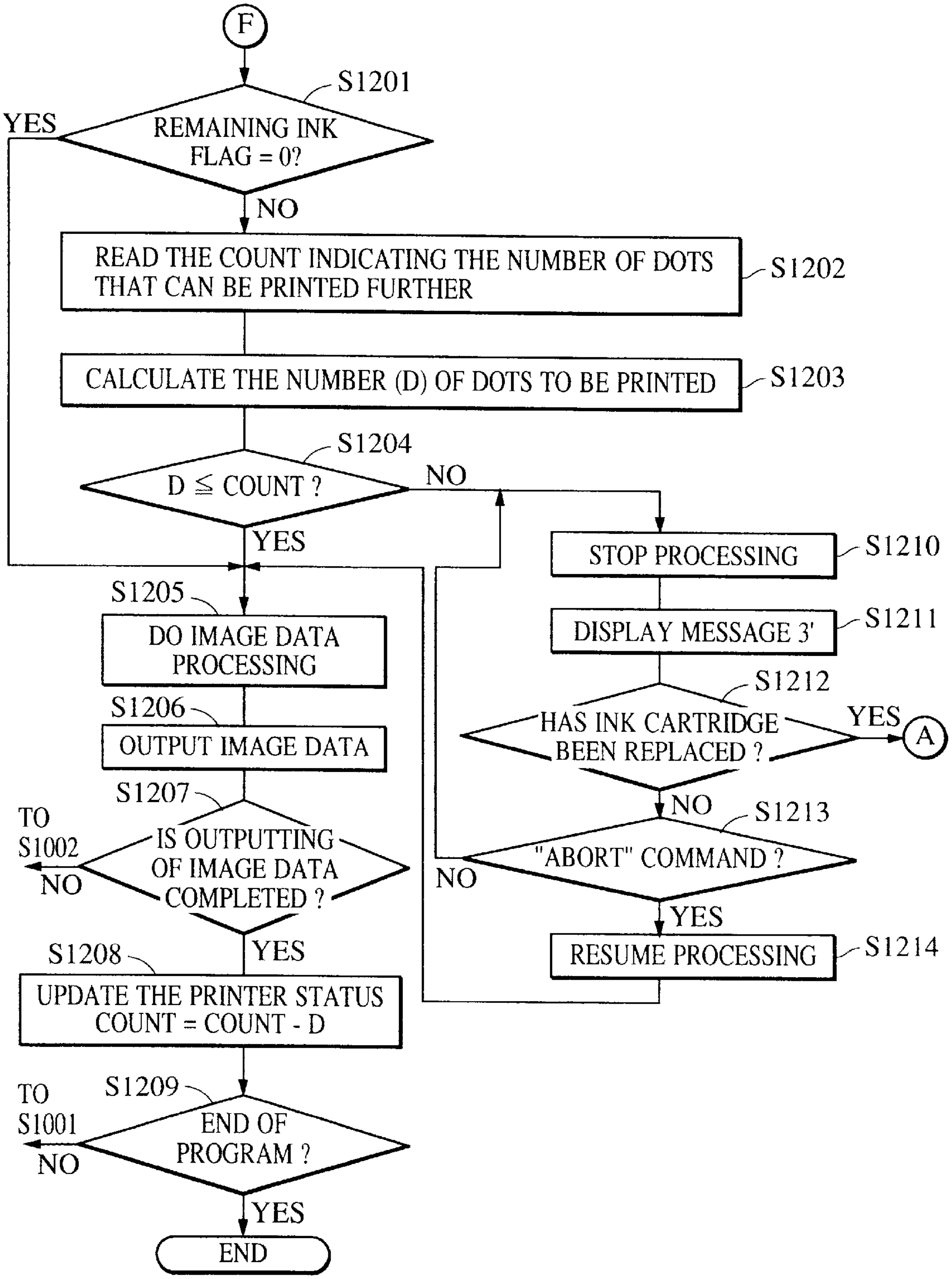
FIG. 14 is a flowchart illustrating the process performed according to the number of dots of a printing image, according to another embodiment of the present invention.

In step S1201 of FIG. 14, if it is concluded that a particular remaining ink flag is 1, that is, the remaining amount of ink in a particular color ink cartridge is not enough, then the program goes to step S1202 to read the value of "Count" representing the number of dots that can be printed further. The maximum possible number of dots that can be printed after the remaining ink flag in the printer becomes 1 is estimated, and this estimated value is used as the initial value of "Count". This value is previously set in a counter disposed in the printer. The program then goes to step S1203 and determines the number (D) of dots to be printed. Then in step S1204, comparison is made. If D<Count, the program goes to step S1205 to continue the processing of the image data (printing information).

On the other hand, if D>Count, the amount of remaining ink is insufficient to print all the printing data which should be printed. In this case, the program goes to step S1210 at which the generation of printing information is temporarily stopped. Then in step S1211, a message 3' is displayed. The message 3' is displayed in a status window on the display screen as shown in FIG. 20. The status window, as shown in FIG. 20, contains a message telling that the remaining amount of ink is not enough and thus printing will be stopped before completion and also telling the color of that ink. The status window also contains "execute" and "stop" buttons. Either button may be selected via input means such as a mouse or a keyboard of the host computer, so that the selected operation will be executed. After replacing the corresponding ink cartridge with a new one according to the message shown in FIG. 20, if the execution button is selected, it is determined in step S1212 of FIG. 14 that replacement of the ink cartridge is complete, and the program then goes to step S301 shown in FIG. 3. In the case where the stop button is selected in the status window of FIG. 20, no ink cartridge is replaced in step S1212 of FIG. 14, and it is determined in step S1213 that an "abort" command has been issued, and the program goes to step S1214 to start generation of printing information again. The program then goes to step S1205. In this case, the generation of printing information is not canceled.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S1002 of FIG. 12 and waits until a command telling that generation of printing information should be started is issued again. Alternatively, in the case where it has been concluded in the above step S302 of FIG. 3 that a forced aborting command has been issued, the program may return to step S1210 of FIG. 14 so that the message shown in FIG. 20 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the remaining ink flag corresponding to the color of the cleaned ink cartridge is reset. Then in step S307, the generation of printing information is started again, and the program goes to step S1205 of FIG. 14. Alternatively, in the above step S306 of FIG. 3, the flag may be reset by the printer itself instead of the host computer.

The above-described process of checking the flags in steps S1003 and S1004 of FIG. 12 and step S1201 of FIG. 14 and the succeeding process according to the result of the checking are performed repeatedly until it is concluded in step S1207 of FIG. 14 that all image data (printing information) has been output. If it is concluded in step S1207 that all image data (printing information) has been output, the program goes to step S1208 to update the status regarding the number of dots that can be printed further. The program then goes to step S1209. If an "end" command is not issued in step S1209, then the program returns to step S1002 of FIG. 12 and waits for another command telling that generation of printing information should be started.

As in the previous embodiments described above, the host computer can know the printer status regarding the presence of ink cartridges, the lack of ink, and the amount of remaining ink. This feature of the present embodiment also provides a great advantage particularly when the printer is installed at a location rather far from the host computer or when the printer is shared by a plurality of computers via a network.

Furthermore, as in the previous embodiment described above, when the remaining amount of ink becomes small, it is determined whether all data can be printed on the basis of the comparison between the number of dots to be printed and the estimated maximum possible number of dots thereby providing high reliability in printing operations. Furthermore, in this embodiment, when a printing operation is completed, the host computer determines the number of dots that can be printed further on the basis of the number of dots that were printed in that latest printing operation, and the resultant value is stored in the printer as a new status value. Therefore, this technique is applicable to a printer having no capability of counting the number of dots that have been printed already.

Embodiment 7

Referring to the flowcharts shown in FIGS. 3, 15 and 16, the process of another embodiment according to the present invention will be described below.

In the beginning of the program, the remaining ink flag is reset in step S1301 of FIG. 15. Then in step S1302, the program starts receiving status information from the printer. In step S1303, if a command is received which indicates that generation of printing information should be started, the program goes to step S1304. In step S1304 the program checks ink cartridge flags. If the ink cartridge flag is 0, that is, all ink cartridges are mounted on the printer, then the program goes to step S1305. In step S1305, the program checks no-ink flags. If all the no-ink flags are 0, that is, there is ink in all ink cartridges, then the program goes to step S1401 of FIG. 16. In step S1401, the program checks remaining ink flags. If the remaining ink flags are 0, that is, the remaining amounts of ink are enough, then the program goes to step S1402. In step S1402, printing information is generated by converting image information into a form suitable for printing. Then in step S1203 the generated printing information is output to the printer band by band.

If it is concluded in step S1304 of FIG. 15 that a particular ink cartridge flag is 1, that is, a particular ink cartridge is not mounted on the printer, then the program goes to step S1306 and the generation of printing information is temporarily stopped. Then in step S1307, a message 1 is displayed. As in the case of Embodiment 1 described above, the message 1 is also displayed in a status window on the display screen as shown in FIG. 17. As shown in FIG. 17, the status window contains a message telling that a particular ink cartridge is not mounted on the printer and also telling the color of that cartridge. The status window also contains "execute" and "stop" buttons. Either button may be selected via input means such as a mouse or a keyboard of the host computer, so that the selected operation will be executed. After mounting an ink cartridge according to the message shown in FIG. 17, if the execution button is selected, it is determined in step S1308 shown in FIG. 15 that replacement of an ink cartridge has been performed, and the program then goes to step S301 shown in FIG. 3. In the case where the stop button is selected in the status window of FIG. 17, no ink cartridge is replaced in step S1308 of FIG. 15, and it is determined in step S1309 that a forced aborting command has been issued, and thus the generation of printing information is canceled and the program returns to step S1303 and waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S1303 of FIG. 15 and waits until a command telling that generation of printing information should be started is issued again. Alternatively, in the case where it has been concluded in the above step S302 of FIG. 3 that a forced aborting command has been issued, the program may return to step S1307 of FIG. 15 so that the message shown in FIG. 17 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307 of FIG. 3, the generation of printing information is started again, and the program goes to step S1305 of FIG. 15. Alternatively, in the above step S306 of FIG. 3, the flag may be reset by the printer itself instead of the host computer.

On the other hand, if it is concluded in step S1305 of FIG. 15 that a particular no-ink flag is 1, that is, there is no ink in a particular ink cartridge, then the program goes to step S1310 at which the generation of printing information is temporarily stopped. Then in step S1311, a message 2 is displayed. As in the case of Embodiment 1 described above, the message 2 is also displayed in a status window on the display screen as shown in FIG. 18. As shown in FIG. 18, the status window contains a message telling that a particular ink cartridge has no ink in it and also telling the ink color of that cartridge. The status window also contains "execute" and "stop" buttons. Either button may be selected via input means such as a mouse or a keyboard of the host computer, so that the selected operation will be executed. After replacing the corresponding ink cartridge by a new one according to the message shown in FIG. 18, if the execution button is selected, it is determined in step S1312 of FIG. 15 that replacement of the ink cartridge has been performed, and the program then goes to step S301 shown in FIG. 3. In the case where the stop button is selected in the status window of FIG. 18, no ink cartridge is replaced in step S1312 of FIG. 15, and it is determined in step S1313 that a forced aborting command has been issued, and thus the generation of printing information is canceled and the program returns to step S1303 and waits until a command telling that generation of printing information should be started is issued again.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S1303 of FIG. 15 and waits until a command telling that generation of printing information should be started is issued again. Alternatively, in the case where it has been concluded in the above step S302 of FIG. 3 that a forced aborting command has been issued, the program may return to step S1311 of FIG. 15 so that the message shown in FIG. 18 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the no-ink flag corresponding to the color of the cleaned ink cartridge is reset. Then in step S307, the generation of printing information is started again, and the program goes to step S1401 of FIG. 16. Alternatively, in the above step S306 of FIG. 3, the flag may be reset by the printer itself instead of the host computer.

Figure 16:
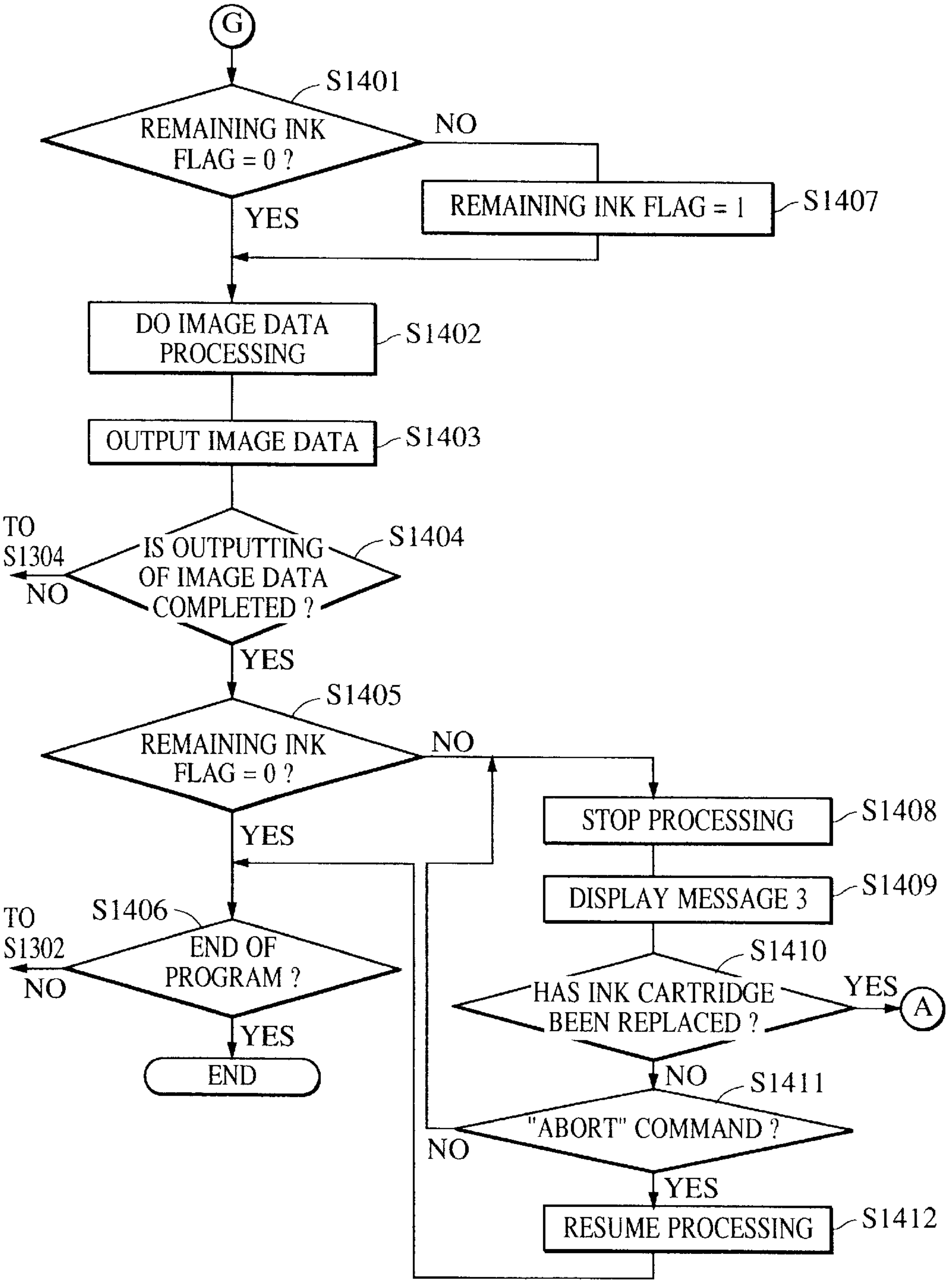
FIG. 16 is a flowchart illustrating the process of displaying the amount of remaining ink after outputting image data (printing information) according to the embodiment of the present invention.

In step S1401 of FIG. 16, if it is concluded that a particular remaining ink flag is 1, that is, the remaining amount of ink in a particular ink cartridge is not enough, then the program goes to step S1407 at which the remaining ink flag is changed to 1. The program then goes to step S1402.

The above-described process of checking the flags in steps S1304 and S1305 of FIG. 15 and step S1401 of FIG. 16 and the succeeding process according to the result of the checking are performed repeatedly until it is concluded in step S1404 that all image data (printing information) has been output. If it is concluded in step S1404 that all image data (printing information) has been output, the program goes to step S1405 and checks the remaining ink flags. If all remaining ink flags are 0, that is, there is enough ink in all ink cartridges, then the program goes to step S1302. If an "end" command is not issued in step S1302, then the program returns to step S1303 of FIG. 13 and waits for another command telling that generation of printing information should be started.

In step S1405, if it is concluded that a particular remaining ink flag is 1, that is, the remaining amount of ink in a particular ink cartridge is not enough, then the program goes to step S1408 at which the generation of printing information is temporarily stopped. Then in step S1409, a message 3 is displayed. As in the case of Embodiment 1 described above, the message 3 is also displayed in a status window on the display screen as shown in FIG. 19. The status window, as shown in FIG. 19, contains a message telling that the remaining amount of ink is not enough and thus printing will be stopped before completion if the amount of data to be printed is too large, and also telling the color of that ink. The status window also contains "execute" and "stop" buttons. Either button may be selected via input means such as a mouse or a keyboard of the host computer, so that the selected operation will be executed. After replacing the corresponding ink cartridge with a new one according to the message shown in FIG. 19, if the execution button is selected, it is determined in step S1410 of FIG. 16 that replacement of the ink cartridge is complete, and the program then goes to step S301 shown in FIG. 3. In the case where the stop button is selected in the status window of FIG. 19, no ink cartridge is replaced in step S1410 of FIG. 16, and it is determined in step S1411 that an "abort" command has been issued, and the program goes to step S1412 to start generation of printing information again. The program then goes to step S1406.

In the case where the program has branched to step S301, a message 4 is displayed. As in the case of Embodiment 1 described above, the message 4 is also displayed in a status window on the display screen as shown in FIG. 22. As shown in FIG. 22, the status window contains a message telling that the printer will start cleaning the print head, and also contains "execute" and "stop" buttons. Either button may be selected via input means such as a mouse or a keyboard of the host computer, so that the selected operation will be executed. In the case where the stop button is selected, it is determined in step S302 of FIG. 3 that a forced aborting command has been issued, and thus the generation of printing information is canceled and the program returns to step S1302 of FIG. 15 and waits until a command telling that generation of printing information should be started is issued again. Alternatively, in the case where it has been concluded in the above step S302 of FIG. 3 that a forced aborting command has been issued, the program may return to step S1409 of FIG. 16 so that the message shown in FIG. 19 will be displayed again in the status window. If the "execute" button is selected in the status window of FIG. 22, it is concluded in step S303 of FIG. 3 that an "execute" command has been issued, and thus in step S304 a cleaning execution command is sent to the printer. On reception of the cleaning execution command, the printer sets the cleaning execution flag to 1 and starts the cleaning operation. When the cleaning operation is completed, the printer immediately resets the cleaning execution flag to 0. In step S305, if a cleaning completion signal indicating that the cleaning execution flag=0 is received, the remaining ink flag corresponding to the color of the cleaned ink cartridge is reset. Then in step S307, the generation of printing information is started again, and the program goes to step S1406 of FIG. 16. Alternatively, in the above step S306 of FIG. 3, the flag may be reset by the printer itself instead of the host computer.

As in the previous embodiments described above, the host computer can know the printer status regarding the presence of ink cartridges, the lack of ink, and the amount of remaining ink. This feature of the present embodiment also provides a great advantage particularly when the printer is installed at a location rather far from the host computer or when the printer is shared by a plurality of computers via a network.

Furthermore, in this embodiment, when the remaining ink in a particular ink cartridge becomes small, the printing operation is stopped after all image data has been printed and then a message is displayed to tell that ink is about to run out. This prevents the printing operation from being unnecessarily stopped during a printing operation.

In Embodiment 1, as described above, the CPU (not shown) of the host computer 110 acquires, via the printer driver 114, the ink status information of the printer 101, such as presence of ink cartridges, lack of ink, and remaining amounts of ink. The host computer displays a proper message (in a status window) on the screen of a display (such as a CRT) depending on the acquired status information. As in the previous embodiments described above, the host computer can know the printer status regarding the presence of ink cartridges, the lack of ink, and the amount of remaining ink. This feature of the embodiment provides a great improvement in the user interface (ease of operation) particularly when the printer 101 is installed at a location rather far from the host computer 110 or when the printer 101 is shared by a plurality of computers via a network.

Furthermore, in Embodiment 2, the data to be printed is analyzed to determine which colors should be used in the printing operation. Ink cartridge flags, no-ink flags, and remaining ink flags are examined only for the determined colors and messages are displayed in a similar manner to Example 1.

For example, when the data to be printed needs only black, only the status information associated with black is checked and the status information associated with other colors is neglected. Thus, it is possible to prevent the reduction in process efficiency (for example efficiency of generation of printing information) due to an unnecessary interrupt to detect the status information. Furthermore, it is possible to prevent a printing operation from being unnecessarily stopped due to the status information regarding a color which is not actually used in the current printing operation.

In Embodiment 3, the status information including the ink cartridge flags, no-ink flags, remaining ink flags is detected depending on the specified color mode (monochrome printing mode, color printing mode), and a proper message is displayed in a similar manner to Embodiment 1. For example, the CPU (not shown) detects only the status information associated with black in the monochrome printing mode, although the status information associated with all colors is detected in the color printing mode. The color mode may be designated by means of selecting operation via the control panel of the printer itself or via a menu displayed on the screen of the host computer. When the color mode is designated via the control panel of the printer, the CPU (not shown) acquires the status information regarding the color mode via the printer driver.

Thus, in this embodiment, it is possible to prevent a processing operation (for example generation of printing information) from being unnecessarily interrupted to detect the status information. For example, when operating in the monochrome printing mode, it is possible to prevent the generation of printing information from being stopped by the status information associated with cyan ink or by a command to replace an ink cartridge which is not actually used.

In Embodiment 4, when operating for example in the monochrome mode, if the remaining amount of ink becomes small, it is possible to continue the printing operation using alternative color ink wherein the alternative color ink is designated via a message displayed on the display screen. For example, when the remaining amount of black ink becomes small, it is possible to continue the printing operation using cyan ink instead of black ink.

This provides an advantage particularly when the printing operation has to be completed without a delay due to the replacement of an ink cartridge.

In Embodiment 5, the number (D) of dots to be printed is determined (in units of pages or band sizes) and compared with the number (Count) of dots that can be printed further. If the comparison result indicates that the number (D) to be printed is smaller than the maximum allowable value (Count), the printing operation is continued further.

In Embodiment 6, the CPU (not shown) can update, via the printer driver, the value representing the number of dots that can be printed further stored in the printer.

In Embodiment 7, the message telling that the amount of ink is about to run out is displayed after the completion of a printing operation.

Now, a color ink jet printer, including a print head, a carriage mechanism, a remaining-ink detector having a reservoir sensor capability, and a paper position detector, which can be used in the present invention, will be described below referring to FIGS. 25 to 28. The term “paper position” used here refers to the distance between paper (standard paper or thick paper) and a print head.

In an ink-jet printer, it is required that the ink supplying system be capable of supplying ink during a printing operation in such a manner that the amount of supplied ink is exactly equal to the amount emitted from the print head. Furthermore, it is also required that there be no leakage of ink through a nozzle when no printing operation is performed.

For the above purpose, it is known in the art that the ink supplying system has a negative pressure generation mechanism for maintaining the pressure near the nozzle at a level lower than the atmospheric pressure when no printing operation is performed. The term “negative pressure” is used here to denote a pressure that is against the pressure for supplying the ink via the nozzle, that is, the pressure is negative when it is lower than the atmospheric pressure.

Japanese Laid-Open Patent Application No. 63-87242 discloses an ink reservoir having a negative pressure generation mechanism formed in an ink accommodation chamber in the ink reservoir. In the ink-jet print cartridge according to this technique, a foam or sponge material is disposed in almost the entire space in an ink reservoir, and there are provided a plurality of ink emission orifices. In this cartridge, a porous medium such as polyurethane foam is employed as the above-described foam material, and ink is stored in the foam of the medium wherein the capillary force produces a negative pressure which confines the ink in the foam (and thereby prevents the ink from leaking).

Japanese Laid-Open Patent Application No. 6-40043 discloses an ink reservoir including a porous element serving as a negative pressure generation element disposed in an ink accommodation chamber of the ink reservoir, which has a structure for enhancing the ink efficiency and thus increasing the amount of filled ink. In this technique, the ink reservoir has two separate chambers: one is used to accommodate the negative pressure generation element and the other is used to accommodate ink. This structure makes it possible to use almost all ink except for that adhering to the inner wall of the ink accommodation chamber. Thus, this ink reservoir provides high reliability in supplying of ink. Furthermore, this technique offers a high capacity ink reservoir.

In the embodiment described below, the invention is applied to an ink-jet printer using an ink reservoir including a negative pressure generation element made of an absorbing material or a porous material so that the amount of remaining ink is detected by detecting the change in reflectance at the boundary between the ink absorber and the wall of the ink reservoir wherein the detection is performed using a light beam passing through a part of the wall of the ink reservoir thereby achieving high reliability in the detection of the amount of remaining ink.

Figure 28:
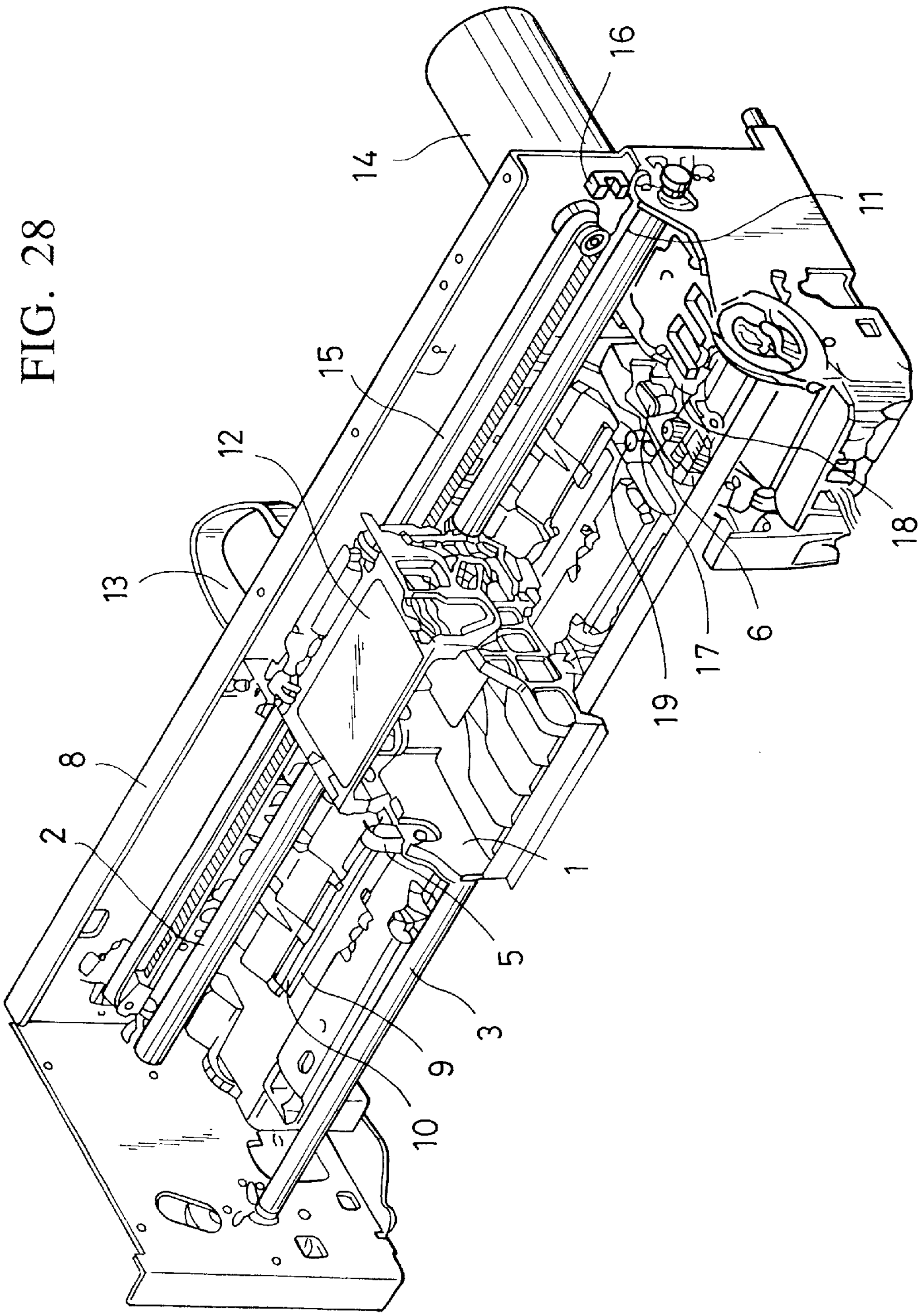
FIG. 28 is a perspective view of an ink-jet printer, illustrating its entire appearance.

FIG. 28 is a perspective view of a color ink-jet printer having the capability of emitting ink droplets of various colors. Each color ink is stored in its own ink reservoir and mounted on a carriage. The colors of ink include black, cyan, magenta, and yellow, as in common color printers.

In FIG. 28, reference numeral 8 denotes a chassis on which various components are mounted. Reference numeral 9 denotes a paper carrying roller which is disposed in the longitudinal direction of the printer in such a manner as to carry paper (not shown). Reference numeral 10 denotes a pinch roller which is disposed in parallel to the paper carrying roller 9 so that the paper is pressed by the pinch roller against the paper carrying roller 9. Reference numeral 2 denotes a guide shaft disposed in parallel to the paper carrying roller 9 at a location opposite to the paper carrying roller 9. Reference numeral 11 denotes a scale of a magnetic linear encoder disposed in parallel to the guide shaft 2 at a location opposite to the guide shaft 2.

Reference numeral 1 denotes a carriage adapted to move along the guide shaft 2. Reference numeral 12 denotes a head cover for fixing an ink-jet head (not shown) to the carriage 1. Reference numeral 13 denotes flexible wiring for transmitting a printing data signal from a controller of the printer to an ink-jet head mounted on the carriage 1 and also transmitting an output signal of a sensor (not shown), which is disposed on the carriage 1 so as to sense the magnetic linear encoder, to the controller of the printer.

Reference numeral 3 denotes a supporting shaft disposed in parallel to the guide shaft 2, by which the carriage 1 that can rotate about the guide shaft 2 is maintained in a proper position. Reference numeral 14 denotes a carriage motor for moving the carriage 1 along the guide shaft 2. Reference numeral 15 denotes a timing belt for transmitting the driving force of the carriage motor 14 to the carriage 1. Reference numeral 16 denotes a photo interrupter of the transmission type which is disposed at a location in the middle of the path along which the carriage 1 moves so that the home position of the carriage is determined by the photo interrupter 16.

Reference numeral 17 denotes a suction cap for preventing the ink-jet head from an ink emission failure and also for recovering the ink emission failure. Reference numeral 18 denotes a protection cap for protecting the ink-jet head so that the inside of the emission nozzle of the ink-jet head is not dried when the ink-jet head is at a waiting position. Reference numeral 5 denotes a paper position selection lever disposed on the carriage 1, for switching the clearance between the printing paper and the ink-jet head depending on the thickness of the printing paper. Reference numeral 6 denotes a photo interrupter of the reflection type serving as an ink sensor disposed at a location near the home position of the carriage 1. Reference numeral 19 denotes a pre-emission hole for receiving ink droplets which are emitted prior to an actual printing operation so as to prevent the nozzle of the ink-jet head from being clogged.

Figure 25:
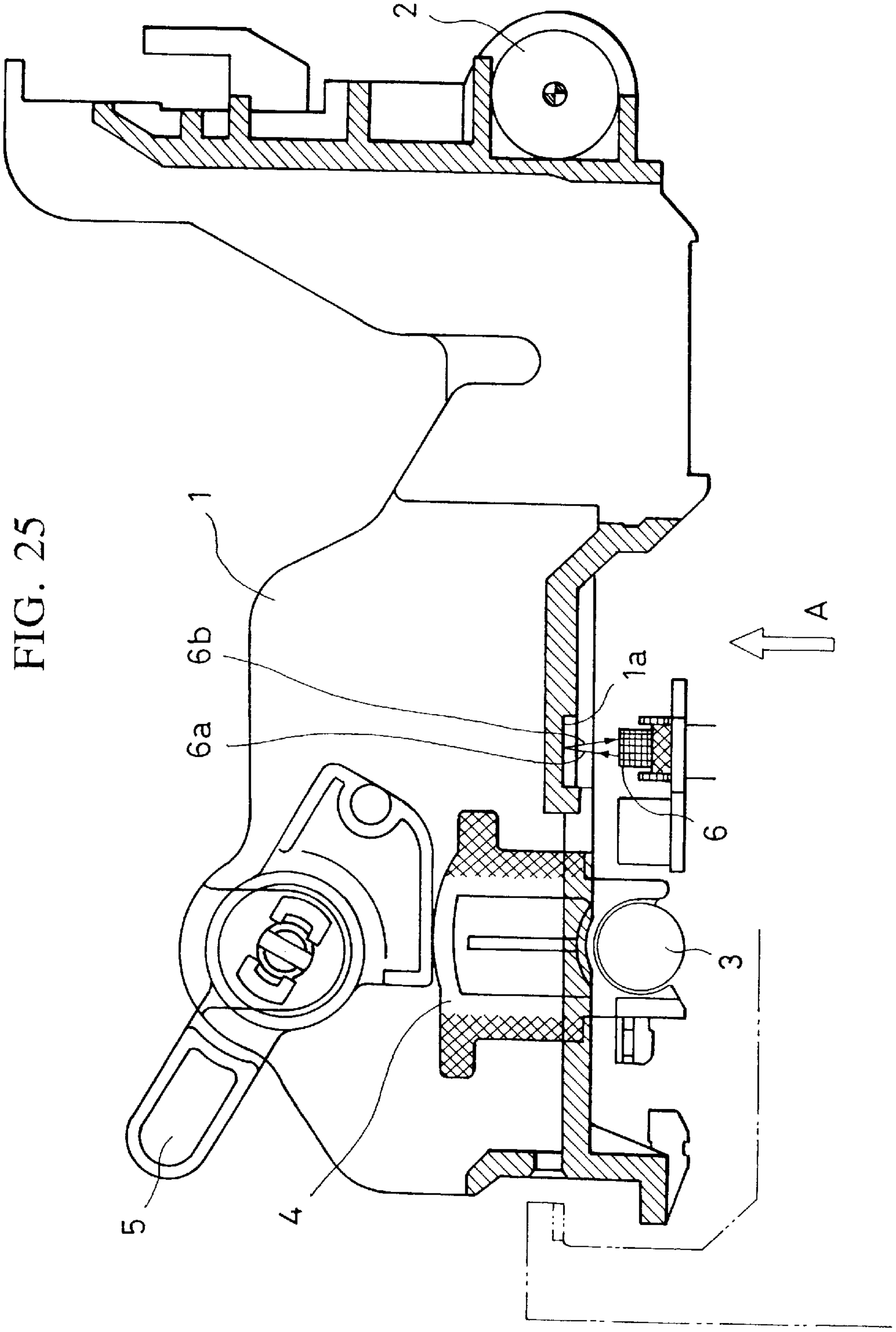
FIG. 25 is a cross-sectional view of a carriage.
Figure 26:
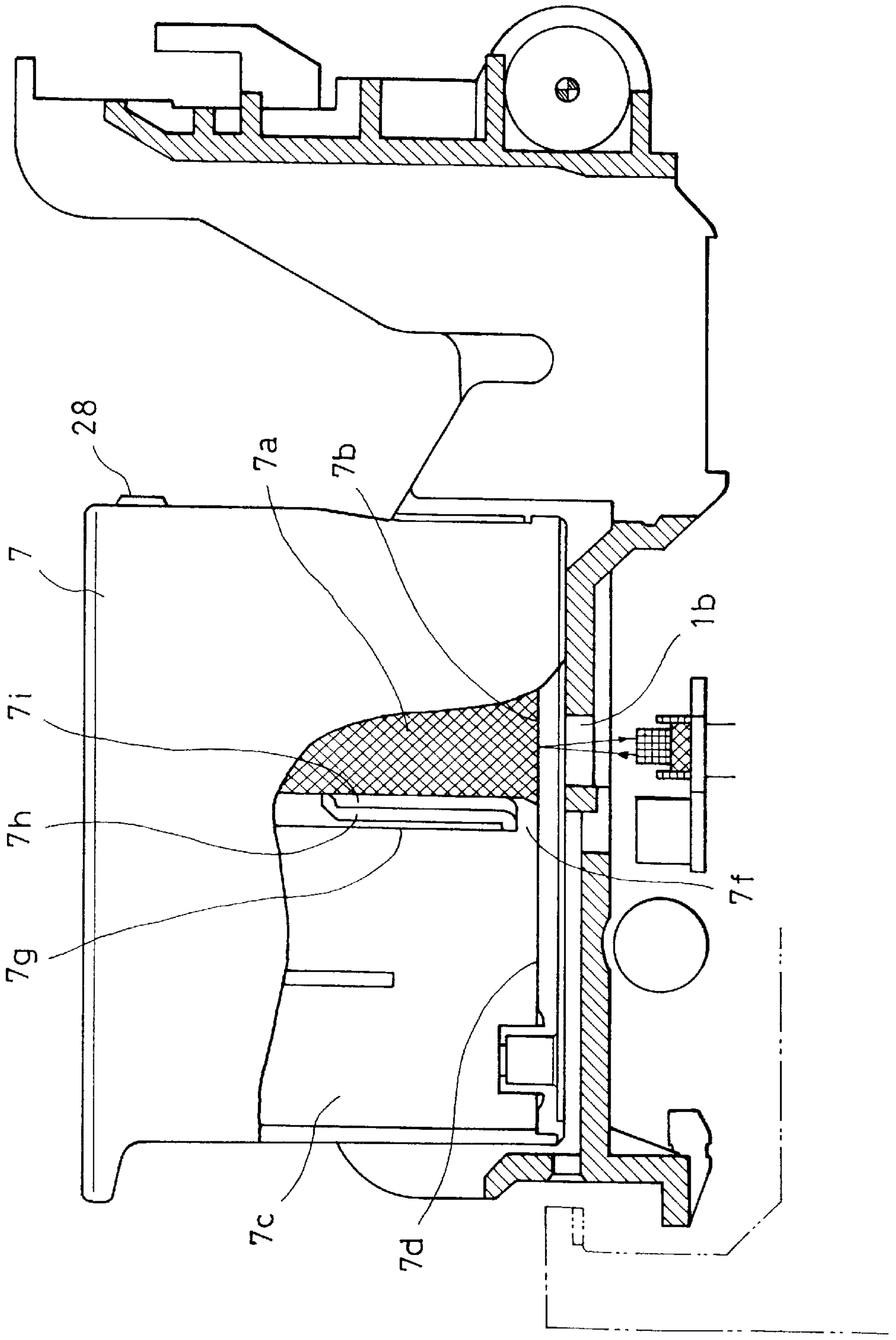
FIG. 26 is a cross-sectional view of the carriage on which ink reservoirs are mounted.
Figure 27:
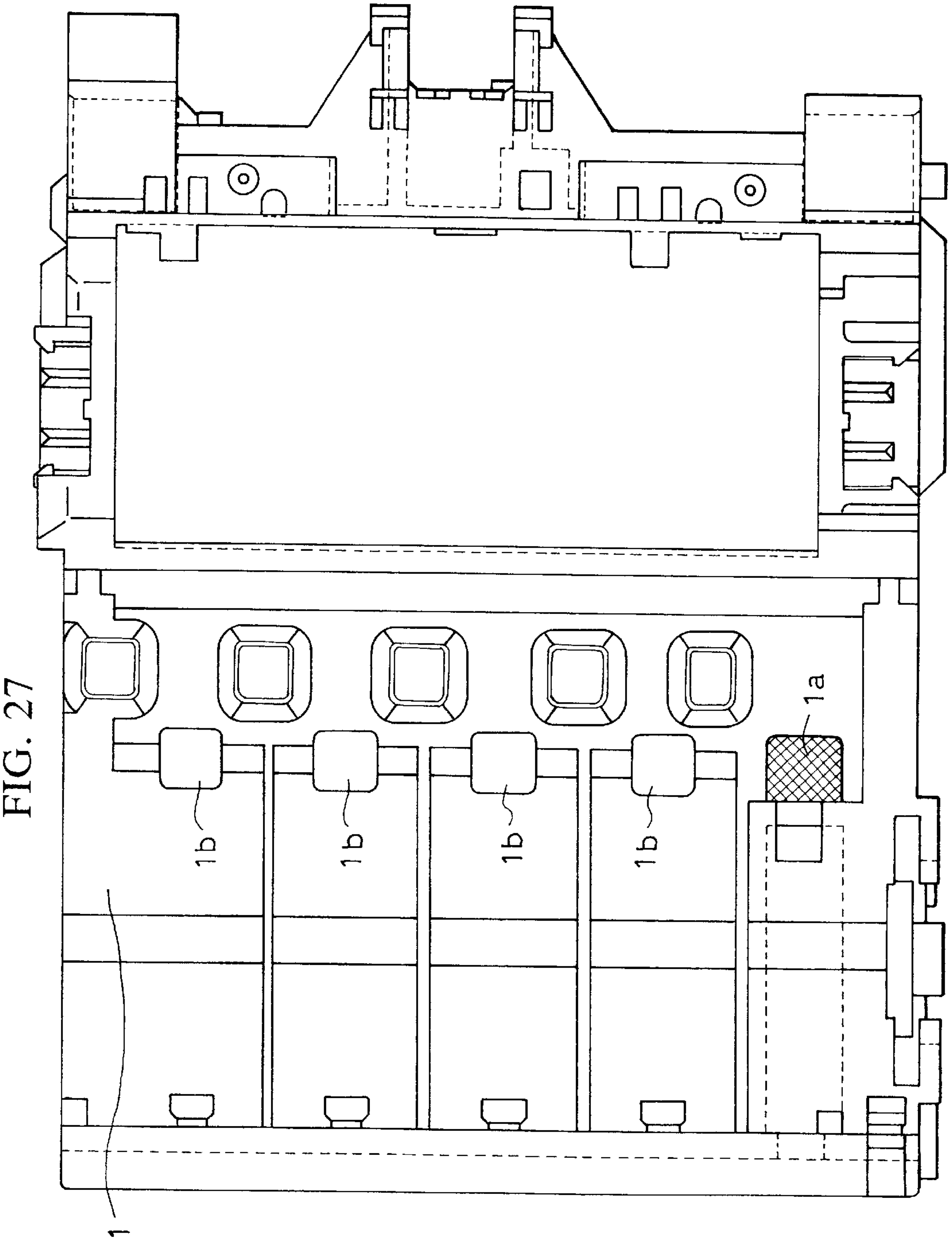
FIG. 27 is a schematic diagram of the carriage viewed from the bottom side.

FIG. 25 is a side view of the carriage 1, and FIG. 26 is a side view illustrating the carriage 1 shown in FIG. 25 with an ink reservoir mounted on it. FIG. 27 is a schematic diagram of the carriage 1 shown in FIG. 25, viewed from the direction denoted by the arrow A.

Referring to FIGS. 25, 26, 27, and 28, the positional relationship between the carriage 1 and the photo interrupter 6 and the detection of the carriage 1 by the photo interrupter 6 will be described below.

As shown in FIGS. 25, 26, and 27, holes 1*b* are formed in a lower part of the carriage 1 so that the light emitted by the photo interrupt 6 may pass through these holes 1*b*.

Figure 30:
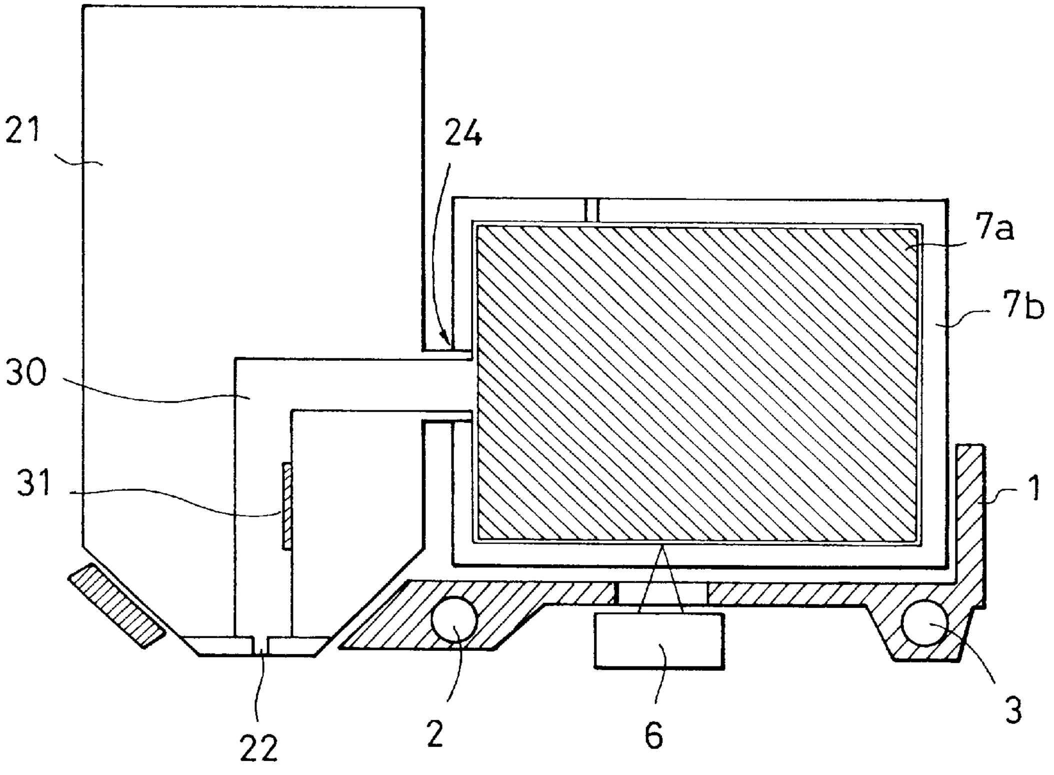
FIG. 30 is a schematic diagram illustrating a carriage and an ink sensor.

In FIG. 30, reference numeral 21 denotes a print head having a nozzle 22 via which ink droplets are emitted thereby forming an image on paper. Reference numeral 7 denotes an ink reservoir mounted on the carriage 1. Reference numeral 7*a* denotes an absorber serving as a negative pressure generating element disposed in the ink reservoir. Reference numeral 7*b* denotes the boundary between the absorber 7*a* disposed in the ink reservoir and the outer wall of the ink reservoir. Reference 7*c* denotes an ink accommodation chamber (raw ink accommodation chamber) for accommodating ink (raw ink) without mixing it with other elements. Reference 7*d* denotes a boundary between the raw ink in the ink reservoir and the outer wall of the ink reservoir. The raw ink accommodation chamber accommodates ink in a substantially closed space. Ink in this ink accommodation chamber is transported into the chamber, in which the ink absorber 7*a* is disposed, via a gap 7*f* formed at a lower position of the partition 7*g*. The ink reservoir 7 is made of a transparent material such as transparent plastic so that the light to be detected by the photo interrupter 6 can pass through the material. Reference numeral 28 denotes a communicating aperture. Ink is supplied to the print head via an ink supply aperture.

The ink reservoir 7 also has an atmospheric vent 7*h* formed in a portion of the partition 7*g* disposed between the raw ink accommodation chamber and the chamber for accommodating the ink absorber 7*a* serving as a negative pressure generation element. Furthermore, a negative pressure generation element adjustment space 7*i* is also formed in a portion of the partition 7*g*. The atmospheric vent 7*h* is formed such that it extends from the middle of the partition 7*g* to the end of the partition 7*g*, that is, to the gap 7*f* between the partition and the bottom of the ink cartridge wherein the atmospheric vent 7*h* is formed at the side adjacent to the chamber for accommodating the negative pressure generation element. The negative pressure generation element adjustment space 7*i* having a recessed shape is formed between the ink absorber 7*a* and the partition.

As the ink contained in the ink absorber 7*a* is consumed, the interface between the atmosphere and the liquid ink (gas-to-liquid interface) moves downward and the atmosphere is introduced into the raw ink accommodation chamber, and thus ink is supplied to the ink absorber 7*a*. This is called gas-to-liquid exchange.

The negative pressure in the ink absorber 7*a* is adjusted by the meniscus position at the gas-to-liquid interface so that ink is supplied without leakage from the print head.

The head 21 and the ink reservoir 7 are mounted as a unit on the carriage 1 and are scanned along the shafts 2 and 3 in a direction perpendicular to the page of the figure.

Figure 29:
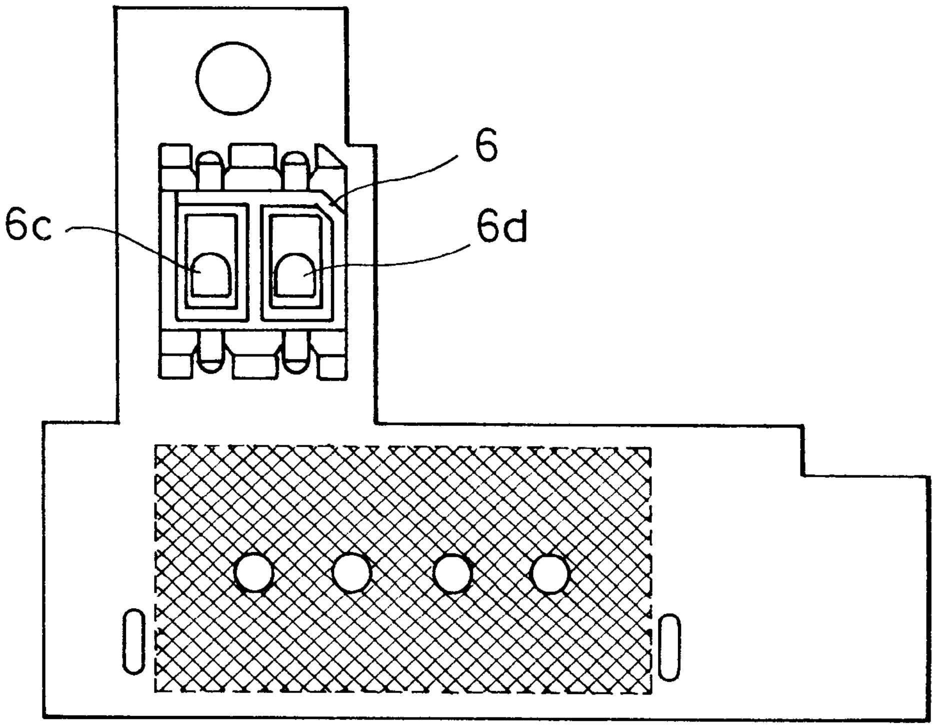
FIG. 29 is a schematic diagram of an ink sensor applicable to the present invention.

FIG. 29 is a plan view of a board on which the photo interrupter 6 is mounted, wherein reference numeral 6*c* denotes a light emitting part and reference numeral 6*d* denotes a light receiving part. In FIG. 25, the line 6*a* denotes an optical path (backward optical path) along which the light 6*b*, that is emitted by the light emitting part 6*c* and reflected, travels toward the light receiving part 6*d* shown in FIG. 29. This optical path may lie in the reflection plane parallel to the page of FIG. 25 as in the case of the example shown in FIG. 25 or may lie in the reflection plane perpendicular to the page of FIG. 25. However, if the orientation of the carriage 1 changes to a great degree when the paper position selection lever 5 is operated, it is more preferable that the reflection plane be perpendicular to the page of FIG. 25 in that the influence of the change in the orientation becomes smaller. In FIG. 25, the optical path is represented by a simple line although the actual light beam is distributed within a certain diameter.

The photo interrupter 6 is disposed such that the detection light strikes a point on the absorber 7*a* in the ink reservoir 7 wherein the above point is located at a position slightly shifted to the raw ink accommodation chamber 7*c*. This position of the point influences the number of pages that can be printed further as described in detail later. As for the height at which the photo interrupter 6 is located, it is preferable that the photo interrupter 6 be located so that the focal point of the photo interrupter 6 is near the boundary 7*b* between the wall of the ink reservoir 7 and the absorber 7*a*. If the focal point is far from the above boundary 7*b*, the detection light beam is spread out to a greater extent and thus the detection light beam is reflected by the inner walls of the holes 1*b* of the carriage 1 or other portions, which results in a reduction in the signal-to-noise ratio in detection.

As described above, the photo interrupter 6 is constructed with an LED or light emitting device 6*c* serving as a light source and a photo detector 7*d* wherein the light emitting device 6*c* and the photo detector 7*d* are combined into an integral form. The LED emits infrared light that can pass through any of the four color inks described above. The photo detector 6*d* is adapted to have high enough sensitivity to the wavelength of the above infrared light.

The photo interrupter 6 is disposed separately from the carriage 1 so that the infrared light strikes the bottom face of the absorber 7*c* via the holes 1*b* formed in the carriage 1 and further via the transparent wall 7*b* of the ink reservoir 7 and so that the reflected light reaches the photo detector 6*d*. An advantage of the above-described construction in which the photo interrupter 6 serving as a detection system is disposed separately from the carriage is that a power supply line and a signal line between the main part of the printer and the photo interrupter 6 are not needed to pass via the carriage that is a movable element, and thus the construction can be simplified.

Figure 31:
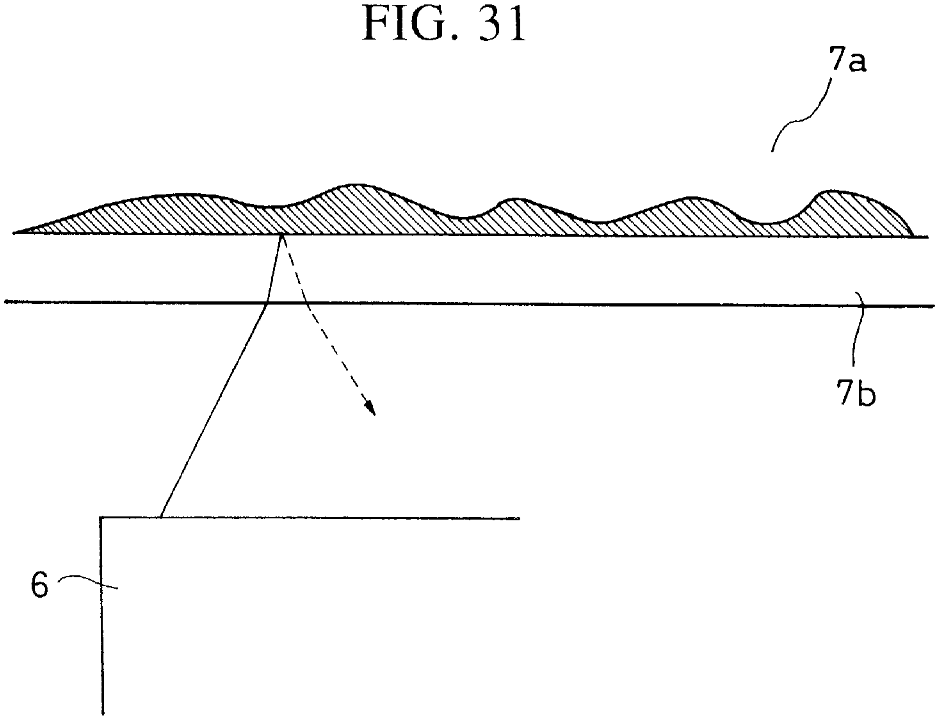
FIG. 31 is a schematic representation of the principle of detecting the amount of remaining ink.
Figure 33:
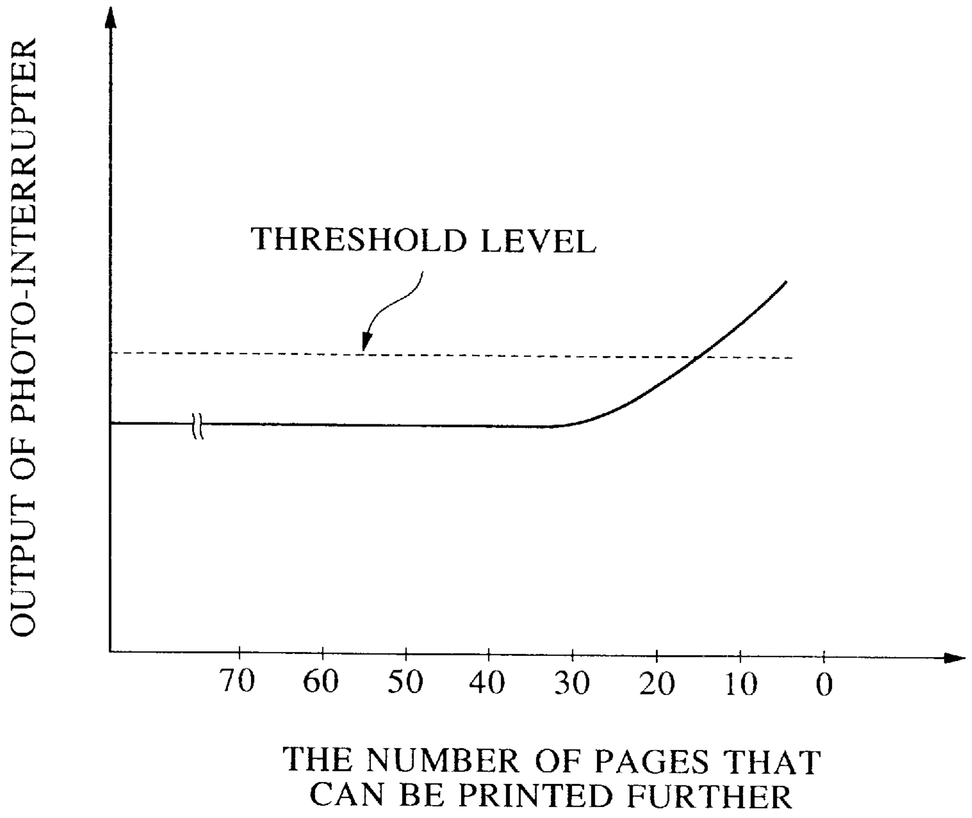
FIG. 33 is a graph illustrating the output of a photo interrupter.

FIG. 31 is an enlarged schematic diagram illustrating a part of the bottom face of the absorber 7*a*, a point on which is illuminated with the light and also illustrating other portions near that point, in a situation in which there is a sufficient amount of ink in the ink reservoir 7. FIG. 31 is an enlarged schematic diagram of the same portions as those shown in FIG. 31, in a situation in which no ink remains in the ink reservoir. FIG. 33 is a graph illustrating the output of the photo detector 6*d* of the photo interrupter 6 as a function of the amount of remaining ink.

Now, the principle of detecting the amount of remaining ink will be described below.

In general, the amplitude reflectance of light at an interface between media 1 and 2 having different refractive indices can be represented by Fresnel's equations shown below:

$$rp=(n2\cdot\cos\theta1-n1\cdot\cos\theta2)/(n2\cdot\cos\theta1+n1\cdot\cos\theta2)$$

for p-polarization;

$$rs=(n1\cdot\cos\theta1-n2\cdot\cos\theta2)/(n1\cdot\cos\theta1+n2\cdot\cos\theta2)$$

for s-polarization, where n1 is the refractive index of the medium 1;

n2 is the refractive index of the medium 2;

θ1 is the angle of the light in the medium 1 relative to the normal; and

θ2 is the angle of the light in the medium 2 relative to the normal.

(There is a relationship $n1.\sin\theta1=n2\cdot\sin\theta2$ among these four variables.)

If it is assumed that the light emitted by the light emitting part 6*c* of the photo interrupter 6 is incident on the ink reservoir 7 at an angle close to a right angle, then cosθ=1 can be considered to be a good approximation. The above equations in terms of the amplitude reflectance can be rewritten in terms of energy reflectance by multiplying them by themselves, and thus the following equation can be obtained:

$$R=(n1-n2)^2/(n1+n2)^2$$

When there is a sufficient amount of ink in the ink reservoir 7, the gap between the wall of the ink reservoir 7 and the absorber 7*a* is filled with ink as shown in FIG. 31. The ink reservoir 7 and the absorber 7*a* are both made of plastic having a refractive index of about 1.5 whereas the ink has a refractive index of about 1.4. Therefore, from the above equation, it can be concluded that the reflectance at the wall of the ink reservoir 7 or at the surface of the absorber 7*a* is as small as about 0.1%.

As the ink is consumed, air is introduced into the gap formed between the absorber 7*a* and the wall of the ink reservoir 7 via the atmospheric vent 7*h* shown in FIG. 26. Thus, in the situation in which no ink remains in the ink reservoir, the reflectance at the inner wall of the ink reservoir or at the surface of the absorber is about 4%. This means that when all ink has been spent and thus no ink remains, the amount of reflected light has become about 40 times greater than before. (In practice, however, reflection may occur at a position other than the boundary 7*c,* such as the bottom outer face of the ink reservoir 7. Furthermore, there is noise in a practical system. These factors can reduce the change in the amount of reflected light.)

The detection may also be performed using the light reflected by the boundary 7*d* between the ink reservoir 7 and the raw ink accommodation chamber 7*c*. However, there is a difference in the number of possible reflecting locations as shown in Table 1.

TABLE 1

| Reflecting Location | Absorber | Raw Ink |
|---|---|---|
| Ink Reservoir/Ink | ○ | ○ |
| Absorber/Ink | ○ | X |
| Inside of the Absorber | ○ | X |
| Total Number | 3 | 1 |

As can be seen from Table 1, the number of reflecting locations that are possible when the detection is performed on the absorber is three times greater than the other case. Therefore, the detection in conjunction with the absorber results in a greater amount of reflected light and thus it is possible to achieve high reliability in detection regardless of noise.

Figure 32:
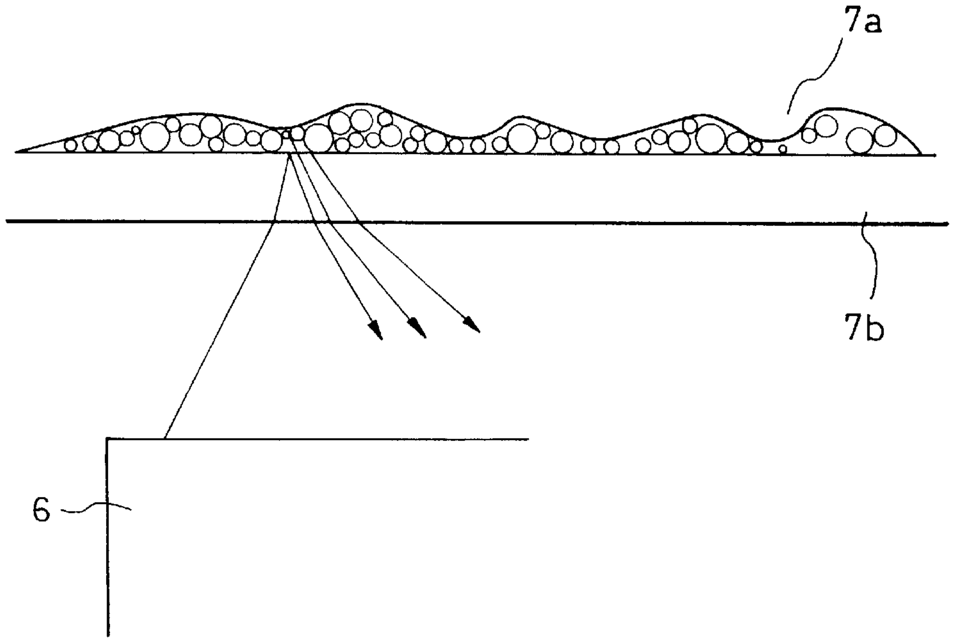
FIG. 32 is a schematic representation of the principle of detecting the amount of remaining ink.

Furthermore, as shown in FIG. 32, air introduced into the gap between the absorber 7*a* and the wall of the ink reservoir 7 exists there in the form of a great number of small bubbles, which scatter the light. This scattering effect results in a further increase in the amount of reflected light.

The reflectance described above is obtained assuming that cosθ=1. Even in the case where the above assumption is not valid, a rather great change in reflectance occurs when the ink is gone. In either case, the output level of the light receiving part 6*d* of the photo interrupter 6 changes to a great degree corresponding to the change in reflectance and thus it is possible to detect whether there is ink in the ink reservoir 7 on the basis of the change in the output level.

In practice, the region illuminated by light is not a point even when the illuminated area is at the focal point of the photo interrupter 6, and has a certain expansion. Therefore, as ink goes out from that region, the output of the photo interrupter 6 changes continuously.

In FIG. 33, the vertical axis represents the output of the photo interrupter 6, and the horizontal axis represents the number of pages that can be printed further until all ink has been spent. If the output level of the photo interrupter 6 becomes greater than a threshold level defined in the characteristic curve shown in FIG. 33 (in the example shown in FIG. 33, the threshold level corresponds to an output level which gives 15 as the number of pages that can be printed further), the amount of ink remaining in the ink reservoir is considered as having become very small, and an alarm LED or the like disposed on the control panel of the printer is lighted to tell a user that the ink is about to run out.

The number of pages that can be printed further can be changed by changing the threshold level. However, as can be seen from FIG. 33, it is unsuitable to select a value lower than the turning point (30 pages in the example shown in FIG. 33) at which the output rises up. The turning point itself can be changed by adjusting the detection position of the photo interrupter 6. Thus, it is possible to issue a warning when the number of pages that can be printed further becomes lower than a threshold that can be set to a desired value.

Alternatively, the printing operation may be stopped instead of giving a warning, or otherwise at the same time as a warning is given. The stopping of the printing operation may serve as a stronger warning.

As described in detail above, the ink reservoir 7 including the absorber 7*a* serving as the negative pressure generation element is illuminated by the light emitted by the light emitting part 6*c,* and the reflected light is detected by the light receiving part 6*d.* If the amount of ink remaining in the ink reservoir becomes lower than the threshold, such a decrease in the amount of ink is detected by the increase in the output level of the light receiving part 6*d.*

In this structure, the absorber 7*a* acts as the negative pressure control element for controlling the negative pressure imposed on the ink supplied from the ink reservoir 7 and also acts as the reflection control element for controlling the reflection of the light emitted by the light emitting part 6*c* thereby controlling the amount of reflected light. Thus, the reduction in the amount of ink in the ink reservoir including the absorber 7*a* is detected very precisely.

Figure 36:
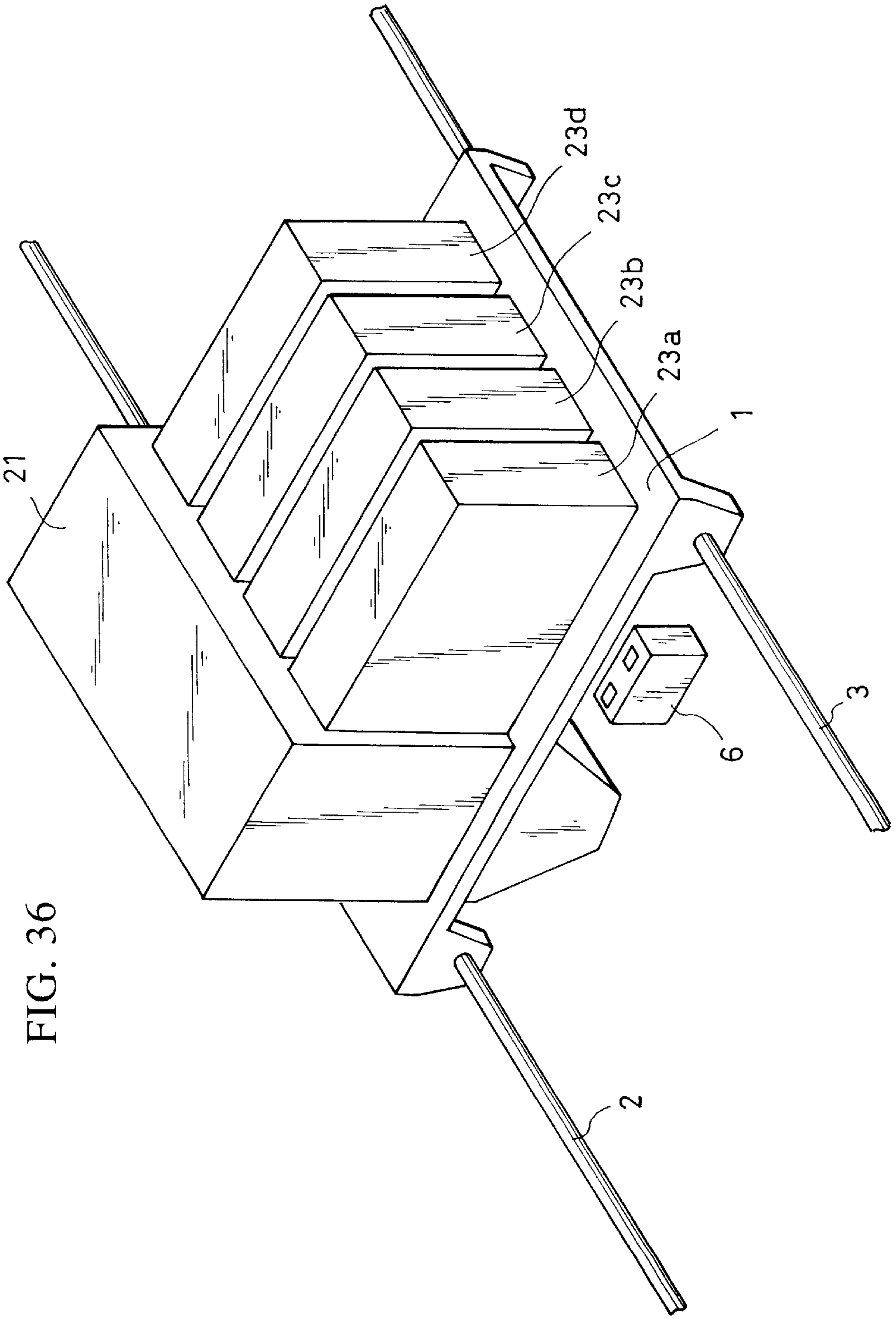
FIG. 36 is a perspective view of a carriage on which a plurality of ink reservoirs are mounted.

The ink-jet printer shown in FIG. 28 is of the type so-called a color ink-jet printer that can emit ink droplets having various colors. For this purpose, four ink reservoirs corresponding to four individual colors are disposed side by side on the carriage as shown in FIG. 36. The amount of ink remaining in each ink reservoir can be detected by moving the carriage 1 so that the ink reservoirs for individual colors come to a position facing the photo interrupter 6 one by one. Since the output should be monitored separately for each color, memory means is provided for each color. It is desirable that the warning of the lack of ink be displayed independently for all four colors. However, the warning may by displayed for only one color to simplify the display panel of the ink-jet printer.

According to the technique described above, it is possible to detect the precise amount of ink remaining in the respective ink reservoirs including an ink absorber of the color ink-jet printer wherein only one detecting system is required to detect four colors.

Whereas in the example described above, the bottom face of the ink reservoir 7 is illuminated by light for the purpose of detection, the detection may also be performed by illuminating the side or upper surface of the ink reservoir 7.

However, it is more preferable that the bottom face of the ink reservoir 7 be employed for the detection for the reason described below.

In general, the density of the absorber 7*a* is distributed nonuniformly, and thus ink goes spot by spot from the absorber. As a result, the photo interrupter 6 can detect a particular spot having no ink although there is still enough ink in other parts of the absorber, or, in the opposite case, can detect a particular spot having ink although no ink remains in the other parts. This results in a variation in the value that is indicated as the number of pages that can be printed further when the output level reaches the given same threshold. In the worst case, all ink will go before a warning is given.

The ink distribution in the ink reservoir 7 is influenced by gravitation, and ink tends to gather in a bottom region of the ink reservoir 7. This means that ink is distributed more uniformly in the bottom region of the ink reservoir 7. As can be seen from the above discussion, the bottom face is suitable for achieving high accuracy detection of the amount of remaining ink.

Figure 34:
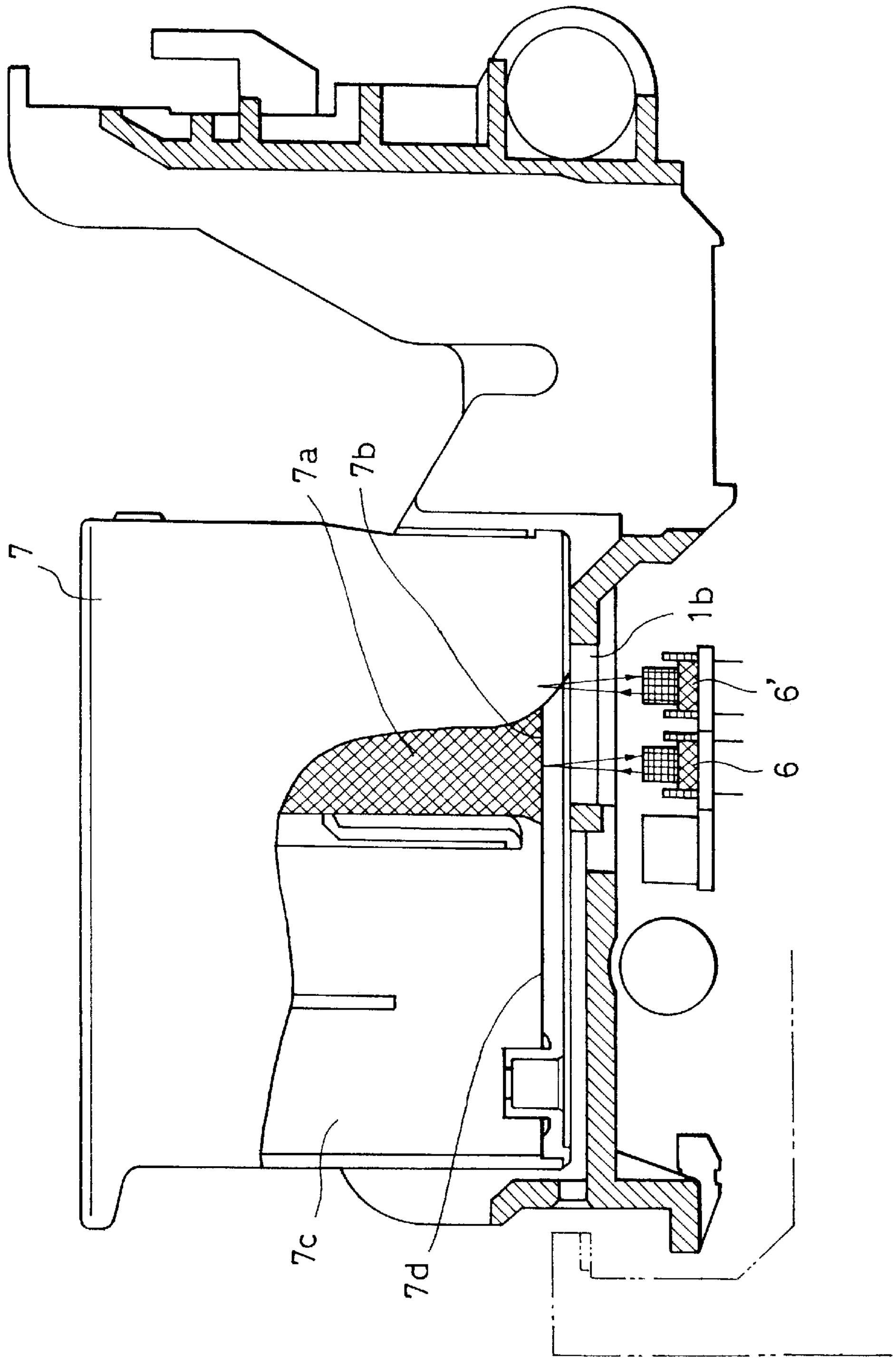
FIG. 34 is a schematic diagram of an ink sensor.

In another embodiment shown in FIG. 34, two photo interrupters are employed and the average value of the outputs of these two photo interrupters is used to detect the reduction in the amount of remaining ink so as to avoid the influence of the nonuniformity of the density of the absorber 7*a* and thus achieve high accuracy detection of the amount of remaining ink.

In FIG. 34, similar elements to those in FIG. 26 are denoted by the same reference numerals as those in FIG. 26. Reference numeral 6' denotes a photo interrupter serving as a second ink sensor, which is the same type as the photo interrupter 6. (Hereinafter, the photo interrupter 6 will also be referred to as a first photo interrupter for convenience of explanation.)

In the construction shown in FIG. 34, the average of the outputs of the first and second photo interrupters 6 and 6' is used to detect the reduction in the amount of remaining ink. The averaging may be performed either in a simple fashion or in a weighted fashion. The second photo interrupter 61 is disposed at a location nearer to an ink supply aperture 24 compared to the location of the first interrupter 6. As a result, the change in the output of the photo interrupter 6' occurs at a lower value of the number of pages that can be printed further, compared to the case of the first photo interrupter 6. Therefore, either photo interrupter may be weighted more depending on the desired threshold value associated with the number of pages that can be printed further.

If a plurality of sensors for detecting the amount of remaining ink are disposed at different locations so that the average of outputs of these sensors is used for the detection as in the above example, it is possible to reduce the influence of the nonuniformity of the density of the absorber 7*a* and thus high reliability detection of the amount of remaining ink is possible.

Another technique to reduce the variation in the detected value due to the influence of the nonuniformity of the density of the absorber 7*a* is to change the location of the photo interrupter 6 relative to the location of the carriage 1 so that the measurement is performed at a plurality of points of the ink reservoir 7 and the average of the measured value at these points is used to detect the amount of remaining ink. In this case, the photo interrupter 6 may be moved, or otherwise the carriage 1 may be moved while maintaining the photo interrupter 6 at a fixed location, so that the measurement is performed at a plurality of points.

In the above-described technique of detecting the amount of remaining ink, when the output of the photo interrupter 6 becomes greater than a predefined threshold, a warning is given and/or the printing operation is stopped. Alternatively, instead of giving a warning or stopping the printing operation when the output of the sensor becomes greater than the threshold voltage, an indication corresponding to the output of the photo interrupter 6 may be displayed in such a manner that, for example, the indication is proportional to the output of the photo interrupter 6 or otherwise in simple relation to the output of the photo interrupter 6.

As shown in FIG. 33, the output of the photo interrupter 6 continuously increases with the decreasing amount of ink remaining in the ink reservoir 7 in a small-amount range. Therefore, if an indication corresponding to the output is given, then the indication will represent the number of pages that can be printed further. This indication will give more detailed information about the amount of remaining ink to a user.

Figure 35:
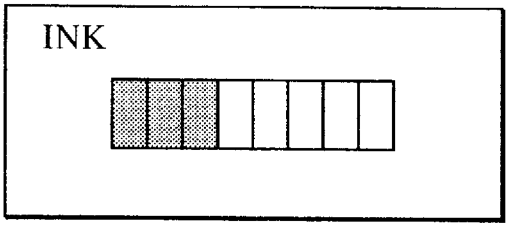
FIG. 35 is a schematic representation of an indicator of the amount of remaining ink.

FIG. 35 illustrates an example of an indication of the amount of ink remaining in the ink reservoir, given on a display panel. In the example of the indication on the display panel shown in FIG. 35, the level of a digital meter changes according to the number of pages that can be printed further. Alternatively, the number of pages that can be printed further may be displayed in a numerical fashion. The display panel may be of any type that is used broadly, such as a liquid crystal display. Furthermore, the indication may be given not only via visual means, but also via audible means. For example, a voice may tell the number of pages that can be printed further. Or otherwise, a buzzer is sounded a number of times depending on the number of pages that can be printed further or a buzzer is sounded for a time period which changes depending on the number of pages that can be printed further.

In this technique, as described above, a user can get detailed information about the amount of remaining ink which is given on the basis of the output of the photo interrupter 6 and thus the user can take proper action such as replacement of an ink reservoir at a right time.

In the example shown in FIG. 26, the ink reservoir 7 includes both the absorber 7*a* and the raw ink storing region 7*c*. Alternatively, the ink reservoir 7 may also be constructed such that an absorber 7*a* is disposed over the entire region in the ink reservoir 7 as shown in FIG. 30.

In the construction shown in FIG. 30, the ink in the absorber 7*a,* flows via the ink supply aperture 24, and a path 30 disposed in the print head 21 and finally reaches the nozzle 22 serving as ink emission means. Thermal energy is applied to the ink by heating means (also referred to as a heater) 31 disposed in the nozzle 22. The abrupt acquiring of thermal energy causes the ink to be ejected via the emission aperture at the end of the nozzle 22. The ink droplets emitted in this way are deposited on a medium such as paper whereby printing is performed.

When there is no ink reservoir 7, the light emitted by the photo interrupter 6 is reflected by nothing. As a result, the output level of the photo interrupter 6 becomes extremely low compared to the level obtained when there is an ink reservoir 7 containing enough amount of ink. This make it possible to detect whether an ink reservoir 7 is mounted or not by judging the output level detected by the photo interrupter 6.

In particular, in a color ink-jet printer such as that shown in FIG. 28, it is possible to individually detect the presence or the absence of ink reservoirs for various colors. This prevents the printer from starting a printing operation when an ink reservoir is not mounted on the carriage. Furthermore, in this technique, no additional elements are required to detect whether all ink reservoirs are mounted or not. Thus, it is possible to detect both the amount of remaining ink and the presence or absence of ink reservoirs with a simple construction at a low cost.

In this technique, as described above, there is provided detection means by which the change in reflectance at the boundary between the wall of an ink reservoir and the ink absorber is detected through a part of the wall of the ink reservoir. The amount of remaining ink is detected on the basis of the difference between the reflectance obtained when there is ink at the detection point and that obtained when no ink is present there. This technique offers high reliability detection of the amount of remaining ink, that can detect whether the amount of remaining ink becomes smaller than a predefined threshold even for an ink reservoir including an ink absorber.

Now, a technique for detecting the paper position, that is, the distance between the head and paper using a photo interrupter 6 (sensor) will be described below.

In this technique, the paper position is detected utilizing the fact that the detection level of the photo interrupter 6 (sensor) changes depending on the detection distance.

As described earlier, status information about the presence or absence of an ink reservoir and the carriage position is transmitted to the host computer via the bidirectional interface.

Figure 37:
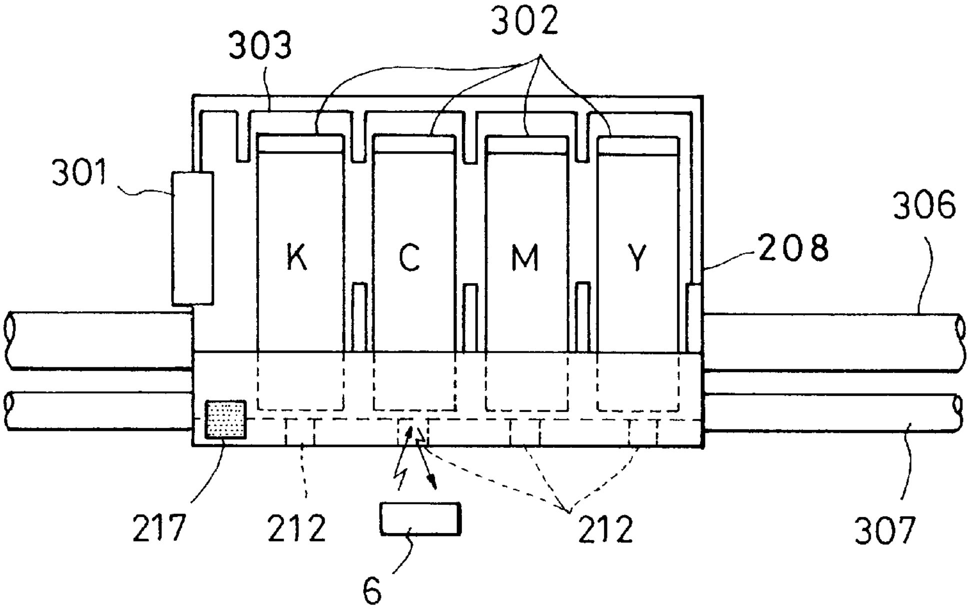
FIG. 37 is a cross-sectional view of the carriage, taken along a plane parallel to the shafts.

FIG. 37 is a cross-sectional front view of a carriage on which a print head and ink reservoirs are mounted. As shown in FIG. 37, print head 303 and ink reservoirs 302 are mounted on a carriage 208. The carriage 208 is moved along the shafts 306 and 307 in a direction parallel to the page of FIG. 37. There is disposed a photo interrupter 6 (sensor) including an LED and a photo detector constructed in an integral form, at a proper location in the middle of the moving path of the carriage 208 so that the bottom face of an absorber 302*a* is illuminated by light via holes 212 formed in the carriage 208. The LED emits infrared light that can pass through any of the four color inks including black, cyan, magenta, and yellow inks, which are used broadly in various color printers. The photo detector is adapted to have high enough sensitivity to the wavelength of the light emitted by the LED. A reflection plate 217 is disposed at a fixed position on the carriage 208.

An advantage of the above-described arrangement in which the photo interrupter 6 is disposed separately from the carriage 208 is that it is not required to have a power supply line and a signal line connected to a movable element from the main part of the printer. Since the print head 303 and the ink reservoirs 302 mounted on the carriage 208 are moved as a unit along the shafts 306 and 307 in a direction parallel to the page of the figure, it is possible to detect the presence or absence of ink reservoirs for four colors including black, cyan, magenta, and yellow, as well as the paper position of the carriage using only a single photo detector 6 (sensor) by controlling the position of the carriage 208.

Figure 38:
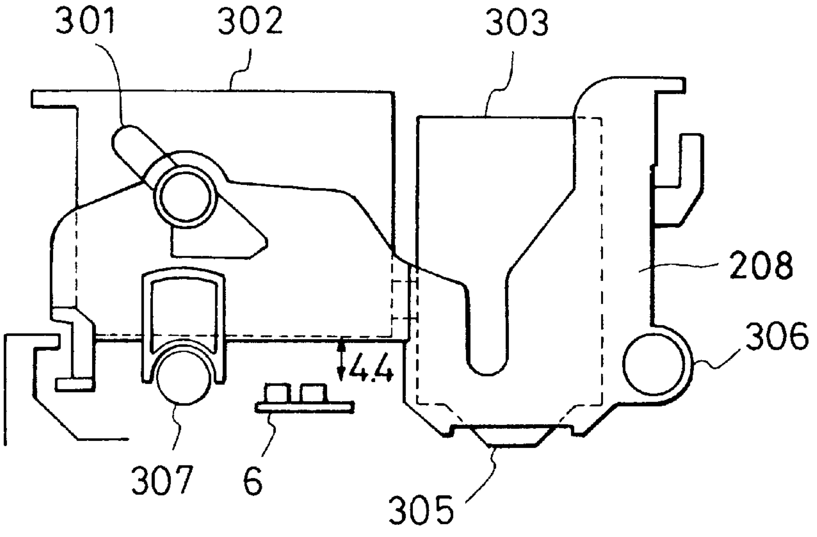
FIG. 38 is a cross-sectional view of the carriage, taken along a plane perpendicular to the shafts, in a situation in which the carriage position is in the standard paper position.

FIG. 38 is a cross-sectional view of the carriage 208 wherein the cross section is taken along a plane perpendicular to the shafts. This carriage 208 is supported by the shafts 306 and 307, and the ink reservoirs 302 and the print head 303 are mounted on the carriage. Ink is supplied from the ink reservoirs 302 to the print head 303. The supplied ink is then emitted via an orifice 305 thereby depositing ink on a printing material. The photo interrupter 6 (sensor) is fixed to the main part of the printer. When the paper position is in the standard paper position shown in FIG. 38, the photo interrupter 6 (sensor) is about 4.4 mm apart from the bottom of the ink reservoirs. There is also provided a paper position adjustment lever 301. This is used to adjust the carriage position so that the distance between the nozzle disposed at the end of the head and the paper surface against which ink is fired is maintained constant for both types of paper: standard paper which is broadly used to print a document; and thick paper such as post cards, wherein it is a general requirement for a standard printer to have the capability of printing on both standard and thick paper.

Figure 39:
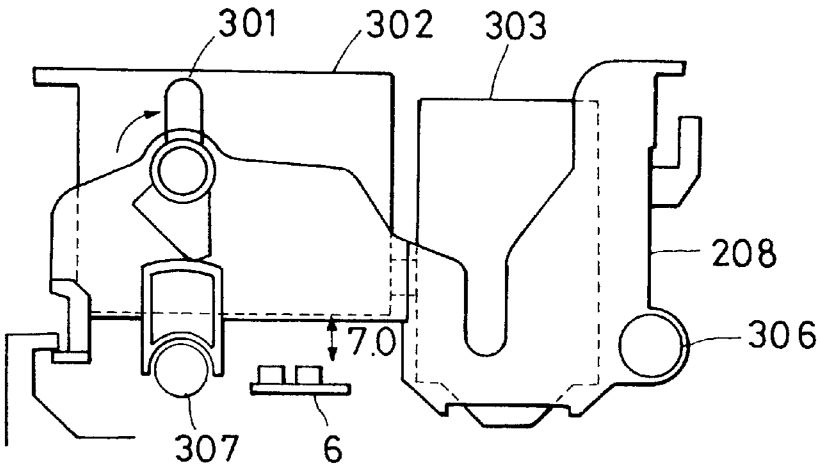
FIG. 39 is a cross-sectional view of the carriage, taken along a plane perpendicular to the shafts, in a situation in which the carriage position is in the thick paper position.
Figure 40:
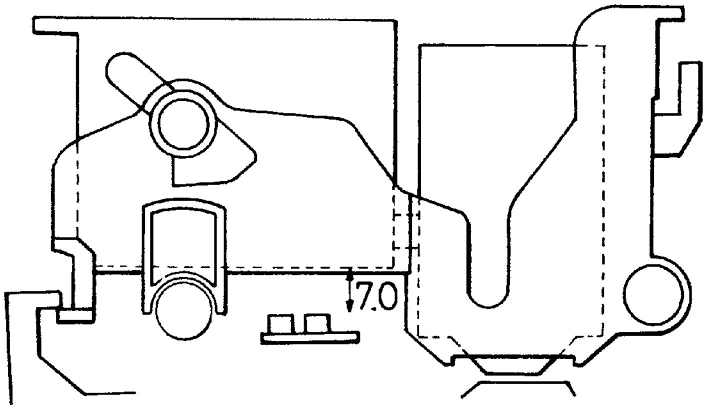
FIG. 40 is a cross-sectional view of the carriage, taken along a plane perpendicular to the shafts, in a situation in which the carriage position is in the cap position.

FIG. 39 illustrates the carriage 208 in a situation in which the paper position lever 301 has been moved upward to the thick paper position. If the paper position lever is moved in the direction denoted by the arrow, a paper position switching element goes outward and thus the carriage moves upward by means of rotation about the shaft 306. As a result, the distance between the head and the printing paper becomes larger. In this thick paper position, the carriage is located at an angle of about 4 degrees to the paper plane. In this situation, the photo detector 6 is located at a position about 7 mm apart from the ink reservoirs 302. The carriage position shown in FIG. 39 is referred to as the thick paper position. The thick paper position is employed when a printing operation is performed on paper thicker than standard paper. FIG. 40 illustrates a cap position.

Figure 50:
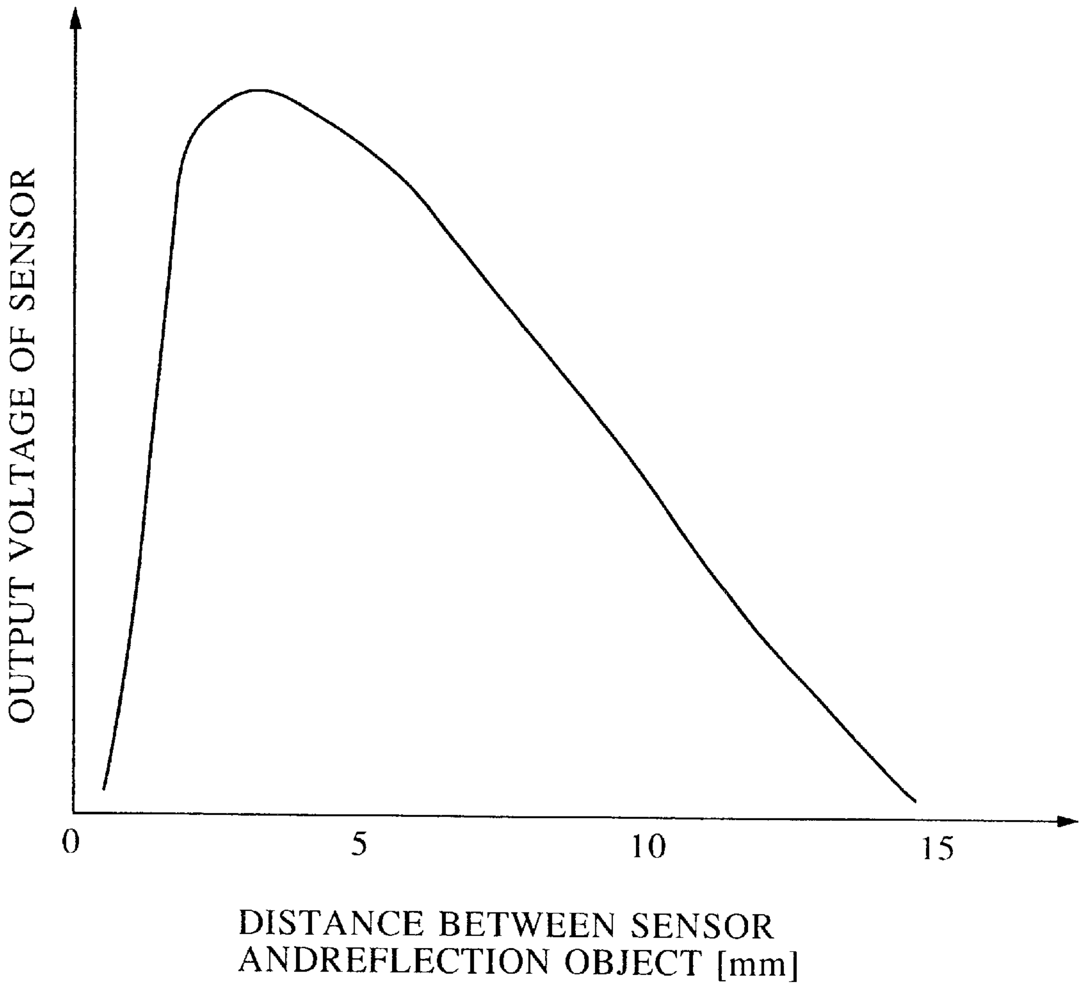
FIG. 50 is a graph illustrating the output voltage of a sensor as a function of the distance between the sensor and a reflecting object.

FIG. 50 is a graph showing the sensor output of the photo interrupter 6 (sensor) as a function of the distance between the sensor and the reflecting object. The sensor output has a maximum value when the distance between the sensor and the reflecting object is equal to the focal distance. The sensor output becomes lower when the distance between the sensor and the reflecting object is either smaller or greater than the focal distance.

If the sensor-to-reflector distance is smaller than the focal distance in the standard paper position, a problem occurs in detection of the paper position of the above-described carriage 208. That is, when the paper position is switched to the thick paper position the sensor output can either increase or decrease, and therefore it is impossible to determine the paper position. For this reason, the distance between the photo interrupter 6 (sensor) and the reflecting plate 27 is set to a value greater than the focal distance in the standard position. In this case, when the paper position is switched to the thick paper position, the distance between the sensor and the reflecting mirror increases and therefore the sensor output decreases. Thus, it is possible to tell that the paper position is in the thick paper position. If no ink reservoir is mounted on the carriage, the sensor-to-reflector distance becomes infinite (can be regarded as infinite) and therefore the sensor output decreases further to an extremely low level. This means that this technique can also detect whether there is an ink reservoir or not.

Figure 41:
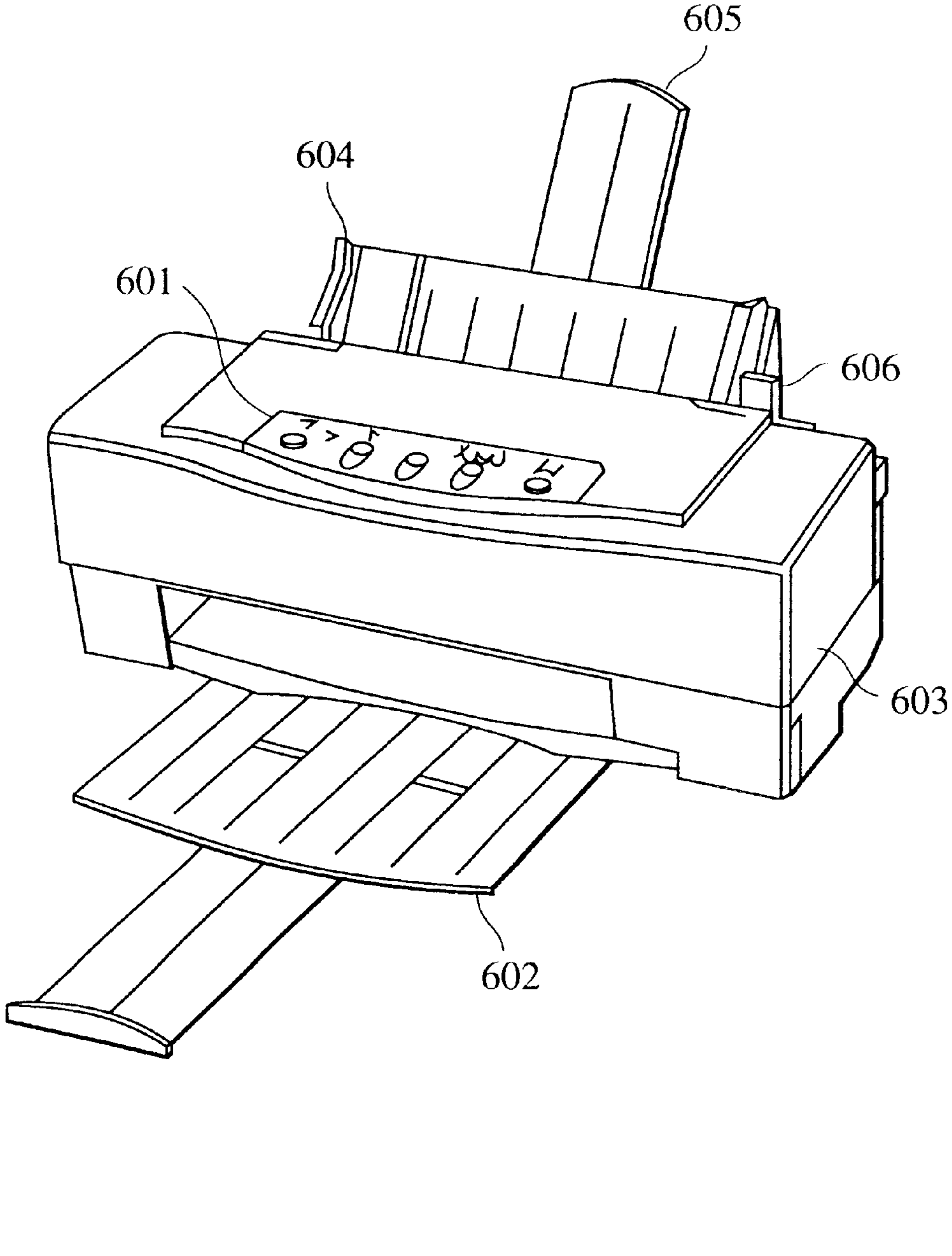
FIG. 41 is a perspective view of a printer, illustrating its appearance.

FIG. 41 illustrates the appearance of a printer, wherein the printer includes a panel switch 601 for a setting operation, a printed paper tray 602, a cover 603 of the main part of the printer, a paper feeding tray 604, an auxiliary paper feeding tray 605, and a paper selection lever 606. When a printing operation is performed using a conventional printer of a similar type, either the standard paper position or the thick paper position is selected by the paper position adjustment lever 301 shown in FIGS. 38–40, setting regarding the paper position is performed again via the panel switch 601, and the paper selection lever 606 is operated so that either standard or thick paper is selected. Unlike the conventional printer, the printer according to the present embodiment of the invention has the capability of setting the paper position to either the standard paper position or the thick paper position depending on the result of the detection by the photo interrupter 6 (sensor). Furthermore, the status information about the presence or absence of ink reservoirs and the paper position detected by the photo interrupter 6 (sensor) is transmitted to the host computer 110 via the bidirectional interface.

FIG. 42 is a flowchart relating to the programmed operation of the printer 101. The program is stored in a program memory such as a ROM (not shown) disposed in the printer 101 so that the program is executed by a controller (CPU) 102.

After turning on the power in step S1501, the program checks, in step S1502, whether all ink reservoirs are mounted since there is a possibility that a user has removed an ink reservoir or operated the paper position adjustment lever. If it is turned out that all ink reservoirs are mounted on the carriage, then the printer is regarded as ready to start a printing operation and thus the program goes to step S1506 at which the program waits for incoming print information. On the other hand, if it is turned out in step S1502 that a particular ink reservoirs are not mounted on the carriage, then the programs goes to step S1503 in which the operation mode is switched to the bidirectional communication mode. In step S1505, if the operation in the bidirection communication mode is complete then the program goes to step S1506 at which the program waits for incoming print information.

FIGS. 40A–40C comprise a flowchart relating to the programmed operation of the host computer 110. The program for this operation is stored in the device driver 114 of the host computer 110 and the program is executed by a CPU (not shown).

Figure 44:
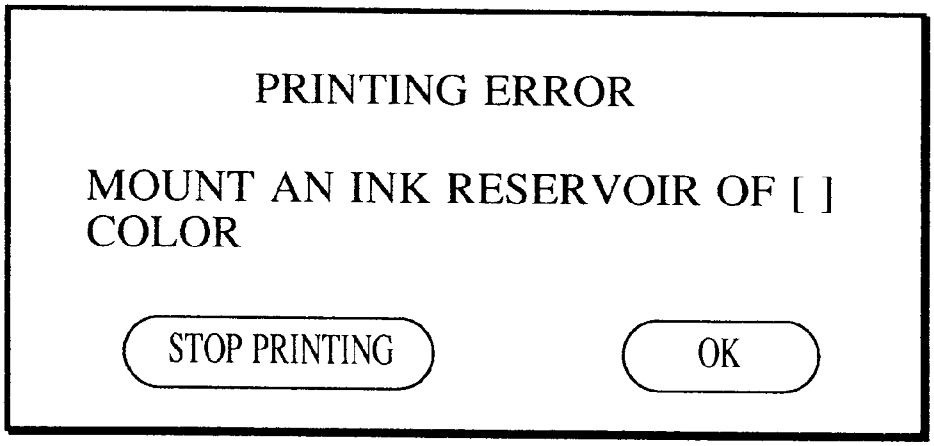
FIG. 44 is a schematic representation of an example of a dialog which is displayed when the designation of an alternative color ink is rejected.
Figure 46:
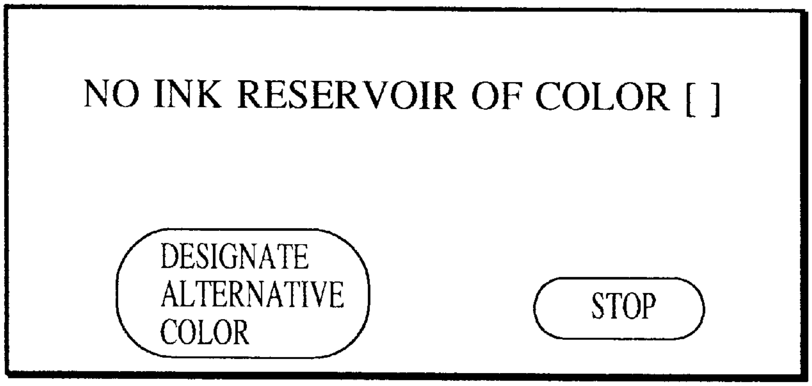
FIG. 46 is a schematic representation of an example of a dialog which is displayed when a particular ink reservoir is not mounted.

If a user issues a command via a keyboard (not shown) or a pointing device (not shown) to tell the host computer to start a printing operation, then in step S1601 the CPU (not shown) of the host computer 110 sets the operation mode of the host computer to the bidirectional communication mode via the OS system 111 and transmits a command to the printer 101 via the bidirectional interface to tell the printer that the operation mode should be switched to the bidirectional communication mode. On reception of this command, the printer 101 switches its operation mode to the bidirectional communication mode. In step S1602, the CPU (not shown) transmits a detection command to the printer 101 to tell it to detect the carriage position and the presence or absence of individual ink reservoirs. Then in step S1603, the CPU (not shown) receives, from the printer 101, the status information about the carriage position and the presence or absence of the individual ink reservoirs. In step S1604, the CPU (not shown) analyzes the status information received in step S1603 to determine whether all ink reservoirs are mounted on the carriage. If it is concluded in step S1604 that a particular ink reservoir is not mounted on the carriage, then the CPU (not shown) displays, via the OS system 111, a no-ink dialog in a status window 115 on the display screen as shown in FIG. 46. As shown in FIG. 46, the no-ink dialog (status window) contains a message telling that a particular ink reservoir is not mounted on the carriage and also telling the color of that reservoir. The no-ink dialog also contains "alternative color" and "stop" buttons via which the user can select the following operation. The user can select either button via the keyboard (not shown) or the pointing device (not shown) of the host computer 110. In step S1619, it is determined whether the "alternative color" button has been selected. If it is turned out that the "alternative color" button is not selected, the "stop" button is considered to be selected, and thus in step S1622 an error dialog 1 is displayed in a status window 115 as shown in FIG. 44. As shown in FIG. 44, the error dialog contains a message telling that an error occurs in the printing operation and also telling that an ink reservoir for a corresponding color ink should be mounted. The error dialog also contains "stop printing" and "OK" buttons via which the user can designate the following operation. The user can select either button via the keyboard (not shown) or the pointing device (not shown) of the host computer 110. In step S1623, it is determined whether the "stop printing" button has been selected. If it is turned out that the "stop printing" button has been selected, then the program goes to step S1624 in which the bidirectional communication mode is terminated. Then at step S1625, the entire process is completed.

In the above-described step S1623, if it is concluded that the "stop printing" button is not selected, the "OK" button is considered to be selected, and thus the program returns to step S1604 to determine whether an ink reservoir for the designated color ink has been mounted.

Figure 47:
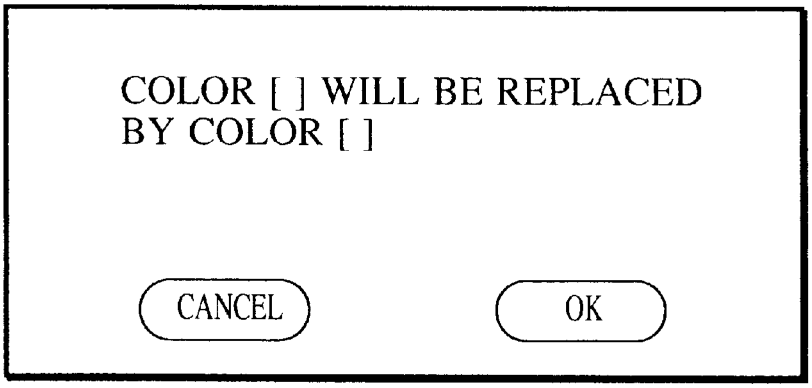
FIG. 47 is a schematic representation of an example of a dialog which is displayed to tell that a printing operation is going to be done with an alternative color ink.

On the other hand, in the above-described step S1619 if it is concluded that the "alternative color" button has been selected, then the CPU (not shown) displays, via the OS system 111, an alternative color dialog in a status window 115 as shown in FIG. 47. As shown in FIG. 47, the alternative color dialog (status window) contains a message asking the user whether he/she wants to perform the printing operation using for example a process black color obtained by mixing yellow, magenta, and cyan when for example a black ink reservoir is not mounted on the carriage. The alternative color dialog also contains "cancel" and "OK" buttons by which the user can select the following operation. Whereas the alternative color can be designated by the user in the example described above, the program may automatically designate the alternative color and may display the designated color. The user can select either button via the keyboard (not shown) or the pointing device (not shown) of the host computer 110. If the alternative color is designated, then the program goes to step S1621 in which the no-ink-reservoir flag is set to 1 (ink reservoir flag=1). Then the program goes to step S1606.

In the above-described step S1604, if it is concluded that all ink reservoirs are mounted on the carriage, then the CPU (not shown) resets the no-ink-reservoir flag to 0 (ink reservoir flag=0) in step S1605. Then in step S1606, the CPU analyzes the status information received from the printer 101 to determine whether the carriage position is at the standard paper position. If it is turned out that the carriage position is not at the standard paper position, then the carriage position is considered to be at the thick paper position and the program goes to step S1607 to display a thick paper print dialog in a status window 115 as shown in FIG. 47. The thick paper print dialog (status window) contains a virtual image of the printer 101 to indicate the location of the paper selection lever disposed on the right side of the automatic sheet feeder and also contains a message telling the user to check whether the paper selection lever is in the thick paper position. The thick paper print dialog (status window) also contains "cancel" and "print" buttons by which the user can designate the following operation. The user can select either button via the keyboard (not shown) or the pointing device (not shown) of the host computer 110. After the range of pages to be printed (all pages or a particular range) and the number of sets to be printed are designated, if the "print" button is selected, then the program goes to step S1610 at which the bidirectional communication mode is terminated. The program then executes the steps following the step S1610.

Figure 48:
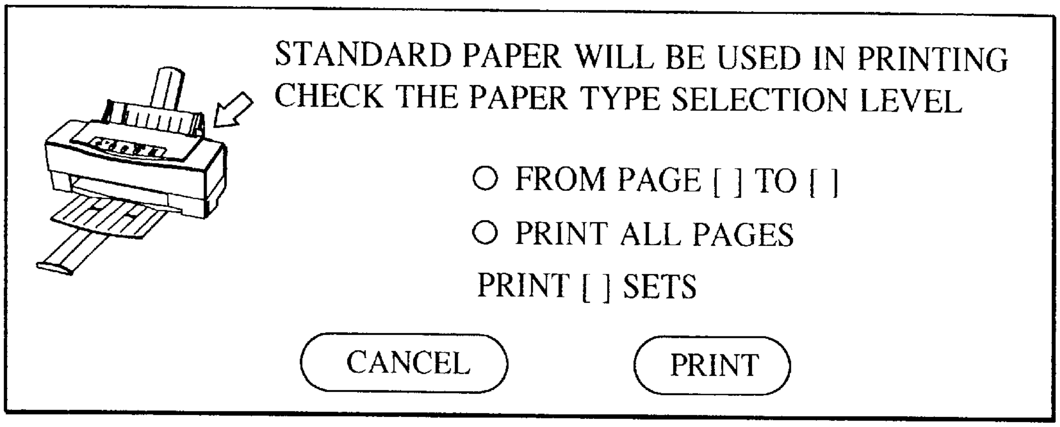
FIG. 48 is a schematic representation of an example of a dialog which is displayed at the beginning of a printing operation for standard paper.
Figure 49:
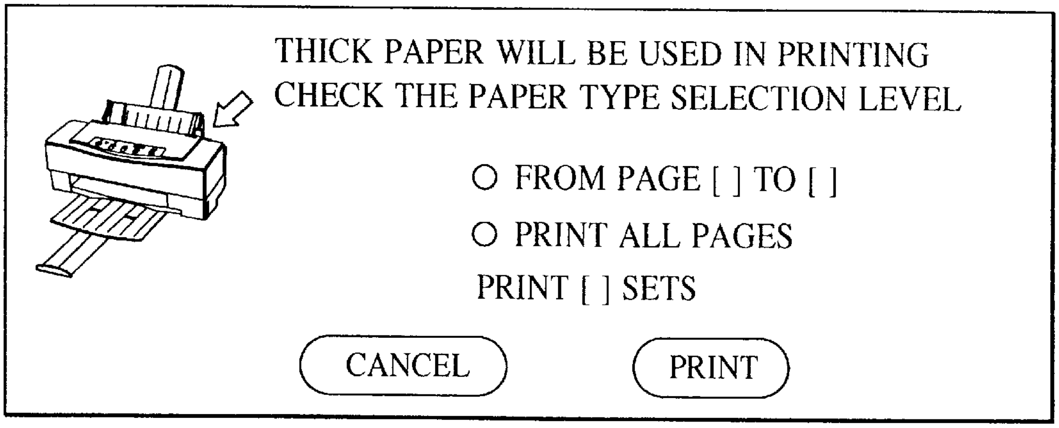
FIG. 49 is a schematic representation of an example of a dialog which is displayed at the beginning of a printing operation for thick paper.

In the above-described step S1606, if it is concluded that the carriage position is in the standard paper position, then the program goes to step S1609 to display a standard paper print dialog in a status window 115 as shown in FIG. 48. The thick paper print dialog (status window) shown in FIG. 48 contains a virtual image of the printer 101 to indicate the location of the paper selection lever disposed on the right side of the automatic sheet feeder and also contains a message telling the user to check whether the paper selection lever is in the standard paper position. The standard paper print dialog (status window) shown in FIG. 48 also contains "cancel" and "print" buttons by which the user can designate the following operation. The user can select either button via the keyboard (not shown) or the pointing device (not shown) of the host computer 110. After the range of pages to be printed (all pages or a particular range) and the number of sets to be printed are designated, if the "print" button is selected, then the program goes to step S1610 at which the bidirectional communication mode is terminated.

Figure 45:
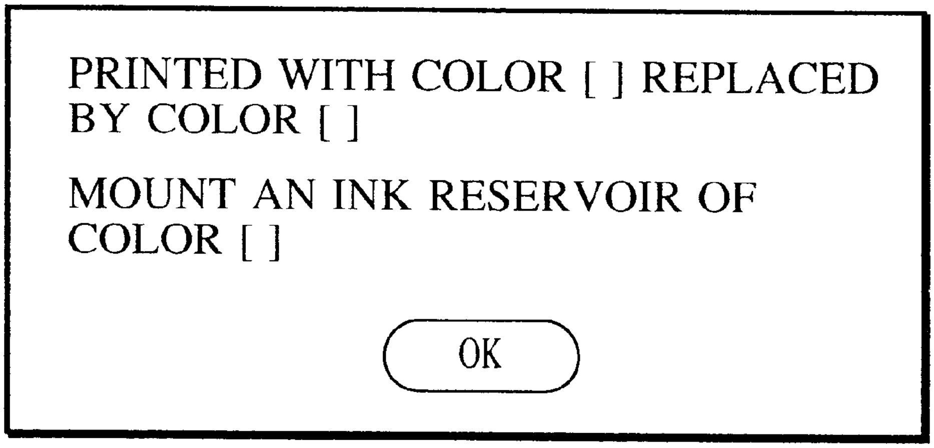
FIG. 45 is a schematic representation of an example of a dialog which is displayed when a printing operation using an alternative color ink is completed.

In step S1611, it is determined whether the user has selected the "print" button via the keyboard (not shown) or the pointing device (not shown) of the host computer 110. If it is turned out that the "print" button is not selected, then the program goes to step S1612 at which the entire process is completed. On the other hand, if it is concluded in step S1611 that the "print" button has been selected, then the program goes to step S1613 to transmit printing data (printing information) to the printer 101. In step S1614, if the transmission of the printing data (printing information) is completed, then in step S1615 it is determined whether the no-ink-reservoir flag is 0. If the no-ink-reservoir flag is 0, then the entire process is completed. On the other hand, if the no-ink-reservoir flag is 1, that is, the printing operation is in the alternative color printing mode, then the program goes to step S1616 to display an error dialog 2 in a status window 115 as shown in FIG. 45. The error dialog 2 shown in FIG. 45 contains a message telling that the printing operation has been performed using for example process black designated by the user instead of, for example, black and also contains a message telling the user to mount a black ink reservoir. The error dialog 2 also contains an "OK" button. The user can select this button via the keyboard (not shown) or the pointing device (not shown) of the host computer 110. If the user selects the "OK" button, then the program goes to step S1617 at which the whole process is completed.

In an alternative embodiment, a sensor such as a microswitch (not shown) 607 is linked to the paper selection lever 606 shown in FIG. 41 so that the position of the paper selection lever is detected by the sensor 607 and the detected position of the paper selection lever is transmitted as the status information to the host computer 110. The received status information may be displayed in a status window 115 as in the above-described embodiment.

As described above, the printer system according to the present embodiment of the invention has the capability of detecting the presence or absence of ink reservoirs in the ink-jet printer as well as the carriage position, wherein the detected information is shown to the user via the host computer. Thus, the user can get useful information and can select a proper operation from various options.

The individual components shown in outline or designated by blocks in the drawings are all well-known in the image processing and recording arts and their specific construction and operation are not critical to the operation or best mode for carrying out the invention.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to accorded the broadest interpretation so as to encompass all such modifications and equivalent structures and functions.

What is claimed is:

1. An information processing apparatus comprising:

a first determination unit for determining whether a recording material remains in a recording apparatus;

an output unit for outputting recording information to the recording apparatus when said first determination unit determines that recording material remains in the recording apparatus;

a display unit for a first displaying of a message to replace a cartridge containing the recording material when said first determination unit determines that no or insufficient recording material remains in the recording apparatus;

a second determination unit for determining whether the cartridge is replaced after the message to replace the cartridge is displayed by said display unit;

said display unit also being constructed for a second displaying of a message to select whether a cleaning operation is to be performed when it is determined by said second determination unit that the cartridge is replaced; and an output unit for outputting a cleaning command to the recording apparatus in accordance with a selection to perform the cleaning operation.

2. An information processing method comprising:

a first determining of whether a recording material remains in a recording apparatus;

outputting recording information to the recording apparatus when said first determining step determines that recording material remains in the recording apparatus;

a first displaying of a message to replace a cartridge containing the recording material when said first determining step determines that no or insufficient recording material remains in the recording apparatus;

a second determining of whether the cartridge is replaced after the message to replace the cartridge is displayed;

a second displaying of a message to select whether a cleaning operation is to be performed when said second determining step determines that the cartridge is replaced; and outputting a cleaning command to the recording apparatus in accordance with a selection to perform the cleaning operation.

3. An information processing apparatus comprising:

a program memory for storing process steps executable (a) to first determine whether a recording material remains in a recording apparatus, (b) to output recording information to the recording apparatus when said first determining step determines that recording material remains in the recording apparatus, (c) to first display a message to replace a cartridge containing the recording material when said first determining step determines that no or insufficient recording material remains in the recording apparatus, (d) to second determine whether the cartridge is replaced after the message to replace the cartridge is displayed, (e) to second display a message to select whether a cleaning operation is to be performed when said second determining step determines that the cartridge is replaced; and (f) to output a cleaning command to the recording apparatus in accordance with a selection to perform the cleaning operation; and a processor to execute the stored process steps.

4. An information processing apparatus comprising:

a first determination means for determining whether a recording material remains in a recording apparatus;

output means for outputting recording information to the recording apparatus when said first determination means determines that recording material remains in the recording apparatus;

display means for a first displaying of a message to replace a cartridge containing the recording material when said first determination means determines that no or insufficient recording material remains in the recording apparatus;

a second determination means for determining whether the cartridge is replaced after the message to replace the cartridge is displayed by said display means;

said display means also being constructed for a second displaying of a message to select whether a cleaning operation is to be performed when it is determined by said second determination unit that the cartridge is replaced; and second output means for outputting a cleaning command to the recording apparatus in accordance with a selection to perform the cleaning operation.

5. Computer executable process steps stored on a computer readable medium, said process steps (a) to first determine whether a recording material remains in a recording apparatus, (b) to output recording information to the recording apparatus when said first determining step determines that recording material remains in the recording apparatus, (c) to first display a message to replace a cartridge containing the recording material when said first determining step determines that no or insufficient recording material remains in the recording apparatus, (d) to second determine whether the cartridge is replaced after the message to replace the cartridge is displayed, (e) to second display a message to select whether a cleaning operation is to be performed when said second determining step determines that the cartridge is replaced; and (f) to output a cleaning command to the recording apparatus in accordance with a selection to perform the cleaning operation.

6. An information processing apparatus for controlling a printing device, said apparatus comprising:

acquisition means for acquiring remaining-amount information from said printing device, wherein said remaining-amount information represents the amount of ink remaining in an ink cartridge disposed in said printing device;

display means for displaying screens to a user; and display control means for controlling display of said screens on said display means, wherein display of a first screen for advising a user to replace an ink cartridge is controlled in accordance with said remaining-amount information acquired by said acquisition means, and wherein display of a second screen for selecting whether a cleaning operation should be executed is controlled in accordance with an instruction indicating that an ink cartridge has been replaced.

7. An information processing apparatus according to claim 6, wherein said first screen comprises a screen which performs an instruction stopping the replacement of a cartridge as well as that indicating the replacement of a cartridge.

8. An information processing apparatus according to claim 6, wherein said first screen comprises a screen for performing an instruction to print in an alternative color.

9. An information processing apparatus according to claim 6, further comprising means for displaying a third screen for selecting an alternative color, based on the instruction not to execute the replacement.

10. An information processing apparatus according to claim 6, wherein said remaining-mount information is either a flag indicating a lack of ink or a flag indicating the remaining amount of ink.

11. An information processing apparatus according to claim 6, further comprising analysis means for analyzing an original image and determining an ink color to be used, wherein said display means displays said first screen for advising a user to replace a cartridge, based on the remaining-amount information of used ink having the color determined by said analysis means.

12. An information processing apparatus according to claim 6, further comprising judgment means for judging a color mode, wherein said display means displays said first screen for advising a user to replace a cartridge further based on the remaining-amount information of the cartridge in accordance with the judgment by said judgment means.

13. An information processing apparatus according to claim 6, wherein the instruction indicating the replacement of said cartridge comprises an instruction by a keyboard or a mouse.

14. An information processing method for use with an information processing apparatus for controlling a printing device, comprising the steps of:

acquiring remaining-amount information from said printing device, wherein said remaining-amount information represents the amount of ink remaining in an ink cartridge disposed in said printing device;

displaying a first screen for advising a user to replace an ink cartridge in accordance with said remaining-amount information acquired in said acquiring step; and displaying a second screen for selecting whether a cleaning operation should be executed, in accordance with an instruction indicating that an ink cartridge has been replaced.

15. An information processing method according to claim 14, wherein said first screen comprises a screen which performs an instruction stopping the replacement of a cartridge as well as that indicating the replacement of a cartridge.

16. An information processing method according to claim 14, wherein said first screen comprises a screen for performing an instruction to print in an alternative color.

17. An information processing method according to claim 14, further comprising a step of displaying a third screen for selecting an alternative color, based on the instruction not to execute the cleaning.

18. An information processing method according to claim 14, wherein said remaining-amount information is either a flag indicating a lack of ink or a flag indicating the remaining amount of ink.

19. An information processing method according to claim 14, further comprising an analyzing step of analyzing an original image and determining an ink color to be used, wherein said display step displays said first screen for advising a user to replace a cartridge, based on the remaining-amount information of used ink having the color determined in said analyzing step.

20. An information processing method according to claim 14, further comprising a judging step of judging a color mode, wherein said display step displays said first screen for advising a user to replace a cartridge further based on the remaining-amount information of the cartridge in accordance with the judgment in said judging step.

21. An information processing method according to claim 14, wherein the instruction indicating the replacement of said cartridge comprises an instruction by a keyboard or a mouse.

* * * * *